US012729977B1

(12) United States Patent
Zhou et al.

(10) Patent No.: US 12,729,977 B1
(45) Date of Patent: Sep. 8, 2026

(54) SYSTEM AND METHODS FOR CONFIGURING DYNAMIC GRAPHICAL USER INTERFACES

(71) Applicant: CENTRALSQUARE TECHNOLOGIES, LLC, Lake Mary, FL (US)

(72) Inventors: Ye Zhou, Oviedo, FL (US); Ryan Trenholm, Kelowna (CA); Jason Parker, Clarkesville, GA (US); Emily Dalton, Harrisonburg, VA (US)

(73) Assignee: CENTRALSQUARE TECHNOLOGIES, LLC, Lake Mary, FL (US)

( * ) Notice: Subject to any disclaimer, the term of this patent is extended or adjusted under 35 U.S.C. 154(b) by 0 days.

(21) Appl. No.: 18/502,601

(22) Filed: Nov. 6, 2023

Related U.S. Application Data

(60) Provisional application No. 63/384,974, filed on Nov. 25, 2022.

(51) Int. Cl.
*G06F 16/00* (2019.01)
*G01C 21/00* (2006.01)
(Continued)

(52) U.S. Cl.
CPC ....... *G01C 21/387* (2020.08); *G01C 21/3878* (2020.08); *G06F 3/04817* (2013.01); (Continued)

(58) Field of Classification Search
None
See application file for complete search history.

(56) References Cited

U.S. PATENT DOCUMENTS

| | | | | |
|---|---|---|---|---|
| 6,225,998 B1 * | 5/2001 | Okita | .................... | H04M 3/523 707/999.102 |
| 6,243,092 B1 * | 6/2001 | Okita | ........................ | G06F 8/34 715/965 |

(Continued)

FOREIGN PATENT DOCUMENTS

| | | | | |
|---|---|---|---|---|
| CN | 106528762 A | * 3/2017 | ......... | G06F 16/9537 |
| CN | 112923242 A | * 6/2021 | ............... | F17D 5/02 |
| CN | 120952760 A | * 11/2025 | ............. | G06F 30/28 |

OTHER PUBLICATIONS

PCT International Search Report and Written Opinion issued in corresponding PCT Application No. PCT/US2014/051952, mailed Nov. 24, 2014.

*Primary Examiner* — Jean M Corrielus
(74) *Attorney, Agent, or Firm* — Finnegan, Henderson, Farabow, Garrett & Dunner, LLP

(57) ABSTRACT

A system for configuring a graphical user interface. The system may include a mapping configuration database configured to: receive computer aided dispatch (CAD) and geographic information systems (GIS) data from at least one user system; store mapping configuration information; and receive information from a mapping configuration tool. The system may also include a publishing tool configured to: receive information from the mapping configuration database; publish information from the mapping configuration database as a data table; and provide instructions to display the CAD data and GIS data to a mapping application tool, the CAD data and GIS data being displayed with a plurality of dynamic icons capable of displaying selected data, each dynamic icon being configured to have at least one of resource icon, agency icon, status ring, or dynamic directional arrow, and the dynamic icons being displayed within a specified geographic area.

20 Claims, 49 Drawing Sheets

(51) Int. Cl.

| | |
|---|---|
| ***G06F 3/04817*** | (2022.01) |
| ***G06F 9/451*** | (2018.01) |
| ***G06F 16/23*** | (2019.01) |
| ***G06F 16/29*** | (2019.01) |

(52) U.S. Cl.

CPC .......... *G06F 9/451* (2018.02); *G06F 16/2379* (2019.01); *G06F 16/29* (2019.01)

(56) References Cited

U.S. PATENT DOCUMENTS 6,337,693 B1 * 1/2002 Roy ........................ G06T 17/05 345/619
6,370,234 B1 4/2002 Kroll
6,466,258 B1 10/2002 Mogenis et al.
6,563,910 B2 5/2003 Menard et al.
6,642,925 B2 * 11/2003 Roy ........................ G06F 16/29 345/427
6,754,335 B1 6/2004 Shaffer et al.
7,031,714 B1 4/2006 Rayburn
7,302,250 B2 11/2007 Chin et al.
7,483,025 B2 * 1/2009 Roy ........................ G06F 16/29 382/113
7,515,693 B2 4/2009 Salafia et al.
7,646,854 B2 1/2010 Anderson
7,646,858 B2 1/2010 Salafia et al.
7,702,652 B2 * 4/2010 Twig .................. G06Q 30/0259 705/6
7,711,699 B2 * 5/2010 Koromyslov ............ G08G 1/13 345/418
7,751,826 B2 7/2010 Gardner et al.
7,958,185 B2 * 6/2011 Rothermel .......... G06F 16/1774 709/225
7,991,124 B2 8/2011 Anderson
8,050,386 B2 11/2011 Dickinson
8,145,183 B2 3/2012 Barbeau et al.
8,270,935 B2 9/2012 Lee
8,320,876 B2 11/2012 Shaffer et al.
8,669,885 B2 * 3/2014 Swope, III ............... G08G 1/13 340/995.13
8,712,366 B2 4/2014 Greene et al.
8,825,795 B2 * 9/2014 Wesley, Sr. ........... G06F 15/173 370/338
9,002,384 B1 * 4/2015 Hallenbeck ............. H04W 4/02 455/457
9,080,872 B2 * 7/2015 Tarnok .................... G06F 9/451
9,273,979 B2 * 3/2016 Su ...................... G01C 21/3632
10,339,582 B2 * 7/2019 Goldberg ............ G06F 3/04812
11,151,510 B2 * 10/2021 Shroff ................. G06F 16/9535
11,381,650 B2 * 7/2022 Maguire ............... H04L 67/535
11,487,777 B1 * 11/2022 Bose ................... G06F 16/2455
2002/0035451 A1 * 3/2002 Rothermel .......... G06F 16/1774 703/1
2002/0039108 A1 * 4/2002 Roy ........................ G06T 17/05 345/619
2002/0106059 A1 8/2002 Kroll et al.
2004/0032411 A1 * 2/2004 Roy ........................ G06T 11/60 345/427
2004/0176974 A1 * 9/2004 Twig ..................... H04L 67/306 705/344
2005/0176441 A1 8/2005 Jurecka
2005/0192720 A1 * 9/2005 Christie .................. B61L 27/14 701/19
2005/0215229 A1 9/2005 Cheng
2006/0136090 A1 * 6/2006 Koromyslov ............ G08G 1/09 715/764
2007/0003024 A1 1/2007 Olivier et al.
2007/0121799 A1 5/2007 Binning
2008/0059889 A1 * 3/2008 Parker ..................... G06F 16/29 715/748
2008/0243545 A1 10/2008 D'Ambrosia et al.
2008/0267360 A1 10/2008 Spector
2008/0299940 A1 12/2008 Shaffer et al.
2008/0304629 A1 12/2008 Buscemi et al.
2009/0287401 A1 * 11/2009 Levine ............... G01C 21/3492 701/117
2010/0057336 A1 * 3/2010 Levine ............. G08G 1/096816 701/532
2010/0174560 A1 7/2010 Quan et al.
2010/0220840 A1 9/2010 Ray et al.
2010/0246781 A1 9/2010 Bradburn
2010/0261492 A1 10/2010 Salafia et al.
2010/0291894 A1 11/2010 Pipes
2010/0313148 A1 * 12/2010 Hochendoner ....... G06F 3/0481 715/777
2011/0086607 A1 4/2011 Wang et al.
2011/0098056 A1 * 4/2011 Rhoads .................. G01C 21/36 345/173
2011/0111726 A1 5/2011 Kholaif et al.
2011/0151829 A1 6/2011 Velusamy et al.
2011/0225547 A1 * 9/2011 Fong ....................... G06T 13/00 715/835
2012/0023432 A1 * 1/2012 Aguren ................. G06F 11/328 715/772
2012/0027189 A1 2/2012 Shaffer et al.
2012/0045039 A1 2/2012 Dickinson
2012/0149324 A1 6/2012 Daly
2012/0185559 A1 * 7/2012 Wesley, Sr. ........... G06F 16/245 709/217
2012/0190384 A1 7/2012 Marr et al.
2012/0202447 A1 8/2012 Edge et al.
2012/0218102 A1 8/2012 Bivens et al.
2012/0303268 A1 * 11/2012 Su ...................... G01C 21/3632 701/428
2012/0303481 A1 * 11/2012 LouisN'jai ............. G06Q 30/06 715/764
2013/0090968 A1 * 4/2013 Borza .................... G06Q 10/06 705/7.16
2013/0096819 A1 * 4/2013 Tarnok ............... G01C 21/3844 701/538
2014/0007158 A1 1/2014 Bhagwat
2014/0094134 A1 4/2014 Balthasar et al.
2014/0249735 A1 * 9/2014 Levine ............... G01C 21/3492 701/117
2014/0270098 A1 * 9/2014 Maw ................. H04M 3/42348 379/45
2014/0344718 A1 * 11/2014 Rapaport .............. H04L 67/306 715/753
2015/0100233 A1 * 4/2015 Pacholski ............ G06Q 90/205 701/409
2018/0276880 A1 * 9/2018 VanderLugt ............ G06T 17/05
2019/0332612 A1 * 10/2019 Glover ............... G06Q 30/0623
2019/0376798 A1 * 12/2019 Abramson ......... G01C 21/3641
2020/0182649 A1 * 6/2020 Crimmins ............. G06F 16/909
2020/0394739 A1 * 12/2020 Way ...................... G06F 16/955
2021/0366058 A1 * 11/2021 Caballero ............. G06F 40/221

* cited by examiner

100

400

600

800A

800B

FIG. 10
1000
Configured Map Layers Summary
Close Summary
1002
Global
Streets (Day)
Streets (Night)
1004
EMS 1
Address Points
Streets (Day)
Streets (Night)
1006
EMS 2

1100

1100B

1100C

1100D

1200

1300

Layer Features

Feature Table Geographic Areas
Object ID 7

Feature Table Geographic Areas
Object ID 16

Feature Table Premises
Object ID 12109

Feature Table Premises
Object ID 16593

Feature Table Stations
Object ID 175

Feature Table Stations
Object ID 312

1400

1500

1600

1700

1800

1900

2000

*FIG. 29*
Aerial
Aircraft
ALS Unit
Ambulance
Battalion Chief
Bike
BLS Unit
Boat
Brush
Community Service
Crisis Team
Cruiser
Detective
Drone
Engine
Hazmat
Incident Commander
Inspector
Investigator
k9
Medic Supervisor
Motorcycle
Patrol
Rescue
Rescue Pump
Sergeant
Volunteer
Officer

FIG. 36
Pasadena
Baldwin Park
West Covina
Fullerton
Orange
Garden Grove
Irvine
Long Beach
Redondo Beach
Santa Monica
Beverly Hills

SYSTEM AND METHODS FOR CONFIGURING DYNAMIC GRAPHICAL USER INTERFACES

CROSS REFERENCE TO RELATED APPLICATIONS

This application claims the benefit of priority of U.S. Provisional Application No. 63/384,974, filed on Nov. 25, 2022, which is incorporated herein by reference in its entirety.

TECHNICAL FIELD

The present disclosure relates generally to computer-implemented systems and methods for configuring dynamic graphical user interfaces. More specifically, and without limitation, this disclosure relates to computer-implemented systems and methods for configuring a Graphical User Interface (GUI) for use in mapping applications and computer-aided dispatch (CAD). The systems and methods disclosed herein may be used in various applications and systems, including CAD, CAD-to-CAD, crowd-sourced public mapping systems, cloud-based mapping systems, and other systems.

BACKGROUND

Digital map interfaces traditionally provide users with in-depth information about their general surroundings, or for a specifically selected geographical area. Digital maps can be presented in the form of GUIs. However, mapping interfaces and mapping GUIs sometimes provide users with too much information or may present the information in a confusing manner. This is especially true when the map interface displays live, rather than static, content such as geolocation for buses, taxis, emergency medical services (EMS) vehicles, law enforcement vehicles, fire department vehicles, etc. Manipulating digital maps can be cumbersome and confusing to users, particularly in dynamic environments with multiple actors and multiple dynamic variables. The disclosed systems and methods provide solutions to these and other problems in the prior art.

SUMMARY

In view of the foregoing, embodiments of the present disclosure provide computer-implemented systems and methods for configuring dynamic GUIs. Certain disclosed embodiments provide methods and systems for configuring a GUI for maps involved in CAD, CAD-to-CAD, and other systems. Certain disclosed embodiments provide methods and systems to create a plurality of dynamic icons, wherein each icon may be configured to include a resource icon, agency icon, status ring, and a dynamic directional arrow. Some disclosed embodiments may provide a plurality of dynamic icons, wherein each dynamic icon may be configured to have one of several exemplary colors, each exemplary color being indicative of status. In other embodiments, each icon may be further configured to have "selected" and "hover" statuses. Certain disclosed embodiments may provide simple ways to convey complex directional, status, agency, and responder information about an incident to users and end-users. Other disclosed embodiments may additionally or alternatively provide systems and methods enabling users and end-users to readily configure and interpret maps in CAD and other systems. Certain disclosed embodiments may be configured to permit certain users to configure map settings using a configuration tool.

One aspect of the present disclosure is directed to a system for configuring a graphical user interface for dynamic maps. The system may include a mapping configuration database configured to receive CAD and geographic information systems (GIS) data from at least one computer-aided dispatch system. The system may also be configured to include a mapping configuration tool including online GIS or GIS fields, such as Environmental Systems Research Institute (ESRI) fields. The mapping configuration tool may enable users to customize map appearance and included layers. The system may also include a publishing tool configured for transmitting information to a client device, providing instructions to display the CAD and GIS data to a mapping application tool, with a plurality of dynamic icons capable of displaying selected CAD and GIS data for incidents, vehicles, and units.

Another aspect of the present disclosure is directed to a method to configure a graphical user interface for dynamic maps. The method may include configuring a mapping configuration database to receive CAD and geographic information systems (GIS) data from at least one computer-aided dispatch system. The method may also be configured to include a mapping configuration tool including online GIS or GIS fields, such as Environmental Systems Research Institute (ESRI) fields. The mapping configuration tool may be configured to enable users to customize map appearance and included layers. The method may also include configuring a publishing tool configured for transmitting information to a client device, to provide instructions to display the CAD and GIS data to a mapping application tool, with a plurality of dynamic icons capable of displaying selected CAD and GIS data for incidents, vehicles, and units. The method may further include selecting icon detail data to be associated with an incident, vehicle, or unit; generating a dynamic incident, vehicle, or unit icon containing the icon detail data; and displaying the incident, vehicle, or unit icon on the map.

It is to be understood that the foregoing general description and the following detailed description are exemplary and explanatory only and are not restrictive of the disclosed embodiments.

BRIEF DESCRIPTION OF THE DRAWINGS

The accompanying drawings, which are part of this specification, illustrate several embodiments and, together with the description, serve to explain the principles and features of the disclosed embodiments. In the drawings.

DETAILED DESCRIPTION

Reference will now be made in detail to exemplary embodiments, discussed with regards to the accompanying drawings. In some instances, the same reference numbers will be used throughout the drawings and the following description to refer to the same or like parts. Unless otherwise defined, technical and/or scientific terms have the meaning commonly understood by one of ordinary skill in the art. The disclosed embodiments may be described in sufficient detail to enable those skilled in the art to practice the disclosed embodiments. It is to be understood that other embodiments may be utilized and that changes may be made without departing from the scope of the disclosed embodiments. For example, unless otherwise indicated, method steps disclosed in the figures can be rearranged, combined, or divided without departing from the envisioned embodiments. Similarly, additional steps may be added or steps may be removed without departing from the envisioned embodiments. Thus, the materials, methods, and examples are illustrative only and are not intended to be necessarily limiting.

Figure 1:
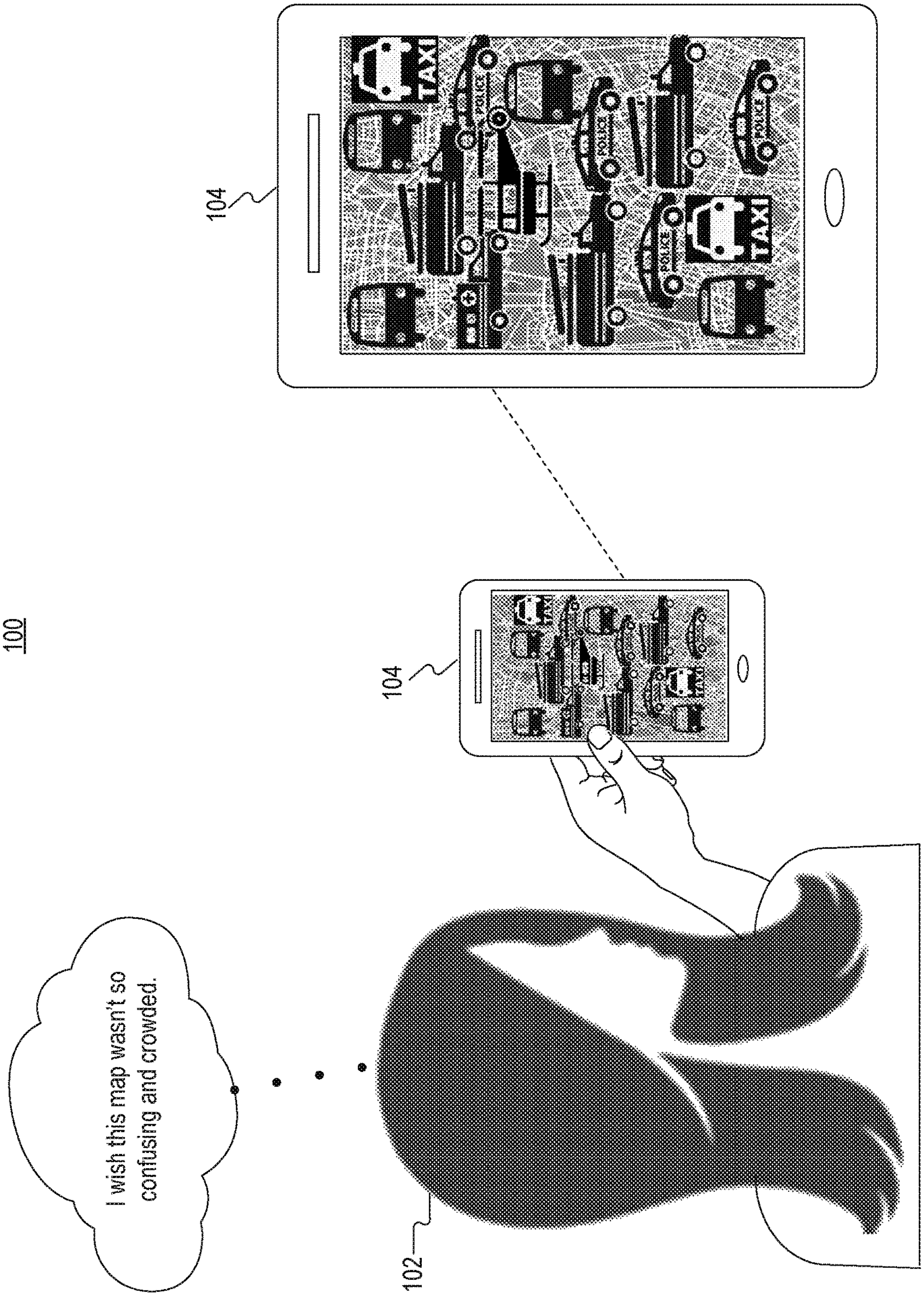
FIG. 1 is a representation of a user interaction with an interface displayed in a device.
Figure 2:
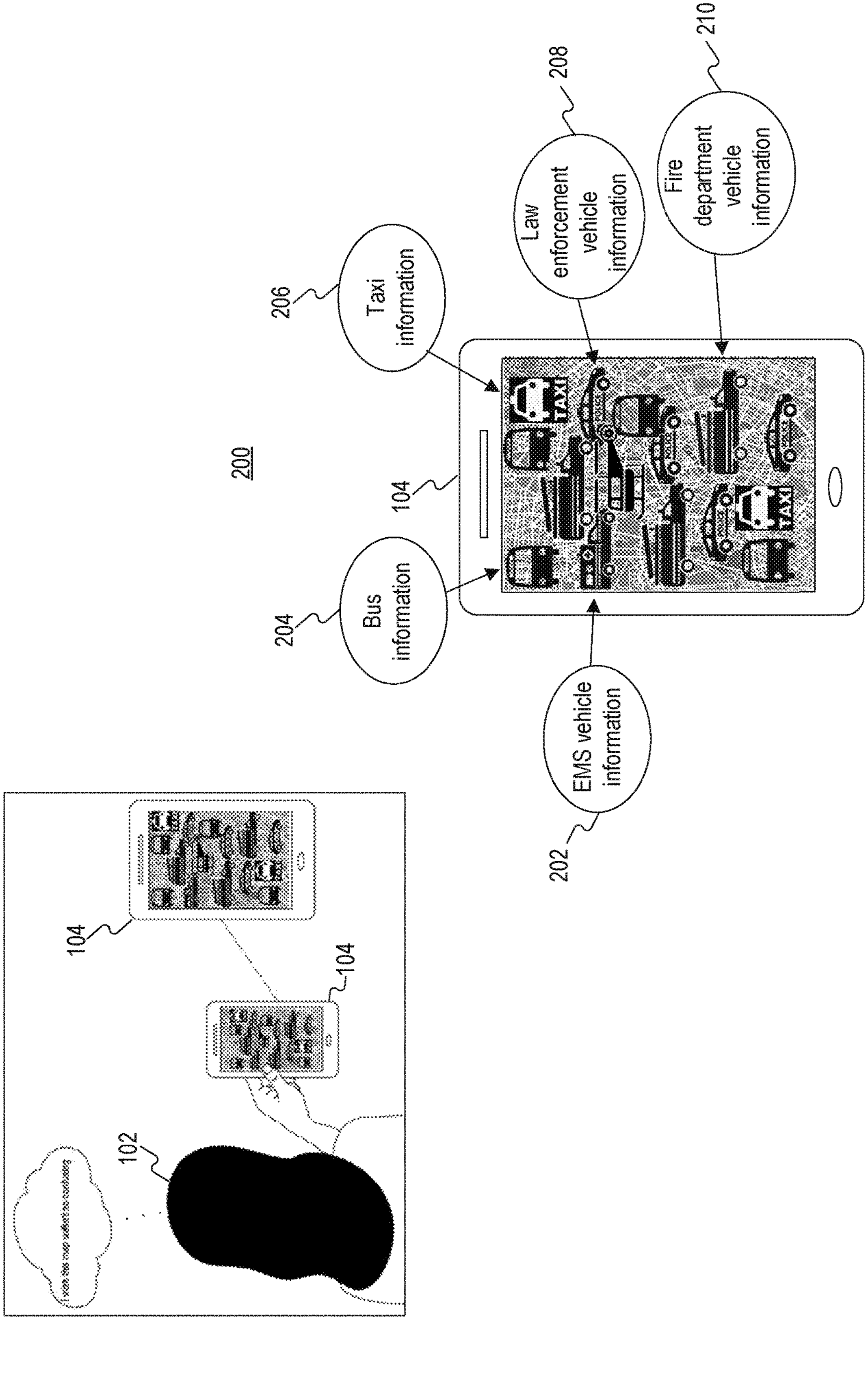
FIG. 2 is a representation of an interface displaying multiple sets of data in a display device.

As discussed elsewhere herein, interfaces and mapping GUIs sometimes provide users with too much information or may present the information in a confusing manner. This is especially true when the map interface displays live, rather than static, content such as geolocation for buses, taxis, emergency medical services (EMS) vehicles, law enforcement vehicles, fire department vehicles, etc. Manipulating digital maps can be cumbersome and confusing to users, particularly in dynamic environments with multiple actors and multiple dynamic variables. For example, FIG. 1 depicts a user 102 and a mapping GUI 104 cluttered with information. It may be difficult for the user 102 to understand and manipulate the mapping GUI 104. FIG. 2 is a representation 200 of an interface displaying multiple sets of data in a display device. As shown in FIG. 2, the mapping GUI 104 may include multiple sets of live data including EMS vehicle information 202, bus information 204, taxi information 206, law enforcement vehicle information 208, and fire department vehicle information 210. Mapping GUI 104 is cluttered and difficult to configure and/or use.

Disclosed embodiments may include systems and methods for configuring a GUI for dynamic maps involved in computer-aided dispatch (CAD), CAD-to-CAD and other systems. CAD may include systems and methods for dispatching taxicabs, couriers, field service technicians, mass transit vehicles, or emergency services assisted by computer. Disclosed embodiments may include systems and methods to create a plurality of dynamic icons; each dynamic icon may be configured to have a resource icon, agency icon, status ring, and a dynamic directional arrow. Further embodiments may include systems and methods for generating GUIs, configured to display a plurality of icons, each dynamic icon having one of several exemplary colors, each exemplary color being indicative of status. In other embodiments, each icon may be further configured to have "selected" and "hover" statuses. Disclosed embodiments may further include systems and methods for generating simple ways to convey complex directional, status, agency, and responder information about an incident to a user.

Disclosed embodiments may further include systems and methods enabling users to readily configure and interpret maps in CAD and other systems. Disclosed embodiments may permit certain users to configure map settings using a configuration tool. Consistent with disclosed embodiments, a processor may include any physical device or group of devices having electric circuitry that performs a logic operation an input or inputs. For example, a processor or at least one processor may include one or more integrated circuits (IC), including an application-specific integrated circuit (ASIC), a microchip, a microcontroller, a microprocessor, all or part of a central processing unit (CPU), a graphics processing unit (GPU), a digital signal processor (DSP), a field-programmable gate array (FPGA), a server, a virtual server, a virtual computing instance (e.g., a virtual machine or a container), or other circuits suitable for executing instructions or performing logic operations. The instructions executed by at least one processor may, for example, be pre-loaded into a memory integrated with or embedded into the controller or may be stored in a separate memory. The memory may include a Random Access Memory (RAM), a Read-Only Memory (ROM), a hard disk, an optical disk, a magnetic medium, a flash memory, other permanent, fixed, or volatile memory, or any other mechanism capable of storing instructions. In some embodiments, the at least one processor may include more than one processor. Each processor may have a similar construction, or the processors may be of differing constructions that are electrically connected or disconnected from each other. For example, the processors may be separate circuits or integrated in a single circuit. When more than one processor is used, the processors may be configured to operate independently or collaboratively and may be co-located or located remotely from each other. The processors may be coupled electrically, magnetically, optically, acoustically, mechanically or by other means that permit them to interact. Some disclosed embodiments may be software-based and may not require any specified hardware support.

Disclosed embodiments may include a system for configuring a graphical user interface, the system may include a mapping configuration database configured to receive computer-aided dispatch (CAD) and geographic information systems (GIS) data from at least one user system. A graphical user interface (GUI) may refer to a user interface through which users interact with electronic devices via visual indicator representations (e.g., icons). For example, users may interact with GUI icons, buttons, and menus displayed on a map. A GUI may be shown on devices such as tablet, computer, and/or smart phone. Receive may refer to collecting, getting, inputting, and/or accepting. For example, system may input CAD data from user system (e.g., computer aided dispatch system). A mapping configuration database may refer to a database containing configuration information necessary for data mapping. For example, mapping configuration database may include the data mapping workflow, workflow instructions, imported data, and/or settings to read source files. Data stored in the mapping configuration database may be configured to be published (e.g., to the publishing tool and/or Enterprise CAD Configuration). In certain embodiments, the mapping configuration database may be a SQL server containing all mapping configuration information stored in a simple way and designed to be able to publish to a mapping configuration database (e.g., Enterprise CAD database). In some embodiments, mapping configuration database may be further configured to customize one or more of a map launch location, a map color, an icon list, and a layer list.

In some embodiments, data stored in the mapping configuration database may be CAD settings and/or mapping configuration information. In certain embodiments, a mapping configuration database tool may be configured to maintain the schema of the mapping configuration database (e.g., CAD database) and other database artifacts that may be designed to be in sync with the mapping configuration tool. The schema of the database defines the structure of the data in the mapping configuration database and may or may not be manipulated by end users. CAD data may refer to information from a CAD system such as location information, available vehicle information, status information, prioritization information, and dispatch information. CAD datasets may vary in size, scale, and level of detail.

GIS data may refer to geographical and geospatial information stored in layers and integrated with geographic software programs so that spatial information can be created, stored, manipulated, analyzed, and visualized. GIS data may include vector data information from a GIS system. Non-limiting examples of GIS data may include aerial photo, elevation, and temperature information. It is to be appreciated CAD and GIS data may be integrated with software programs, such as CAD systems, mapping systems, automatic vehicle location systems, mobile data terminals, and unified CAD systems. Users may include any person sending, editing, or viewing the CAD data and GIS data and dynamic map. For example, users may include call takers, dispatchers, and/or supervisors. Call takers may use the GUI to identify incident locations. Dispatchers may use the GUI to send units to incidents. Supervisors may use the GUI to see a global view of the map. A user system may refer to a device the user is using that sends data (e.g., CAD data or GIS data) to the mapping configuration database (e.g., CAD database). For example, user system may involve a CAD system.

In some embodiments, the mapping configuration database may store mapping configuration information. Store mapping configuration information may include saving settings, a default mapping configuration, and/or a custom mapping configuration. Non-limiting examples of mapping configuration information may include, where the map starts when it launches, colors, dynamic icons, and layer lists. Mapping configuration information may update when a user changes a setting (e.g. Initial Location X, Initial Location Y) using the mapping configuration tool.

Figure 3:
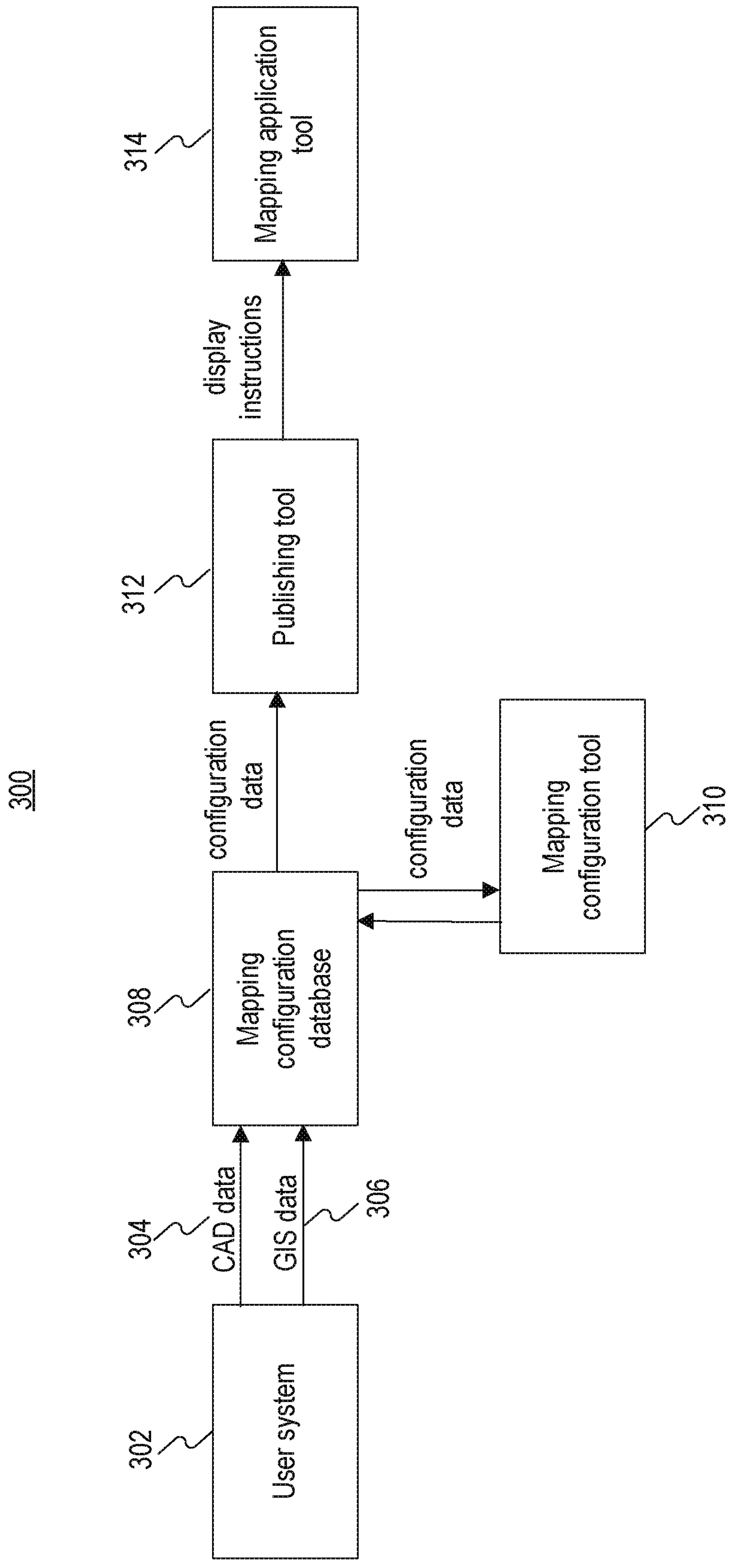
FIG. 3 is a representation of an exemplary system for configuring a dynamic GUI, as described in exemplary embodiments.

By way of non-limiting example, FIG. 3 is a representation of an exemplary system for configuring a dynamic GUI, as described in exemplary embodiments. FIG. 3 is an example of an exemplary system 300 for configuring a graphical user interface including a user system 302, a mapping configuration database 308, a mapping configuration tool 310, a publishing tool 312, and a mapping application tool 314. User system 302 may send CAD data 304 and GIS data 306 to the mapping configuration database 308. CAD data 304 and GIS data 306 may include geographical information. Mapping configuration database 308 may store mapping configuration information and receive information from mapping configuration tool 310. Mapping configuration tool 310 may enable users to access CAD data 304 and GIS data 306 from mapping configuration database 308, alter CAD data 304 and GIS data 306, and adjust map behavior. Publishing tool 312 may receive configuration information from mapping configuration database 308, publish information from mapping configuration database 308 as a data table, and provide instructions to display CAD data 304 and GIS data 306 to a mapping application tool 314.

Figure 4:
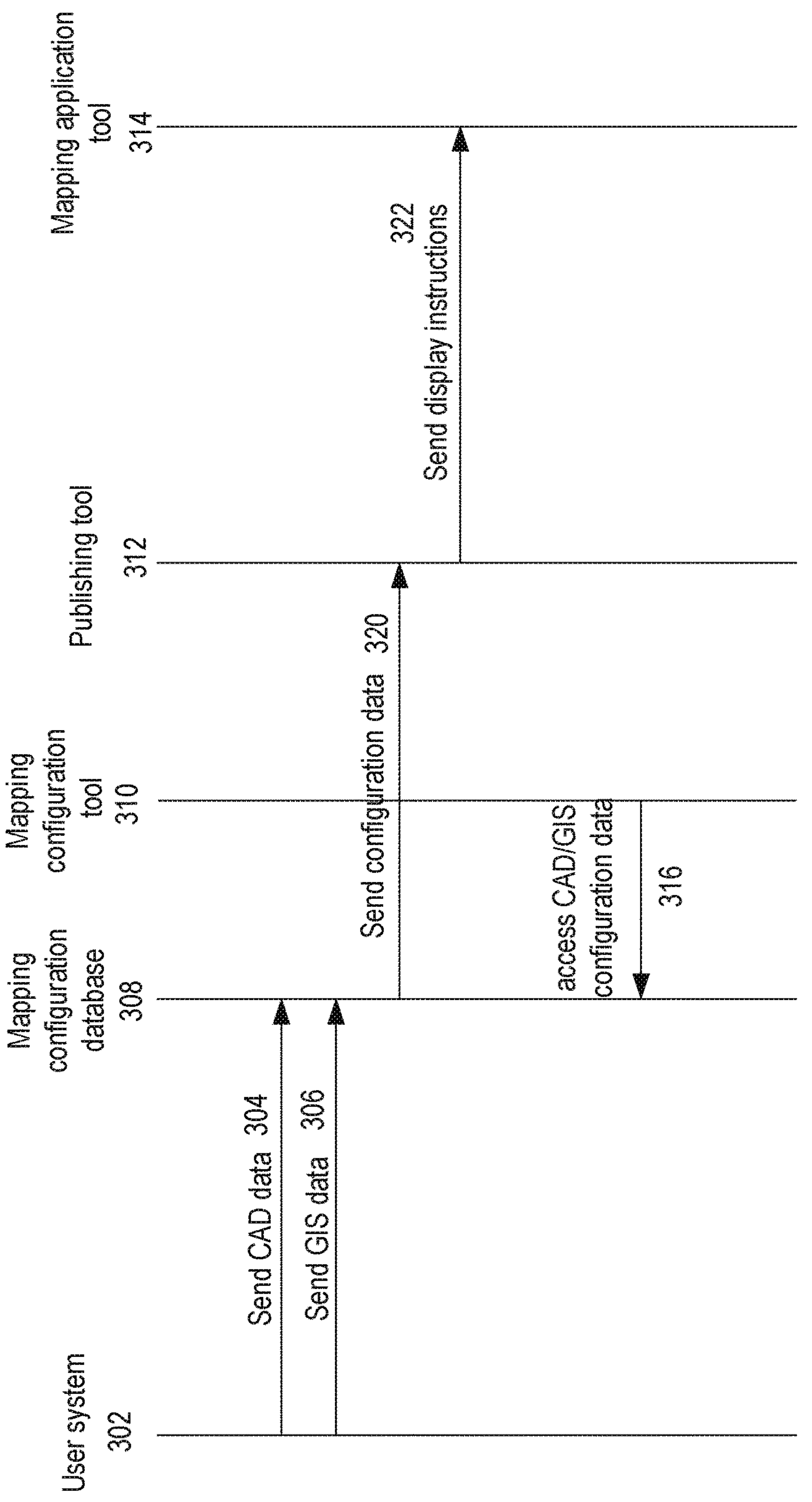
FIG. 4 is a representation of exemplary data flow, as described in exemplary embodiments.

By way of another non-limiting example, FIG. 4 is a representation 400 of exemplary data flow, as described in exemplary embodiments. With reference to FIG. 4, CAD data 304 and GIS data 306 may be sent from user system 302 to mapping configuration database 308. Mapping configuration database 308 may send configuration data to publishing tool 312. Mapping configuration tool 310 may allow user to access CAD data and/or GIS data 316 from mapping configuration database 308 and alter CAD data and/or GIS data from mapping configuration database 308. Mapping configuration database 308 may send configuration data 320 to publishing tool 312. Publishing tool 312 may send display instructions 322 to mapping application tool 314.

Figure 5:
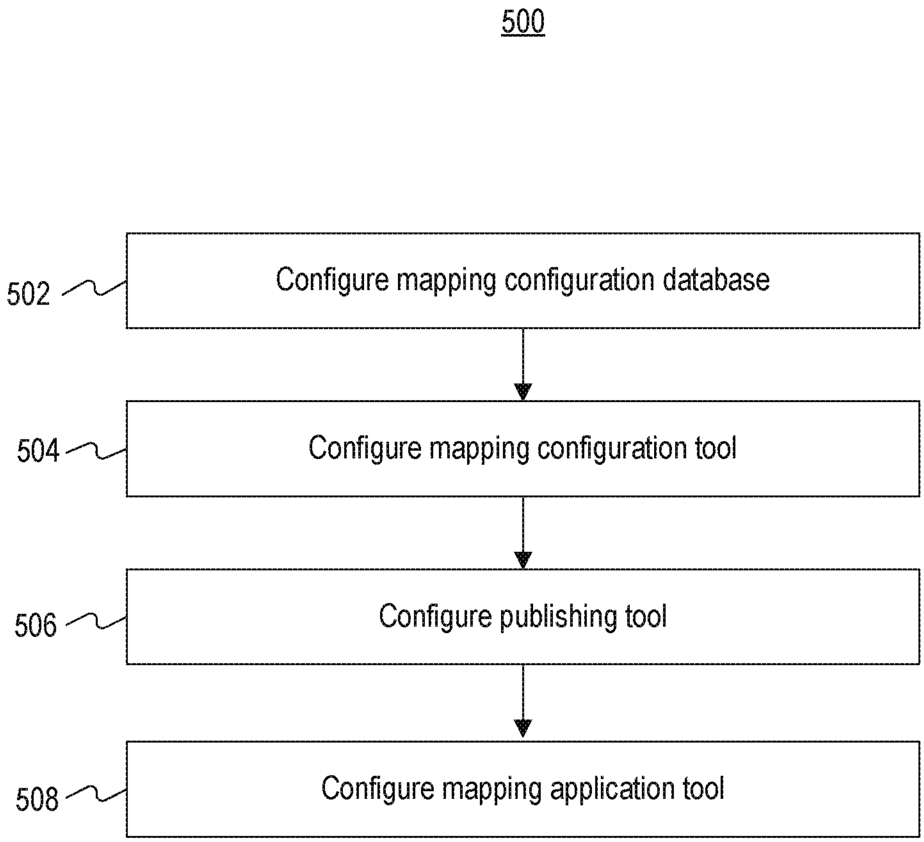
FIG. 5 is a representation of a first exemplary method for configuring a dynamic GUI, as described in exemplary embodiments.

By way of non-limiting example, FIG. 5 shows a first exemplary method 500 for configuring a dynamic GUI. In step 502, a processor may configure a mapping configuration database (e.g., mapping configuration database 308 as shown in FIG. 3). In step 504, a processor may configure a mapping configuration tool (e.g., mapping configuration tool 310 as shown in FIG. 3). In step 506, a processor may configure a publishing tool (e.g., publishing tool 312 as shown in FIG. 3). In step 508, a processor may configure a mapping application tool (e.g., mapping application tool 314 as shown in FIG. 3).

In some embodiments, step 502 may involve configuring database 308 in Microsoft SQL Server Management Studio. For example, a user may create a new mapping configuration database 308 with an SQL Server Management Studio. In certain embodiments, user may assign permission to other users, enabling the other users to run mapping configuration tool 310. In certain embodiments, the newly created database may be named "AdminConfig." Within the SQL Server Management Studio, the user may also select "Connect" to run the mapping configuration tool 310 by configuring a connection string.

Figure 6:
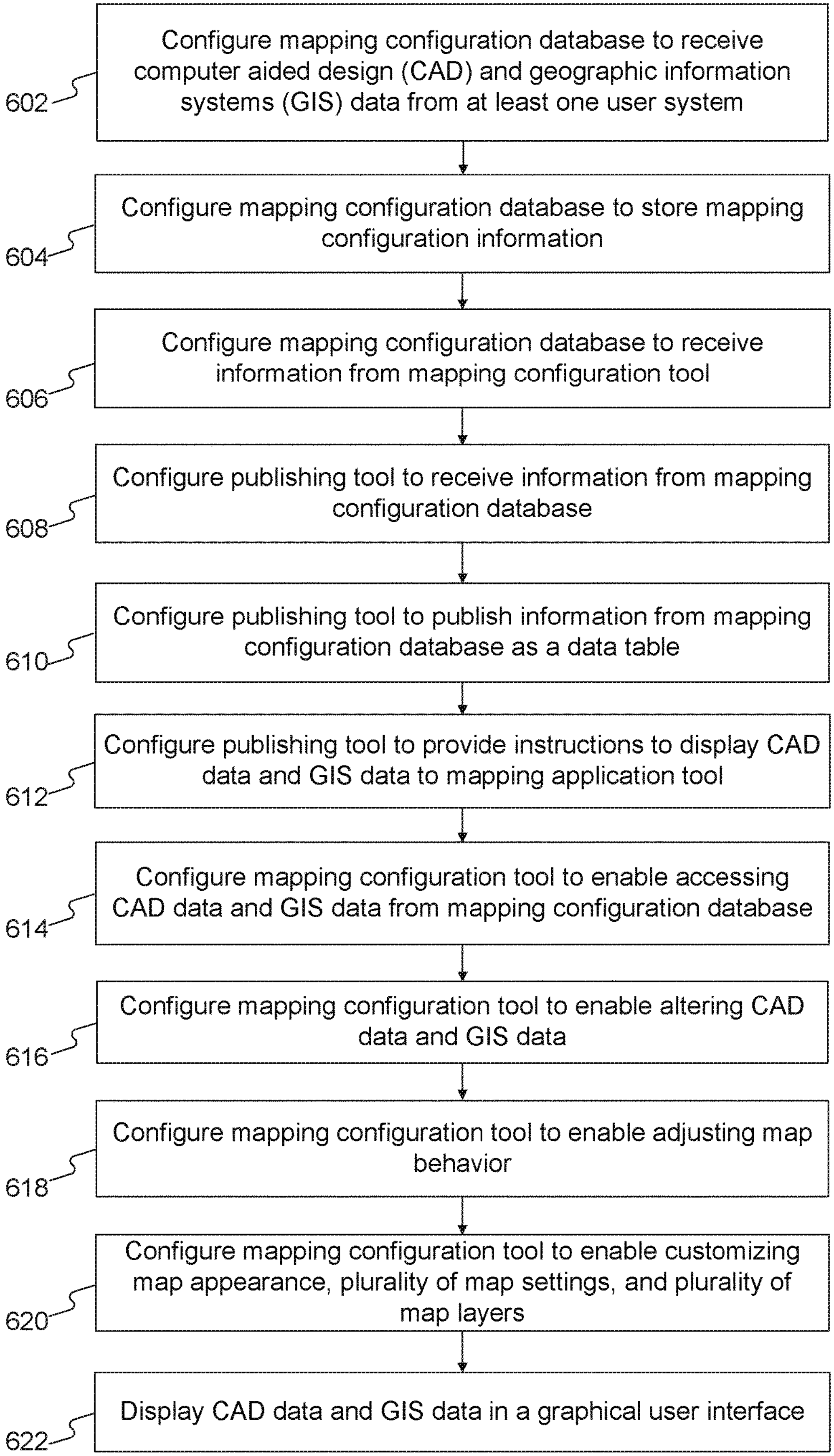
FIG. 6 is a representation of a second exemplary method for configuring a dynamic GUI, as described in exemplary embodiments.

By way of another non-limiting example, FIG. 6 shows a second exemplary method 600 for configuring a dynamic GUI. In step 602, a processor may configure mapping configuration database (e.g., mapping configuration database 308 as shown in FIG. 3) to receive computer aided dispatch (CAD) and geographic information systems (GIS) data (e.g., CAD data 304 and GIS data 306) from at least one user system 302. In step 604, a processor may configure mapping configuration database (e.g., mapping configuration database 308 as shown in FIG. 3) to store mapping configuration information. In step 606, a processor may configure mapping configuration database (e.g., mapping configuration database 308 as shown in FIG. 3) to receive information from the mapping configuration tool (e.g., mapping configuration tool 320 in FIG. 3). In step 608, a processor may configure publishing tool (e.g., publishing tool 312 in FIG. 3) to receive information from mapping configuration database (e.g., mapping configuration database 308 as shown in FIG. 3). In step 610, a processor may configure publishing tool to publish information from mapping configuration database (e.g., mapping configuration database 308 as shown in FIG. 3) as a data table. In step 612, a processor may configure publishing tool (e.g., publishing tool 312 in FIG. 3) to provide instructions to display CAD data and GIS data (e.g., CAD data 304 and GIS data 306 in FIG. 3) to mapping application tool (e.g., mapping application tool 314 in FIG. 3). In step 614, a processor may configure mapping configuration tool (e.g., mapping configuration tool 320 in FIG. 3) to enable accessing CAD data and GIS data (e.g., CAD data 304 and GIS data 306 in FIG. 3) from mapping configuration database (e.g., mapping configuration database 308 in FIG. 3). In step 616, a processor may configure mapping configuration tool (e.g., mapping configuration tool 320 in FIG. 3) to enable altering CAD data and GIS data (e.g., CAD data 304 and GIS data 306 in FIG. 3). In step 618, a processor may configure mapping configuration tool (e.g., mapping configuration tool 320 in FIG. 3) to enable adjusting map behavior. In step 620, processor may configure mapping configuration tool (e.g., mapping configuration tool 314 in FIG. 3) to enable customizing map appearance, plurality of map settings, and plurality of map layers. In step 622, processor may configure mapping application tool (e.g., mapping application tool 320 in FIG. 3) to enable displaying CAD data and GIS data (e.g., CAD data 304 and GIS data 306 in FIG. 3). For example, in step 622, a processor may provide instructions to display a graphical user interface with the CAD data and GIS data, as further discussed below in connection with FIGS. 14-20.

Disclosed embodiments may include a publishing tool configured to receive information from the mapping configuration database, publish information from the mapping configuration database as a data table, and provide instructions to display the CAD and GIS data to a mapping application tool. Publishing tool may allow users to publish and/or save settings for a select group and/or all groups. Group may refer to profiles with unique characteristics. Groups may have different access controls and/or settings. In certain embodiments, mapping configuration tool 310 (e.g., Configuration Tool) may publish to mapping configuration database 308 (Configuration Database) settings by using Workstation API. In some embodiments, user may select which group and/or groups to publish from a pop-up menu. The next time the map opens, the saved settings may be connected and/or appear for the selected group. Publishing tool 312 may be configured to publish information from mapping configuration database 308 into a data table. Data table may refer to a structure including columns, rows, and cells that contain specific values including information contained from mapping configuration database 308. Data table may be stored and updated as needed or automatically. Data table may be in XML format. An aspect of an embodiment of mapping configuration tool 310 may include a data table inside an Enterprise CAD database that stores XML to represent map settings, layers, etc. Systems and methods may pull from the data table to render mapping configuration information. Mapping application tool 314 may provide users access to the data and/or data table within mapping configuration database 308 to alter the data. For example, a user (e.g., call taker, dispatcher, supervisor) may change the way the map behaves to accommodate an agency's desired behavior. Publishing tool 312 may send instructions to mapping application tool 314 to display the CAD data and GIS data in a dashboard and/or other visual interface.

In some embodiments, the mapping application tool may update CAD data in response to map appearance customization. Updates CAD data in response to map appearance customization may refer to updating data in mapping configuration database 308 and/or data table being updated when a user alters CAD data and/or GIS data using mapping configuration tool 314. For example, a user may adjust a map setting (e.g., zoom out factor) which gets adjusted in the data table.

Figure 27:
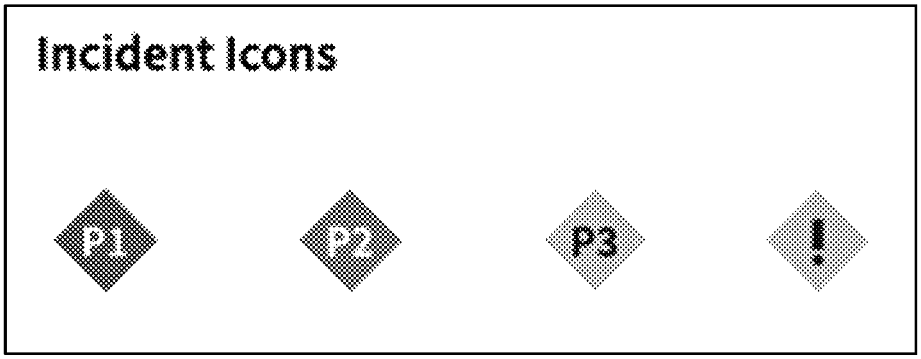
FIG. 27 is a representation of exemplary incident icons, as described in exemplary embodiments.

In some embodiments, the CAD data and GIS data may be displayed with a plurality of dynamic icons capable of displaying selected data for at least one of incidents, vehicles, or units. Dynamic icons may refer to active symbols and/or graphic representations on a screen that represent CAD data 302 and GIS data 306, may update regularly from the user system 302, and respond to user commands via mapping configuration tool 310. For example, dynamic icons may appear on a map corresponding to CAD data 304 and GIS data 306 information (e.g. new incident or unit). Further, each dynamic icon may be configured to have at least one of resource icon, agency icon, status ring, or dynamic directional arrow, and the dynamic icons being displayed within a specified geographic area. Resource icon may refer to a symbol that indicates particular personnel, teams, facilities, equipment, and/or supplies related to an agency (e.g, fire department, EMS services). For example, resource icons may depict specific to fire department, law enforcement and/or emergency medical services (EMS) vehicles and/or units. Non-limiting examples of fire department resource icons may include engines, inspectors, engines, and/or hazmat. Agency icon may refer to a symbol that indicates a particular division of government with a specific function offering a particular kind of assistance. Agency icons may depict a symbol specific to fire department, law enforcement, and/or EMS agencies. For example, flames may refer to fire department. Status ring may refer to a circle around an icon that indicates a particular state. For example, status ring color may indicate resource is on its way. Dynamic directional arrow may provide more detailed direction to where the unit and/or incident is occurring. For example, the dynamic directional arrow may point to a specific coordinate on the map where the resource is located. Specified geographic area may refer to a region defined by the user and/or region configured to display. This specified geographic area may correspond to, for example, a town, county, judicial jurisdiction, etc. End-users of embodiments of the disclosed GUI for dynamic maps may include call takers, dispatchers, and supervisors, for example within an emergency response call center. An aspect of an embodiment of the GUI for maps used in CAD systems may include "units" displayed as blue dots and "incidents" displayed as yellow dots. As shown in FIG. 27, incident icons may be displayed as red, orange, and yellow diamonds.

In some embodiments, the mapping configuration database may include a hover setting. The hover setting may be enabled when the user's mouse is over a dynamic icon for more than a predetermined time (e.g., 1 second) and no mouse button has been clicked. While hovering over an icon, additional details may display. For example, with a vehicle icon, vehicle type, status name, and agency name may display. When no mouse pointer is over a dynamic icon, the icon may be in the default state. Default state settings may be changed using the mapping configuration tool. In further embodiments, the mapping application tool may display the CAD and GIS data in a dashboard with the GUI. Dashboard may refer to a visual interface displaying various types of visual data in one place. Dashboard may be adjustable by user.

Disclosed embodiments may include mapping configuration tool which may be configured to enable users access to data (e.g., CAD data and GIS data) within the mapping configuration database, alter the CAD data and the GIS data, and adjust map behavior. Further, mapping configuration tool 310 may comprise GIS fields, where mapping configuration database 308 may enable users to customize map appearance, a plurality of map settings, and a plurality of map layers. GIS fields may refer to a property that can be assigned to any point or area of space to represent a quality, characteristic, and/or property of that point and/or area of space. For example, users may access data (e.g., CAD data and GIS data) and adjust settings such as zoom in factor, initial x/y location, and initial scale. Further, user may change the way the map behaves to accommodate the agency's desired behavior. Mapping configuration tool 310 may be compatible with a mapping configuration database 308 and other database artifacts in sync with the mapping configuration tool 310.

By way of non-limiting example, Table I below is a first table depicting exemplary online GIS map settings. Exemplary embodiments may include a field for "Map Settings Name," which is used to reference a unique group of map settings inside the mapping configuration tool. Further exemplary embodiments may include a "Zoom In Factor" which indicates the amount to zoom in on a double-click/mousewheel. For example, if the current map scale is 1:50,000, a value of 2 would indicate to zoom in to 1:25,000. Other exemplary embodiments may include a "Zoom Out Factor," which indicates an amount to zoom out on a double-click/mousewheel. For instance, if the map scale is 1:50,000, a value of 2 would indicate to zoom out to 1:100,000. Other exemplary embodiments may include a "Map Theme" setting, which contains the default colors of icons and text, such as Dark mode and Light mode. Exemplary embodiments may include "Initial Location X," "Initial Location Y," and "Initial Location Z," which respectively coordinate to the X, Y, and Z coordinate where the user wants the map to open. Other embodiments may include an "Initial Location WKID" which corresponds to a well-known ID matching the Initial Location coordinates. Still, other embodiments may include an "Initial Scale," through which a user may select an initial map scale used when the map first opens. Further exemplary embodiments may include a "Coordinate Zoom Scale" setting, corresponding to the map scale value when zooming to a coordinate. Exemplary embodiments may also include a "Master Map WKID" setting, corresponding to a master well-known ID for the map. If selected, all points on the map may be converted to this setting, which defaults to 3857—web Mercator. Exemplary embodiments may also include settings for "Minimum Scale" and "Maximum Scale," which respectively correspond to the minimal and maximum scale of how far the map is configured to zoom out. In such embodiments, if the user enters zero, there would be no restrictions. Exemplary embodiments may also provide a setting for "CAD Operational Layers Display Header Text," which is the text that the user wants to display for a CAD Operational Layers group, such group found in a layer list. Further embodiments may include a setting for "Locator URI," which is the URI for the designated location's data.

TABLE 1

First Exemplary GIS Map Settings

| Field | Description |
|---|---|
| Map Settings Name | Name used to reference a unique group of map settings inside of the mapping configuration tool. |
| Zoom In Factor | Amount to zoom in on a double-click/mousewheel. If the current map scale is 1:50,000, a value of 2 indicates to zoom in to 1:25,000. |
| Zoom Out Factor | Amount to zoom out on a double-click/mousewheel. If the current map scale is 1:50,000, a value of 2 indicates to zoomout to 1:100,000. |
| Map Theme | Setting that contains the default colors of icons and text, such as Dark mode and Light mode. |
| Initial Location X | X coordinate where you want the map to open. |
| Initial Location Y | Y coordinate where you want the map to open. |
| Initial Location Z | Z coordinate where you want the map to open. |
| Initial Location WKID | Well-known ID that matches the Initial Location coordinates. |
| Initial Scale | Display map scale when the map first opens. |
| Coordinate Zoom Scale | Map scale value when zooming to a coordinate. |
| Master Map WKID | Master well-known ID for the map. All points will be converted to this. This defaults to 3857—web mercator. |
| Minimum Scale | Minimum scale of how far the map can zoom out. If you enter 0, there are no restrictions. |
| Maximum Scale | Minimum scale of how far the map can zoom in. If you enter 0, there are no restrictions. |
| CAD Operational Layers Display Header Text | Text you want to display for the CAD Operational Layers group in the layer list. |
| Locator URI | URI for your location's data. |

Figure 32A:
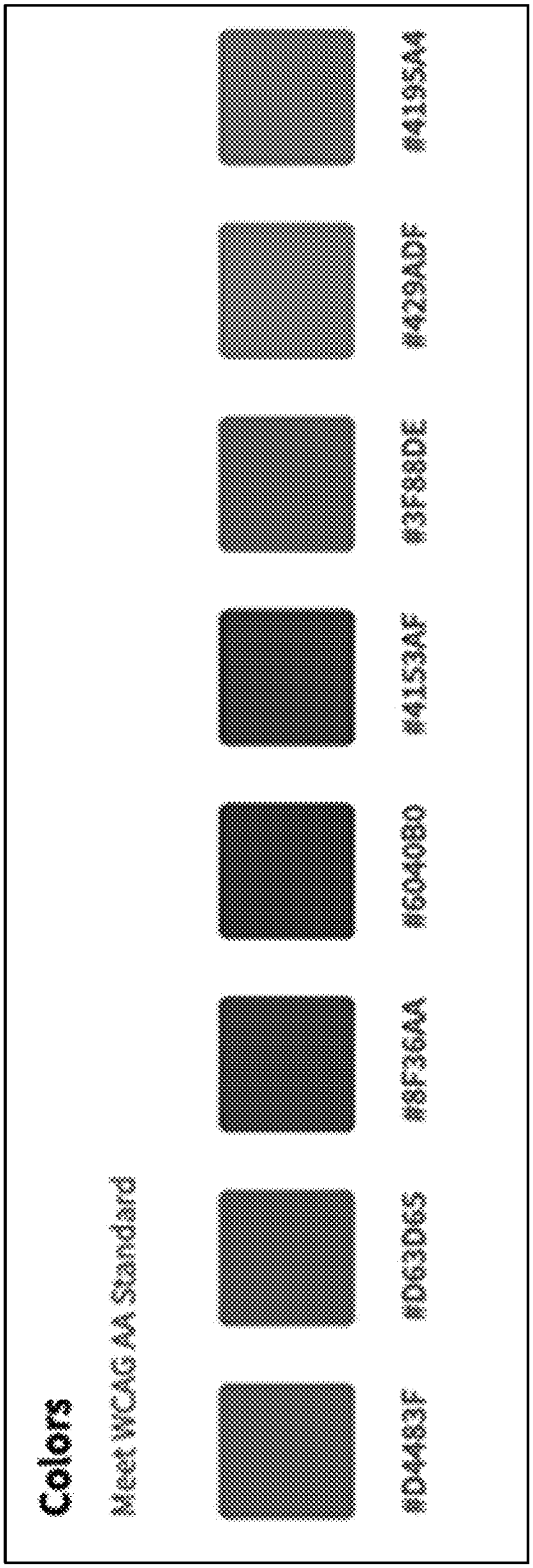
FIG. 32A depicts exemplary hexadecimal colors for use in configuring the appearance of incident, vehicle, and call icons, as described in exemplary embodiments.
Figure 32B:
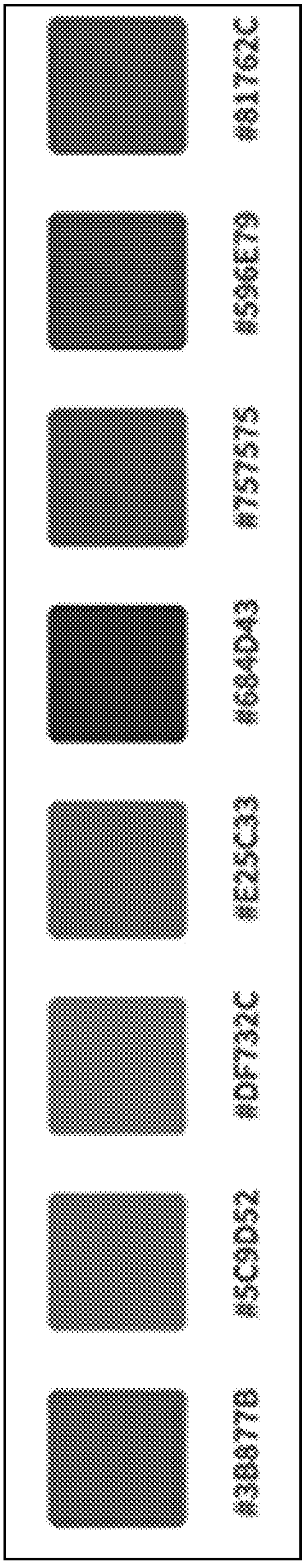
FIG. 32B depicts exemplary hexadecimal colors for use in configuring the appearance of incident, vehicle, and call icons, as described in exemplary embodiments.

By way of non-limiting example Table II below is a second table depicting other exemplary online GIS map settings. Exemplary embodiments may be configured to permit users to make mapping sketch tools visible on a "Tools menu," via selecting an "Enable Sketch Tools" field. Other exemplary embodiments may enable users to configure a map having different symbols for incidents and vehicles by selecting "Use Unique CAD Symbols" or another similar field. For example, certain embodiments may be configured to enable the map to display exemplary symbols as shown in FIGS. 21-23 and FIG. 29. Alternatively, embodiments may permit users to configure the map not to have unique symbols. Disclosed embodiments may also permit users to configure the map to have rotating vehicle symbols, these symbols rotating according to live-updated geospatial location data pulled from the CAD system(s). Disclosed embodiments may further permit users to specify the size of the dynamic icons (e.g., "Cad Graphic Size"). Still, other embodiments enable the user to customize the value used for the argument "tolerance" of online GIS MapView IdentifyGraphicsOverlayAsync method calls (e.g., "Identify Graphics Overlays Tolerance"). An aspect of an embodiment may be configured to enable users to select the default icons representing incidents, vehicles, and calls on the map display (e.g., via "Incident Default Icon," "Vehicle Default Icon," and "Call Default Icon" fields). Another aspect of an embodiment may be configured to enable users to customize the hexadecimal colors used to display incidents, vehicles, and calls on the map display (e.g., via "Incident Default Color Hex," "Vehicle Default Color Hex," "and "Call Default Color Hex" fields). Exemplary hexadecimal colors for use in configuring the appearance of incident, vehicle, and call icons are depicted in FIGS. 32A and 32B. Further embodiments may be configured to permit users to customize the value used for the argument "tolerance" of online GIS MapView IdentifyLayersOverlayAsync method calls (e.g., via an "Identify Layers Tolerance" field). Disclosed embodiments may also be configured to enable a user to customize the number of seconds to wait when hovering over an incident or vehicle before the callout appears (e.g., via a "Hover Callout Delay" field). Likewise, disclosed embodiments may be configured to enable a user to customize the number of seconds to wait when viewing the callout for an incident or vehicle before the callout disappears (e.g., via a "Callout Dismiss Delay" field). Also pertinent to configuration of incident display on the map, disclosed embodiments may enable the users to (a) name the column displayed about the incident when hovering ("Incident Label Column Name"); and (b) configure how close the map will zoom onto an incident when the user zooms on the incident from the command line ("Incident Zoom Scale").

TABLE 2

Second Exemplary GIS Map Settings

| Field | Description |
|---|---|
| Enable Sketch Tools | Whether you want the sketch tools to appear on the Tools menu. |
| Use Unique CAD Symbols | Whether you want to have different symbols for incidents and vehicles. Clear this is you do not want unique symbols. |
| Rotate Vehicles | Whether you want vehicles to rotate so you can see which direction they are moving. |
| Cad Graphic Size | Size you want for the icons. |
| Identify Graphics Overlays Tolerance | Value used for the argument "tolerance" of ESRI Map View IdentifyGraphicsOverlayAsync method calls. |
| Incident Default Icon | Default icon representing incidents on the map display. |
| Vehicle Default Icon | Default icon representing vehicles on the map display. |
| Call Default Icon | Default icon representing calls on the map display. |
| Incident Default Color Hex | Hexadecimal color you want to use to display incidents. |
| Vehicle Default Color Hex | Hexadecimal color you want to use to display vehicles. |
| Call Default Color Hex | Hexadecimal color you want to use to display calls. |
| Identify Layers Tolerance | Value used for the argument "tolerance of ESRI MapViewIdentifyLayersOverlayAsync method calls. |
| Hover Callout Delay | Number of seconds to wait when hovering over an incident or vehicle before the callout appears. |
| Callout Dismiss Delay | Number of seconds to wait when viewing the callout for an incident or vehicle before the callout disappears. |
| Incident Label Column Name | Name of the column you want to display about the incident when hovering. |
| Incident Zoom Scale | When you are zooming on the incident from the command line, this value determines how close the map zooms into that incident. |

Figure 7A:
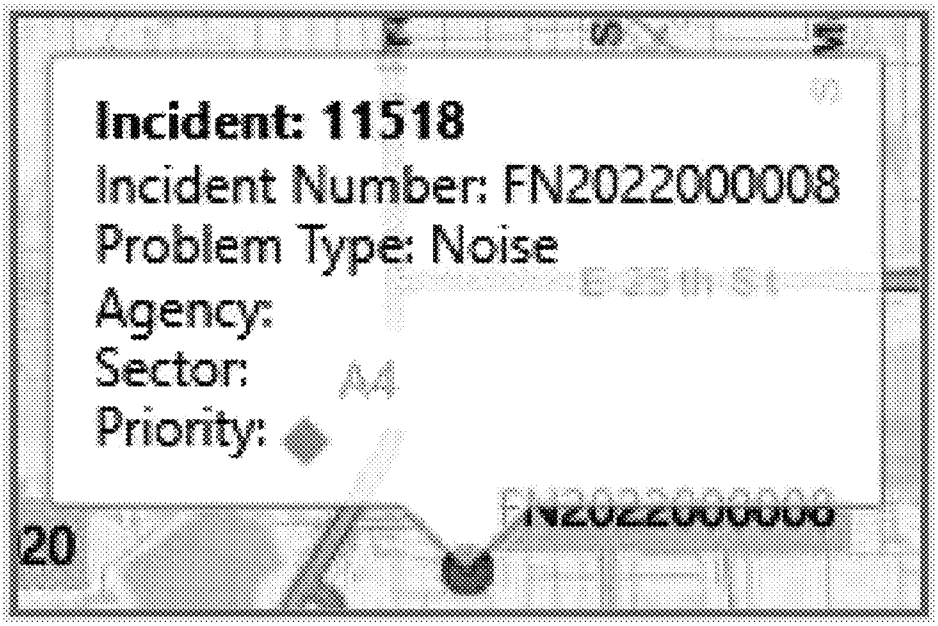
FIG. 7A is a representation of an exemplary Incident popup, as described in exemplary embodiments.

By way of non-limiting example, Table III below is a third table depicting exemplary online GIS map settings. As depicted in Table III disclosed embodiments may be configured to enable the user to customize the columns of information that appear on an "Incident popup." An exemplary "Incident popup" is shown in FIG. 7A. Notably, disclosed embodiments may be configured to display "Incident popups" when user hovers over incident icon displayed on map created by the systems and methods disclosed herein. For instance, as depicted in FIG. 7A, "Incident popup" may be configured to display columns including but not limited to: Incident Name, Incident Number, Problem Type, Agency, Sector, and Priority.

Certain disclosed embodiments map may also permit a user to configure the way vehicle icons are displayed on resulting map. For instance, and as depicted in Table III, an aspect of an embodiment of the present disclosure may be configured to enable users to: (a) name the column displayed about a vehicle when hovering ("Vehicle Label Column Name"); and (b) configure how close the map will zoom onto a vehicle when the user zooms on the incident from the command line ("Vehicle Zoom Scale").

TABLE III

Third Exemplary GIS Map Settings

| Field | Description |
|---|---|
| Incident Popup Template | Columns you want to appear when a user hovers over an incident. This is a hexadecimal string of file bytes converted using Framework.Managers.CustomTemplateManager.cs. This string is converted into the User Control that is shown when an .Framework.Helpers.HoverDtection.HoverEvent for the map is triggered by hovering the mouse over a map graphic (CADDataMapEntity) of type "Incident." This setting will be used when either of the following is true: The file in.Launcher \Customimizations\IncidentCallout.xami is not present. Custom TemplateManager.GetCalloutTemplate method is called with IgnoreCustomTemplateFile argument set to true. |
| Vehicle Label Column Name | Name of the column you want to display about the vehicle when hovering. |
| Vehicle Zoom Scale | When you are zooming on a vehicle from the command line, this value determines how close the map zooms into that vehicle. |

Figure 7B:
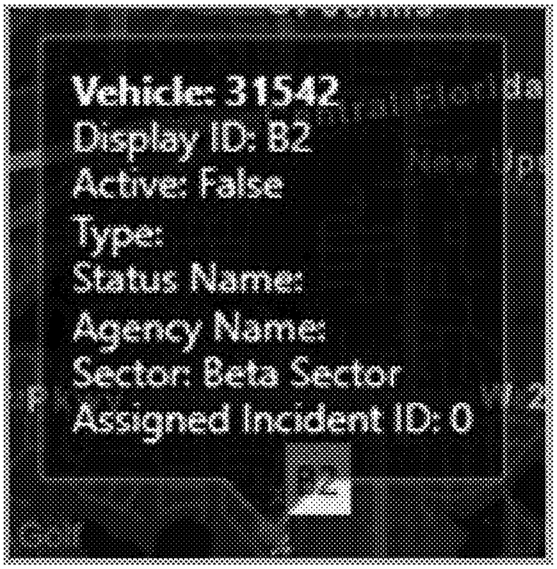
FIG. 7B is a representation of an exemplary Vehicle popup, as described in exemplary embodiments.

By way of non-limiting example, Table IV is a fourth table depicting exemplary online GIS map settings. As depicted in FIG. 7D, disclosed embodiments may be configured to enable the user to customize the columns of information that appear on a "Vehicle popup." An exemplary "Vehicle popup" is shown in FIG. 7B. Notably, disclosed embodiments may be configured to display "Vehicle popups" when a user hovers over vehicle icon displayed on map created by the systems and methods disclosed herein. For instance, as depicted in FIG. 7B, a "Vehicle popup" may be configured to display columns including but not limited to: Vehicle number, Display ID, Active/Inactive status, Type of vehicle, Status Name, Agency Name, Sector, and Assigned Incident ID.

TABLE IV

Fourth Exemplary GIS Map Settings

| Field | Description |
|---|---|
| Vehicle Popup | Columns you want to appear when a user hovers over a vehicle. This is a hexadecimal string of file bytes converted |

TABLE IV-continued

| Fourth Exemplary GIS Map Settings | |
|---|---|
| Field | Description |
| Template | using.Framework.Managers.CustomTemplateManager.cs. This string is converted into the UserControl that is shown when an.Framework.Helpers.HoverDetection.HoverEvent for the map is triggered by hovering the mouse over a map graphic (CADDataMapEntity) of type "Vehicle." This setting will be used when either of the following is true: The file in .Launcher \Customimizations\IncidentCallout.xami is not present. CustomTemplateManager.GetCalloutTemplate method is called with IgnoreCustomTemplateFile argument set to true. |
| Cluster Radius | Radius around a point to determine if it is in a cluster based upon unit/pixel density of the map (no direct relationship to feet, miles, etc.). Dependent on the scale of the map. |
| Merge Clusters | Whether you want to merge clusters that are close together or overlapping. |
| Cluster Graphic Size | Size of the graphic that identifies a cluster of incidents or vehicles. |
| Cluster Unique Colors | Whether you want to use different colors to identify a cluster of incidents or a cluster of vehicles. |

TABLE V

| Fifth Exemplary GIS Map Settings | |
|---|---|
| Field | Description |
| Cluster Default Color Hex | Hexadecimal color you want to use to display a cluster. |
| Cluster Vehicle Only Color Hex | Hexadecimal color you want to use to display a cluster that contains only vehicles. |
| Cluster Incident Only Color Hex | Hexadecimal color you want to use to display a cluster that contains only incidents. |

Figure 28:
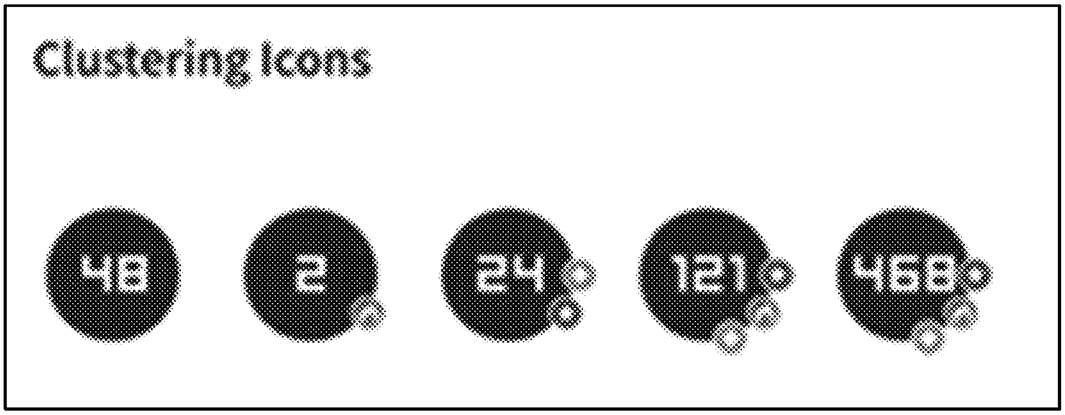
FIG. 28 is a representation of exemplary clustering icons, as described in exemplary embodiments.

Other exemplary online GIS map settings contained within the disclosed embodiments may enable user to configure the way "clusters" of incident and/or vehicle icons are displayed on map. Clustering may be enabled based on the zoom level and proximity of incidents and/or units. These exemplary online GIS map settings are described in Tables IV and V. For instance, an aspect of a disclosed embodiment may be configured to permit user to select and to merge clusters that are close together or overlapping (e.g., via "Merge Clusters" field). Another aspect of an embodiment may be configured to enable a user to specify the size of a graphic identifying a cluster of incidents, and/or vehicle icons. A further aspect of an embodiment may be configured to enable user to select an option to use different colors to identify cluster of incidents or cluster of vehicles. Likewise, another aspect of an embodiment may be configured to permit users to select (a) a default color for displaying all clusters; (b) a separate default color for displaying a cluster containing only vehicles; and (c) a separate default color for displaying a cluster containing only incidents. Exemplary representations of clustering icons are shown in FIG. 28, which are labelled by a computer-generated number, representing the amount of incidents and/or units in an area. For example, clustering icon may be labelled with "48" incidents and/or icons. Further, the clustering icon may show an agency label depicting how many of a particular resource are clustered in the area.

In some embodiments, the mapping configuration database may include a setting for enabling users to add map layers. Map layers may include a basemap layer, a CAD operational layer, and an operational layer. Map layers may function to apply a visual layer of data over the map and may be enabled and/or disabled. Basemap layer may refer to a reference map to overlay data from layers and visualize geographic information. Basemap layers may consist of multiple feature, raster, or web layers. For example, basemap layer may provide overall context to the map by including geographic features such as boundaries, streets, cities, and place names. Operational layers may be placed on top of the basemap layer. Independent from the basemap, operational layers may be interactive and provide further context to a geographical region. Information presented in a CAD operational layer may come from the CAD data 304 in the mapping configuration database 308. For example, CAD operational layer may include dynamic icon information (e.g., agency, resource). Information presented in an operational layer may come from external offline data or data from public sources and/or other agencies nearby. For example, operational layer may include online Environmental Systems Research Institute (ESRI) information and/or weather data. In some embodiments, each map layer may be configured to be online or offline. Online layers may provide the most up-to-date data. CAD data that changes frequently (e.g., weather information, unit/incident information) may be updated in real-time with online layers. Offline layers may be used for data that does not change or update frequently. For example, offline layers may include parcel record, public works asset, fire hydrant, light pole, and traffic signal information.

Figure 8A:
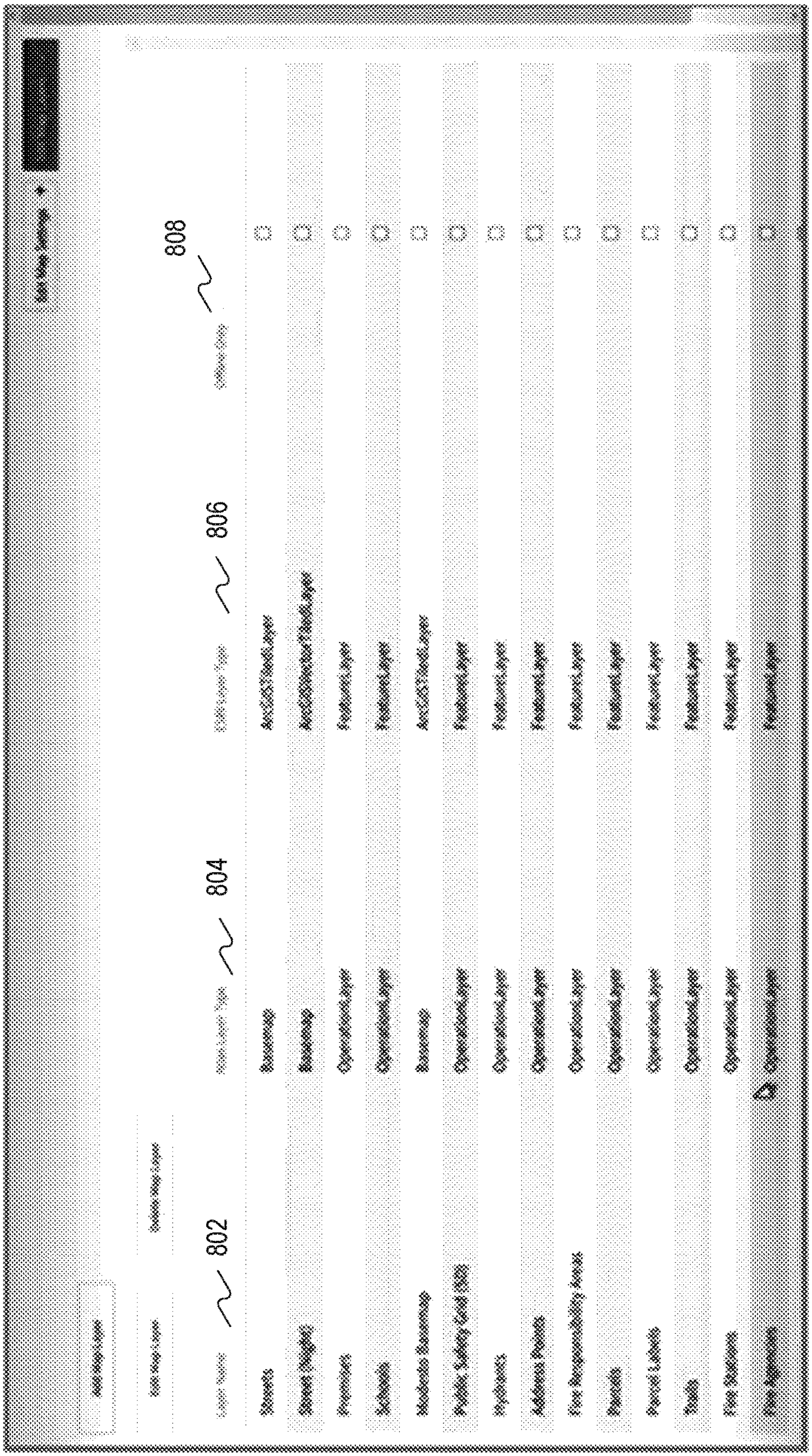
FIG. 8A is a representation of an exemplary list of map layers, as described in exemplary embodiments.

By way of non-limiting example, FIG. 8A is a representation of an exemplary list of map layers 800A. Disclosed embodiments may be configured to enable user to add and/or edit map layers through accessing the list of map layers 800A. In certain embodiments of the present disclosure, the user may select and edit layers e.g. (Layer Name 802, Layer Type 804, ESRI Layer Type 806, and designate the layer is "Offline Only" 808). Further, the layer may be named 802. For example, an OperationalLayer may be "Hydrants" or "Streets." The Layer Type may be a Basemap, CAD operational layer, and/or OperationLayer. In some embodiments, the user may select "Offline Only" 808 to designate if a particular layer is offline. In other embodiments, for a map to be online, the user may select "online" and enter the URL of the map layer they wish to use, and then select "Validate" to make sure the map is reachable. In some embodiments, for a map to be offline, the user may select "offline" and enter the path of the map layer they wish to use.

Figure 8B:
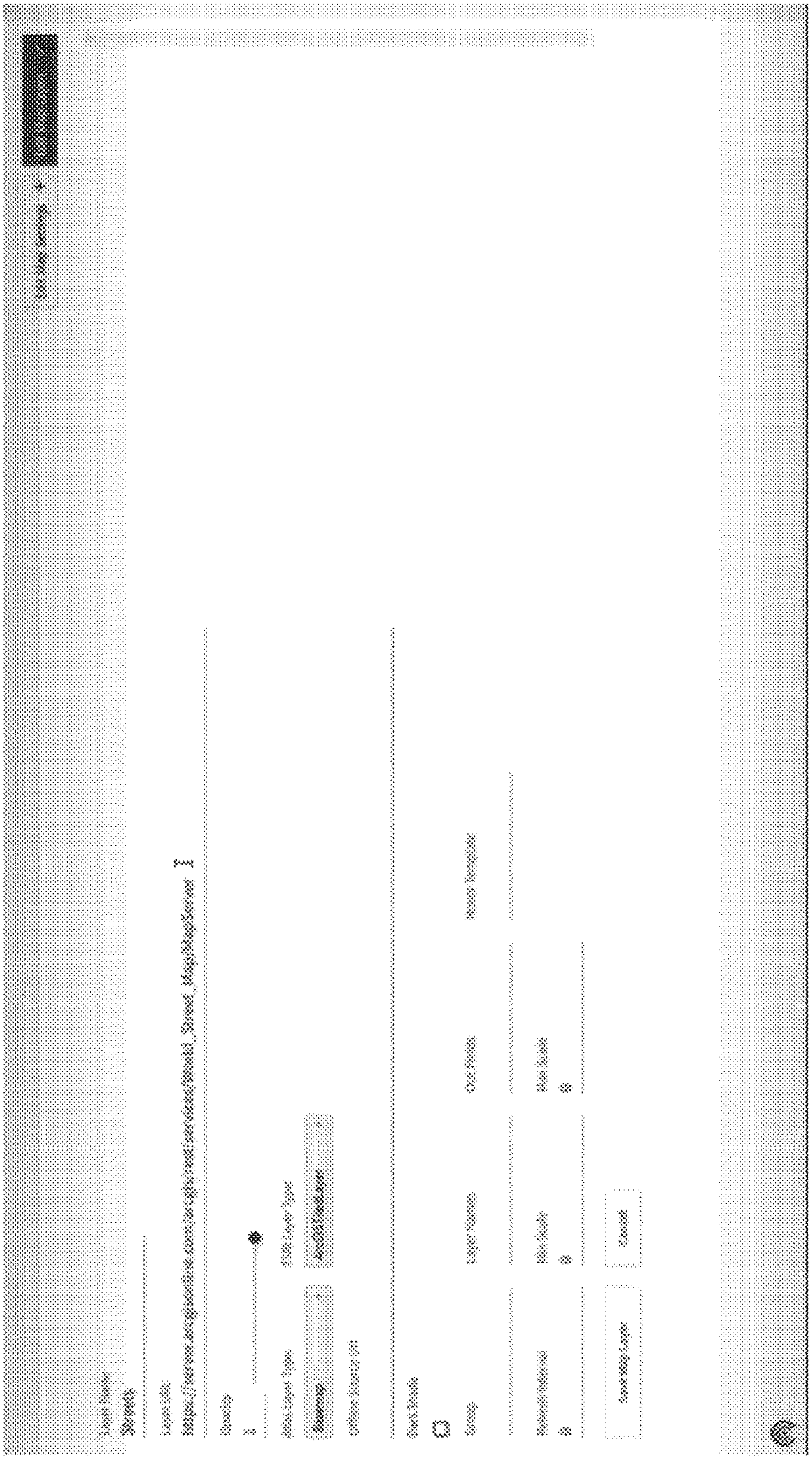
FIG. 8B is a representation of an exemplary computer-implemented GUI for editing map layer settings, as described in exemplary embodiments.

FIG. 8B is a representation of an exemplary computer-implemented GUI for editing map layer settings 800B. An embodiment of the present computer-implemented GUI for editing map layer settings may be configured to enable a user to, after designating a layer as "online" or "offline," complete the following: (a) name the layer (e.g., "Layer Name"); (b) view the layer URL if online (e.g., "Layer URL"); (c) designate opacity of the layer (e.g., "Opacity"); (d) designate the layer types (e.g., "Layer Type", "ESRI Layer Type") (f) view the layer path if offline (e.g., "Offline Source URL"); (g) select whether they want the layer to display in Dark mode (e.g, "Dark Mode"); (h) specify a layer group name (e.g., "Group"); (i) specify layer names (e.g, "Layer Names"); (j) specify "out fields" that should be included when querying a map service layer (e.g, "Out Fields"); (k) customize a "hover template" that is separately configured to direct what a layer would render in a hover over its features on the map (e.g., "Hover Template"); (l) enter a "refresh interval" equal to the value in seconds for how often the user wants the layer to refresh by checking for updates via the CAD system (e.g., "Refresh Interval"); and (m) enter minimum and maximum scales at which the layer is visible (e.g, "Min. Scale" and "Max Scale"). The GUI may be further configured to permit the user to select options to "Save Map Layer" and "Edit Map Layers."

In some embodiments, mapping configuration database customizes the appearance of CAD data on a map with data transforms. Data transforms may refer to a way of converting, cleaning, and/or structuring data. Table VI below displays an exemplary list of data transforms. Non-limiting examples of data transforms may include entity type, entity column, operator, matching value, modified column, modified value, is active, and sort order.

TABLE VI

Exemplary Data Transforms

| Field | Description |
|---|---|
| Entity Type | Select the type of entity, such as Incident or Vehicle. In a future release, you will also be able to select Radio. |
| Entity Column | Select the CAD column you want to look for in the data. |
| Operator | Select whether you want the information in the column you selected above to equal, not equal, match regardless of case sensitivity, contain, be greater than, or less than the value you enter in the Matching Value field. |
| Matching Value | Enter the CAD value you want to look for in the column. |
| Modified Column | Enter the name you want to use for the column you entered in the Entity Column field. |
| Modified Value | Enter the value you want to use for value you entered in the Matching Value field, such as the icon you want to appear for this value. |
| Is Active | Select whether you want this setting to be active. |
| Sort Order | Enter the priority of this setting. This determines the order in which map applies the settings. You can enter 0 for the highest priority up to 255 for the lowest priority. |

Figure 9A:
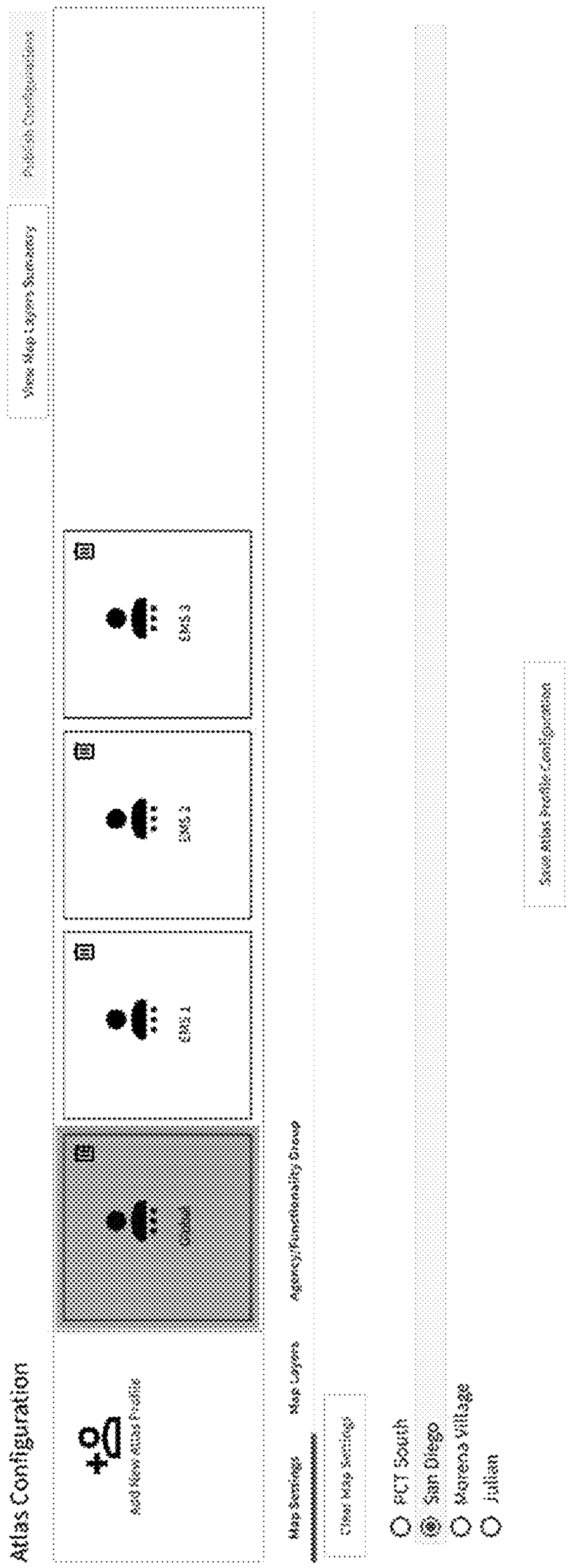
FIG. 9A is a representation of an exemplary computer-implemented GUI for editing map settings and/or selecting map settings for application to a specific map profile, as described in exemplary embodiments.
Figure 9B:
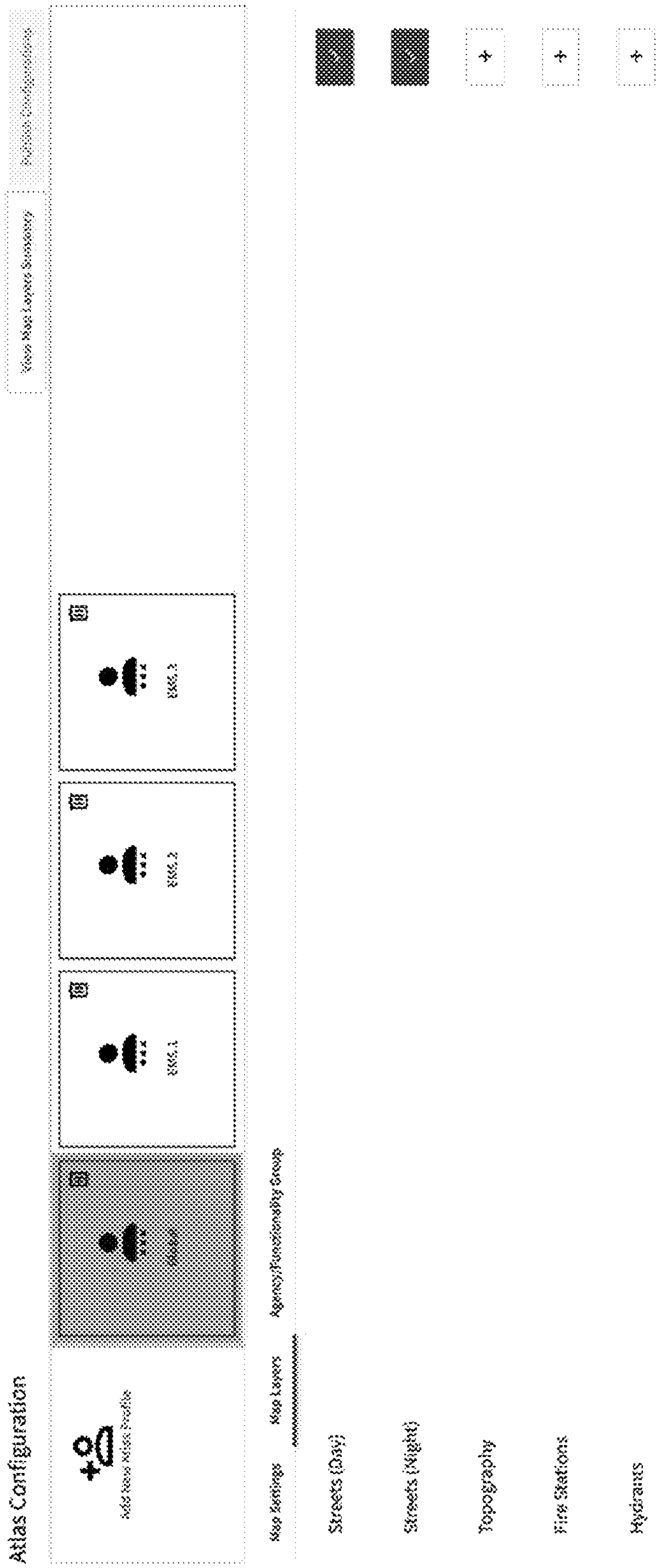
FIG. 9B is a representation of an exemplary computer-implemented GUI for designating certain map layers as visible for specified user groups, as described in exemplary embodiments.
Figure 9C:
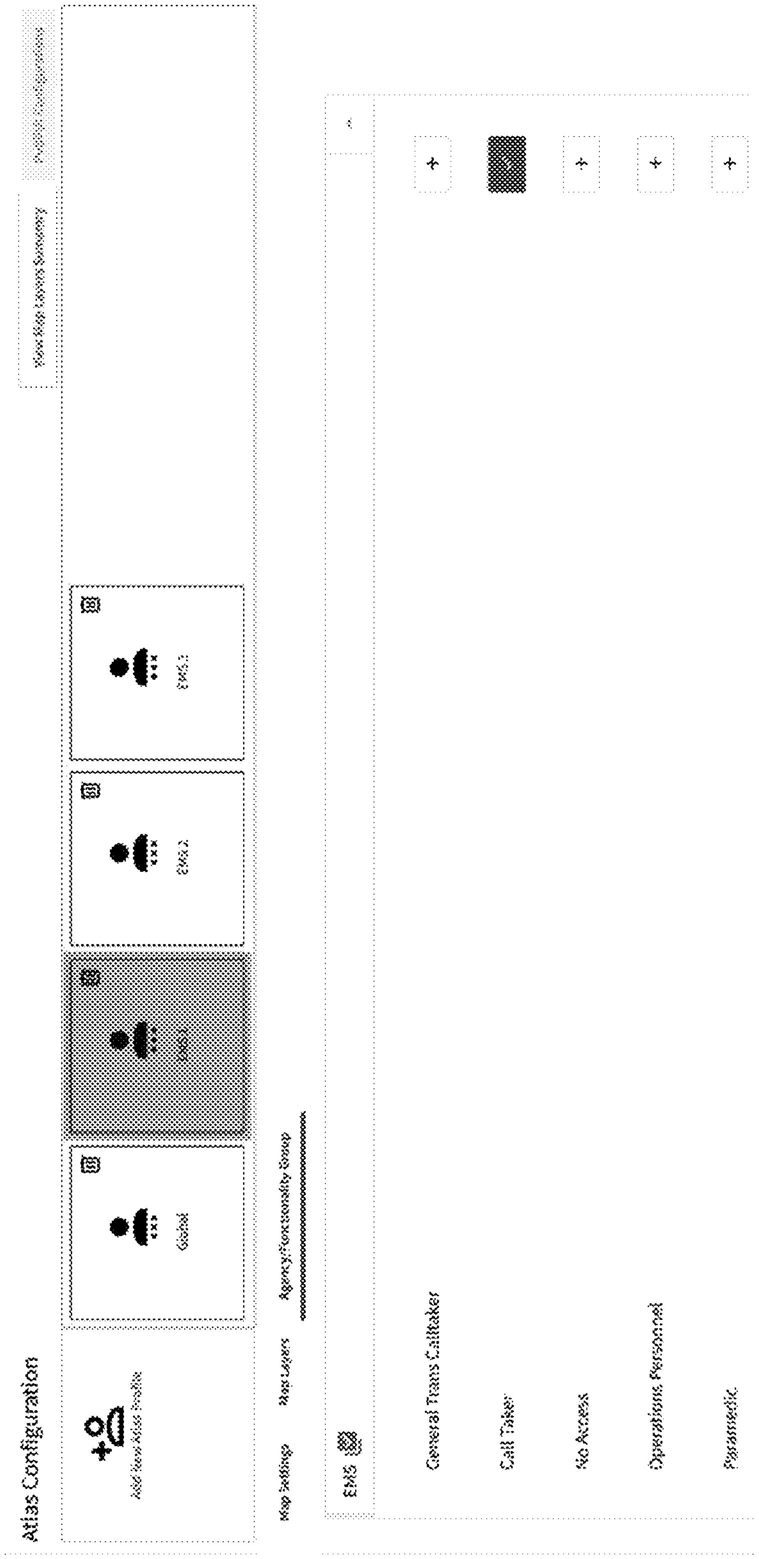
FIG. 9C is a representation of an exemplary computer-implemented GUI for selecting a group type to assign to a particular user group, as described in exemplary embodiments.
Figure 9D:
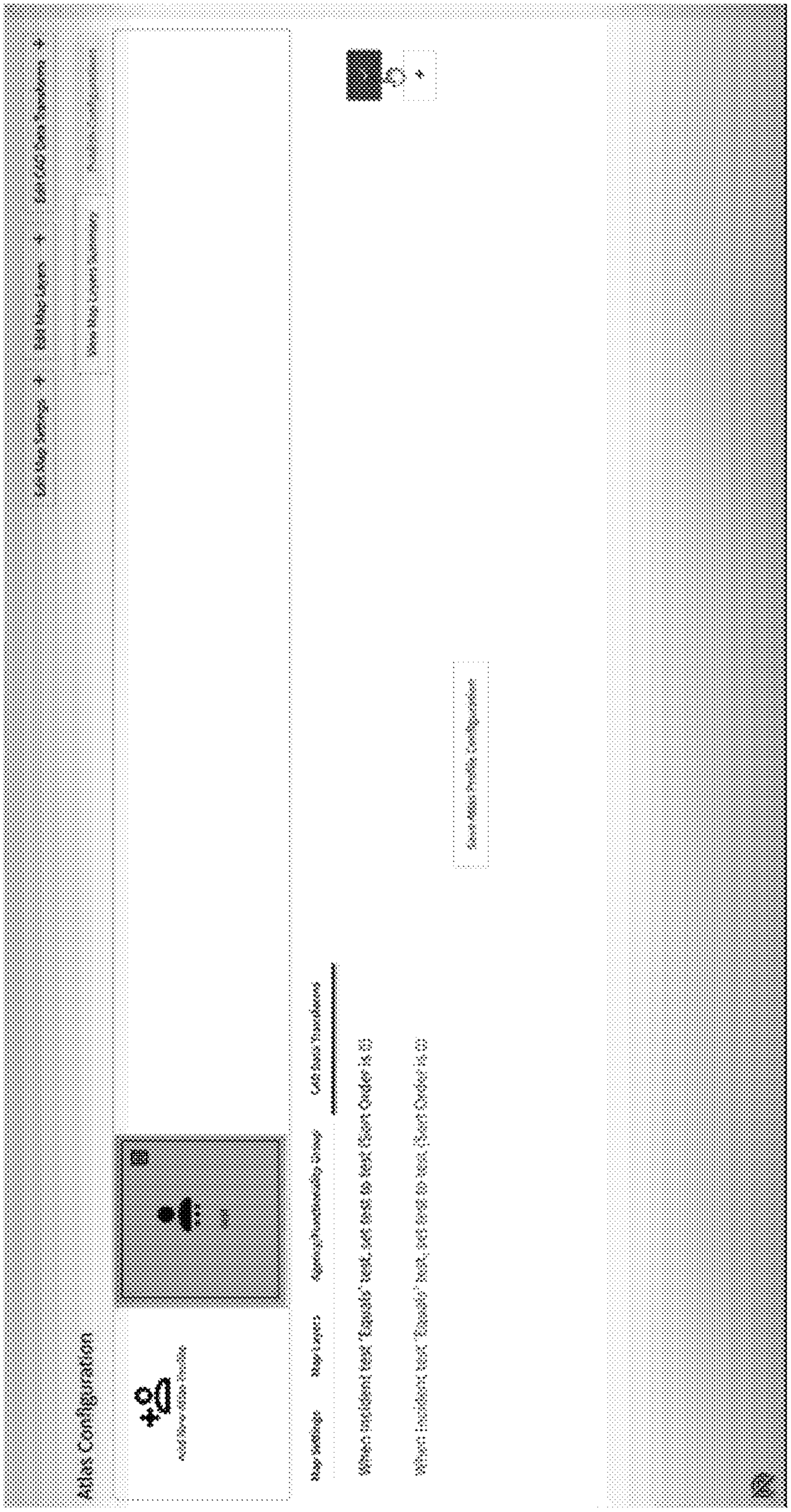
FIG. 9D is a representation of an exemplary computer-implemented GUI for selecting criteria that apply to a specified map profile, as described in exemplary embodiments.

By way of non-limiting example, in FIG. 9D, the GUI may be configured to permit the user to select "Edit CAD Data Transforms;" "Add New CAD Data Transforms;" and then select from a variety of enumerated fields corresponding to Data Transforms. Table VI above is a table depicting a list of exemplary data transforms a user may use to customize the appearance of data on a map. For instance, disclosed embodiments may be configured to enable a user to select an "Entity Type," corresponding to the type of entity (e.g., Incident, Vehicle, and/or Radio). Disclosed embodiments may be further configured to permit the user to select an "Entity Column," corresponding to the CAD column they wish to look for in the data. Certain embodiments may be configured to permit the user to enter a "Matching Value," which may refer to the CAD value the user wants to look for in the column. In various embodiments, the user may select an "Operator" that may be configured to filter for information that is equal, not equal, contain, be greater or less than, or match regardless of case sensitivity, to the value entered in the "Matching Value" field. Further embodiments may be configured to include a field "Modified Column" in which the user may enter the name they wish to use for the column specified in the "Entity Column" field.

Additionally or alternatively, certain embodiments may be configured to include a "Modified Value" field in which the user may enter a second value that they want to use for the "Matching Value," such as an icon that the user wants to appear for that value. Certain embodiments may further be configured to allow the user to activate an "Is Active" setting. Certain embodiments may also be configured to include a "Sort Order" field, which may enable the user to designate the order in which the map applies the specified settings. In certain embodiments, user may enter 0 for the highest priority and up to 255 for the lowest priority. The disclosed embodiments may be further configured to permit the user to select to save the data transforms.

The mapping configuration database may also be configured to add one or more profiles. Profiles may refer to groups and/or end users. FIG. 9A is a representation of an exemplary computer-implemented GUI for editing map settings and/or selecting map settings, map layers, and agency/functionality groups for application to a specific map profile. By way of non-limiting example, in FIG. 9A, mapping configuration database may add "New Profiles." For example, profiles may include "Global," "EMS 1," "EMS 2," and "EMS 3." The current profile being used may be highlighted (e.g., Global). In some embodiments, users may create a new profile based on the settings of an existing profile. For example, user may select a group, copy and/or clone the group's settings, and a create a new profile configured with the same settings. The user may further customize and/or change the settings of the copied profile if desired. In certain embodiments, mapping profiles may be configured to represent a collection of map layers, map settings, and agency/functionality groups, which in turn may be used to configure the map. Certain disclosed embodiments may be configured to permit the user to name the profile, e.g., "Fire," and to select settings to be applied to the profile. Further, the mapping configuration database may also be configured to permit the user to select and/or adjust map settings, map layers, and agency/functionality group. The user may view "Map Settings," "Map Layers," and "Agency/Functionality Group." The user may select various map settings (e.g., "San Diego"). The user may "Save Profile Configuration."

FIG. 9B is a representation of an exemplary computer-implemented GUI for designating certain map layers as visible for specified user groups. For instance, as depicted in FIG. 9B, user may select map layers such as, but not limited to, "Streets (Day)," "Streets (Night)," "Topography," "Fire Stations," and "Hydrants" for display on the map.

FIG. 9C is a representation of an exemplary computer-implemented GUI for selecting a group type to assign to a particular user group. For instance, as depicted in FIG. 9C, user may select from a list of "Agency/Functionality Groups" such as, but not limited to "General Trans Call-taker" "Call Taker", "No Access", "Operational Personnel," "Paramedic" according to the type of agency, such as EMS.

Certain embodiments may be configured to enable a user to select from listed CAD Data Transformations. For instance, FIG. 9D is a representation of an exemplary computer-implemented GUI for selecting CAD Data Transformations to be applied to specified map profile. For instance, as depicted in FIG. 9D, user may select from "CAD Data Transforms," such as "When Incident test 'Equals' test, set test to test (Sort Order is 0)" or "When Incident test 'Equals' test, set test to test (Sort Order is 0)." Disclosed embodiments may enable user to save profile configuration and publish selected settings for each group—e.g., to enable the selected settings to be viewable on the map interface.

Disclosed embodiments may be configured to display a map window with a number of areas, for example: (1) a ribbon bar, (2) a work area, (3) a layer list; (4) a status bar; and (5) a details panel. Further embodiments may be configured to display other additional areas in the map window. Likewise, other embodiments may be configured to display fewer areas. Importantly, disclosed embodiments of the map window may be configured to use functionality ordinarily present in virtual maps, such as: (a) clicking and dragging to see other parts of the map; (b) zooming in and out using the scroll function on a mouse or trackpad; (c) zooming in and out using + and − buttons in the lower right corner of the map; and (d) zooming to a particular area by pressing the left shift key and clicking and dragging the area that the end-user desires to zoom into.

Figure 10:
FIG. 10 is a representation of an exemplary computer-implemented GUI for viewing a summary of configured map layers, as described in exemplary embodiments.

By way of non-limiting example, disclosed embodiments may be configured to enable user to view a summary of map layers assigned to a profile by: (1) selecting a profile; (2) selecting to view a map layers summary; and (3) selecting a group for which the user wants to see layer lists. For example, FIG. 10 is a representation of an exemplary computer-implemented GUI for viewing a summary of configured map layers. In some embodiments, the plurality of map layers may include a basemap and operational layers. In some embodiments, the GUI may depict a "Configured Map Layers Summary" 1000. Profile summaries may list and include information about map layers for each profile. By way of non-limiting example, in FIG. 10, the "Global" profile summary 1002 may include "Streets (Day)" and "Streets (Night)" layers. The "EMS 1" profile summary 1004 may include "Address Points," "Streets (Day)," and "Streets (Night)" layers. The "EMS 2" profile summary 1006 may also include map layer information. An aspect of an embodiment may enable the user to close the summary of map layers when done viewing.

Figure 11A:
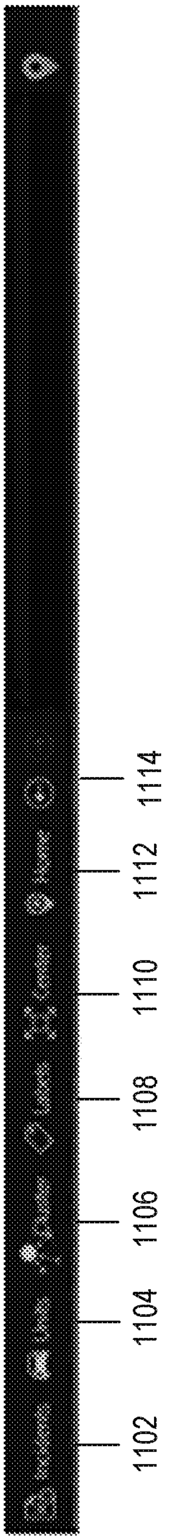
FIG. 11A is a representation of an aspect of an exemplary computer-implemented GUI for displaying icons on a map, as described in exemplary embodiments.

FIG. 11A is a representation of an aspect of an exemplary computer-implemented GUI for displaying icons on a dynamic map. More specifically, FIG. 11A is an exemplary representation of a ribbon bar and may display icons for changing what appears on the dynamic map—for instance, incidents, units, cluster, labels, center, home, forward and backward arrows, and a search feature. Disclosed embodiments may display text and/or pictorial icons for the ribbon bar. To toggle the display of incidents on and off, user may select the "Incidents" option 1102. To toggle the display of units on and off, user may select the "Units" option 1104. To cluster a group of incidents or units, user may select the "Cluster" option 1106. In some embodiments, when the user selects the "Cluster" button, the dynamic map may group closely located incidents and units and mark them with a number that indicates the number of incidents and units and marks them with a number that indicates the number of incidents and units within that cluster. As the user zooms in and out, the clusters may recalculate. To toggle the display of labels on and off, user may select the "Labels" option 1108. To center the map so everything can be seen on the map, user may select "Center" option 1110. To return to the original map positioning, user may select the "Home" option 1112. To go back to the previous display of the map, user may select arrow 1114. Some embodiments may further include a search option and/or bar where the user may search for something on the map. For example, user may search for a location, unit, unit number, incident, incident number. The location, unit, or incident searched for may appear in the center of the map with a pin.

Figure 11B:
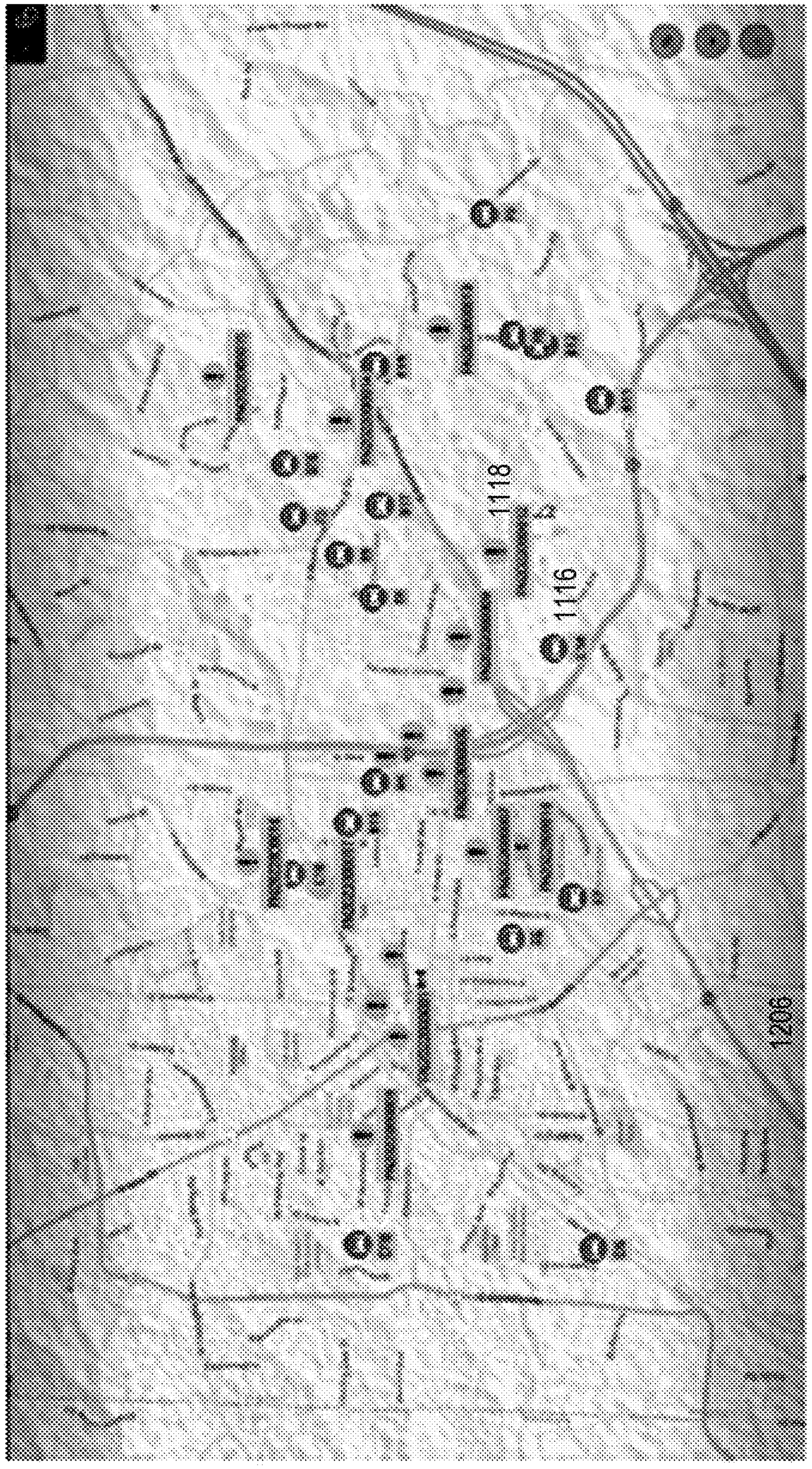
FIG. 11B is a representation of an exemplary computer-implemented GUI for a map that displays icons representing incidents and units, as described in exemplary embodiments.

FIG. 11B is a representation 1100B of an aspect of an exemplary computer-implemented GUI for a dynamic map that displays icons representing incidents and units. FIG. 11B is an exemplary representation of a work area configured to display the dynamic map itself along with a plurality of dynamic icons representing incidents and units, along with any specified CAD or GIS data. For instance, FIG. 11B displays a plurality of blue vehicle icons 1116 and yellow incident icons 1118 on the basemap. Alternatively, or in addition, FIG. 27 is a representation of exemplary incident icons. For example, incident icons may be labelled with a user-inputted or computer-generated name such as "P1," "P2," "P3," or a symbol such as "!." Further, as shown in FIG. 11B, dynamic map may be configured to include street names, lakes, and freeways.

Figure 11C:
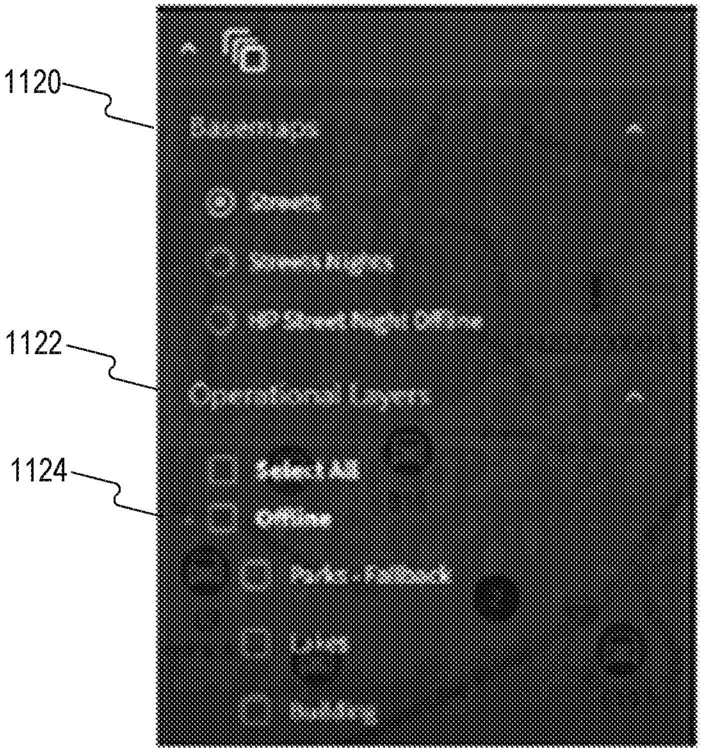
FIG. 11C is a representation of an exemplary computer-implemented GUI enabling users to select various basemaps and operational layers, as described in exemplary embodiments.

FIG. 11C is a representation of an exemplary computer-implemented GUI enabling users to select various basemaps 1120 and operational layers 1122. For example, basemaps 1120 may include "Streets" and "Street Nights." Offline operational layers 1124 may include "Parks" "Lakes," and "Building." In some embodiments, user may also "Select All" basemaps and/or operational layers. In some embodiments, FIG. 11C is an exemplary representation of a layer list configured to enable an end-user to select to bring in additional CAD and GIS data, such as data from other agencies, to display on the map. In various disclosed embodiments, operational layers may be configured to use information from the mapping configuration database (e.g., CAD database). GIS data may include additional support data to the incidents and units that end-users may view. The layers for GIS data may be offline data, online data, and/or data from public sources or other nearby agencies, such as online GIS information and weather data. The selected basemaps and operational layers may dictate which layers are visible on the dynamic map.

Importantly, certain embodiments disclosed herein may enable an end-user to configure the map window to a great extent. Some disclosed embodiments may be configured to enable an end-user to change: (a) the base layer of the map; (b) icons and colors for incidents and units to identify statuses, types of units or incidents, and priority; (c) identifier information for incidents and units; (d) texts that appears when an end-user hovers over an incident or unit; (e) color of cluster icons based on the types of incidents or units within the cluster such as one color for only incidents, another color for only units, and a third color for a cluster that has both incidents and units; (f) the ability to rotate icons to see directional travel data for units. Disclosed embodiments may be further configured to enable the end-user to center the map, for example by selecting "center" on the ribbon bar (e.g., ribbon bar 1100 as shown in FIG. 11A); to enable the end-user to return to the original map positioning, for example by selecting "home" on the ribbon bar (e.g., ribbon bar 1100 as shown in FIG. 11A); and to enable the end-user to view previous or next displays of the map, for example by selecting a "back arrow" or "forward arrow" on the ribbon bar (e.g., ribbon bar 1100 as shown in FIG. 11A).

Figure 11D:
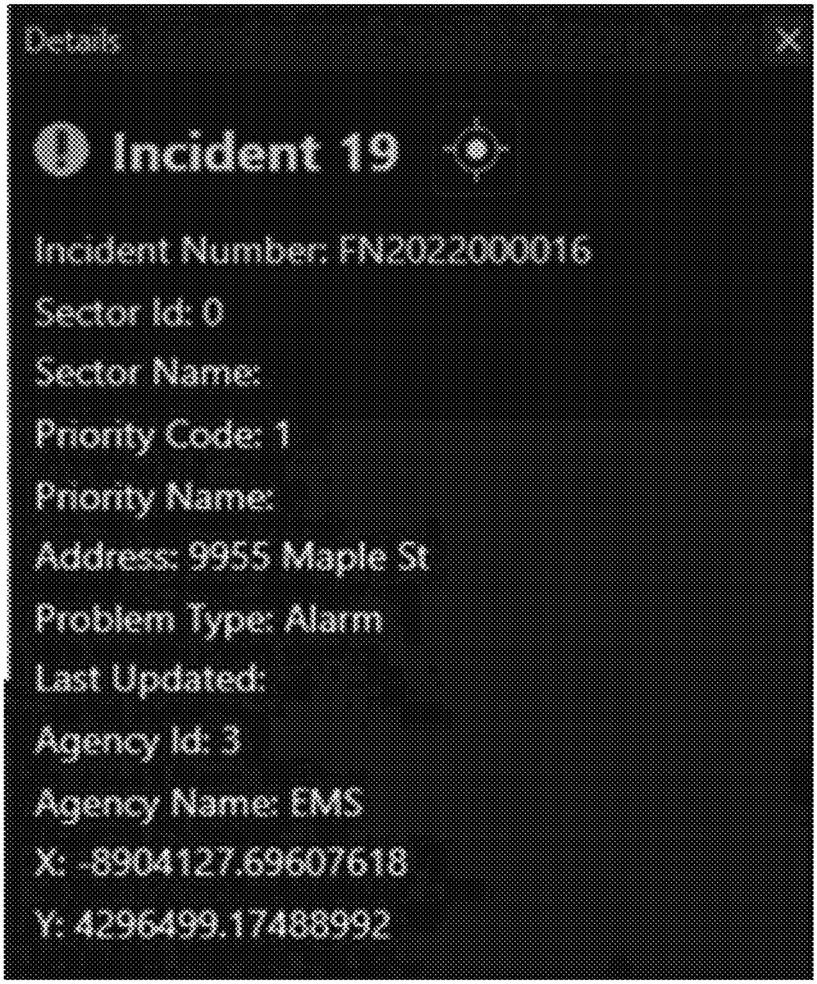
FIG. 11D is a representation of an exemplary computer-implemented GUI for displaying details of a selected incident or vehicle, as described in exemplary embodiments.

A further aspect of the disclosed embodiments may include a status bar configured to display the connection status between the CAD system and the map, as well as error messages. FIG. 11D is a representation of an exemplary computer-implemented GUI for displaying details of a selected incident. More specifically, a details panel may be configured to pop up on a specified side of map when user selects incident, vehicle, or unit; details panel displays the details of selected item. FIG. 11D displays details panel 1100D for an exemplary "Incident 19," including: Incident Number, Sector Id, Sector Name, Priority Code, Priority Name, Address, Problem Type, time Last Updated, Agency Id, Agency Name, and/or X-/Y-location coordinates. Status bar may include an icon depicting a connection status. In some embodiments, connection status icon may be green or red, corresponding to if connected to CAD or not. Another icon may indicate if dynamic map is loading. Further icons may display the scale of map displayed and coordinates of different systems such as US National Grid.

Figure 13:
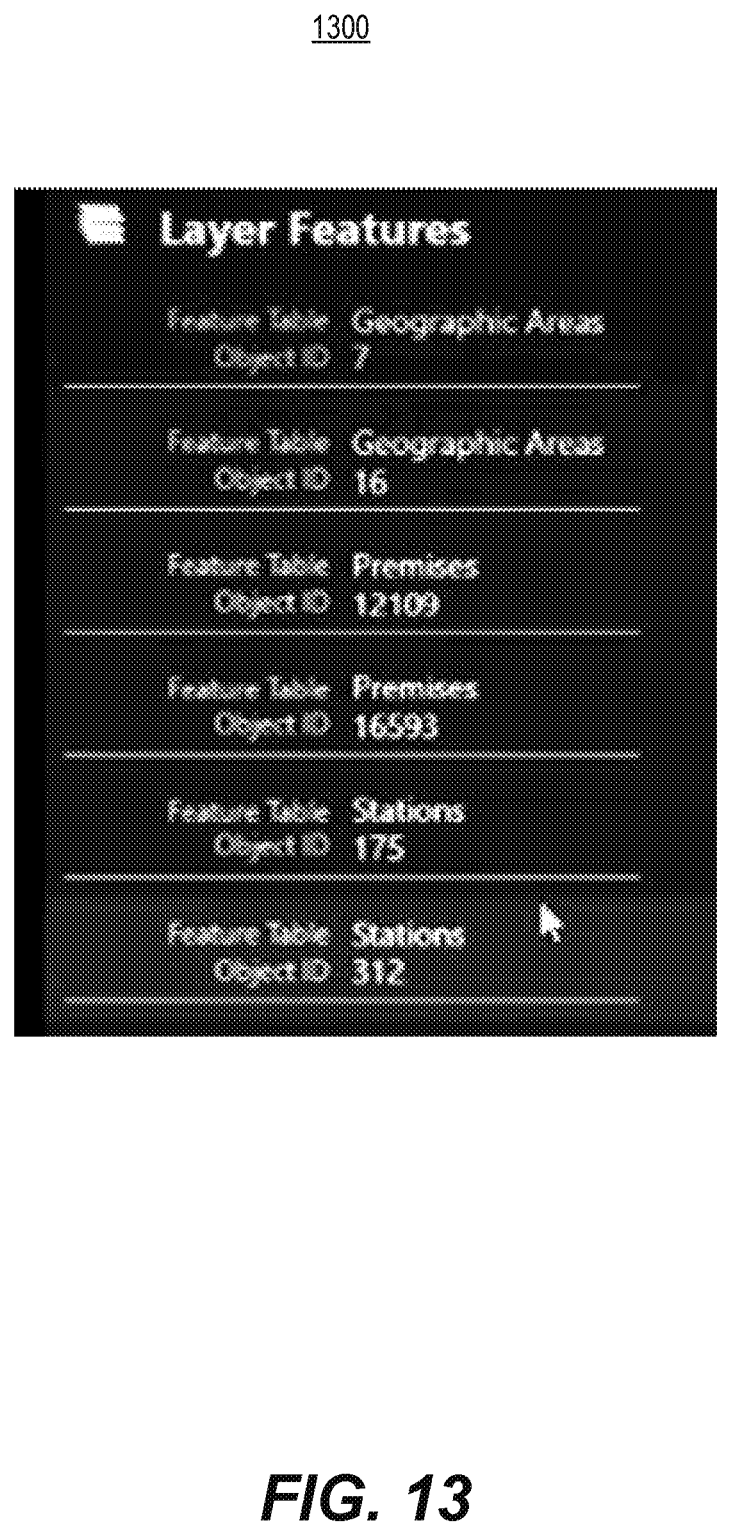
FIG. 13 is a representation of an exemplary computer-implemented GUI for displaying various layers that apply to a selected item featured on a map, as described in exemplary embodiments.

Disclosed embodiments may also be configured such that, if a map contains multiple layers, a details panel may display features of those layers when an end-user selects an item on the map. Generally, disclosed embodiments may be configured to enable the details panel 1100D to display the following information for unit or incident, once an end-user selects unit or incident: (a) Unit or Incident Number; (b) Sector Number and Name; (c) Priority Code and Name; (d) Address; (e) Problem Code; (f) Date when incident or unit was Last Updated; (g) Agency ID and Name; (h) X-/Y-location coordinates of the unit or incident; and/or (i) Assigned units. Certain disclosed embodiments may be configured to have similar functionality when an end-user selects a cluster—in that instance, the details panel 1200 could provide information about each of the incidents or units in that cluster. An aspect of an embodiment may be configured to display an asterisk at the end of the label name for primary units. For example, FIG. 13 is a representation 1300 of an exemplary computer-implemented GUI for displaying various layers that apply to a selected item featured on a map. Certain disclosed embodiments may be further configured to enable end-users to right-click incident or unit to open that item in an Emergency Call Taking (ECT) window in CAD and see additional details.

Figure 12:
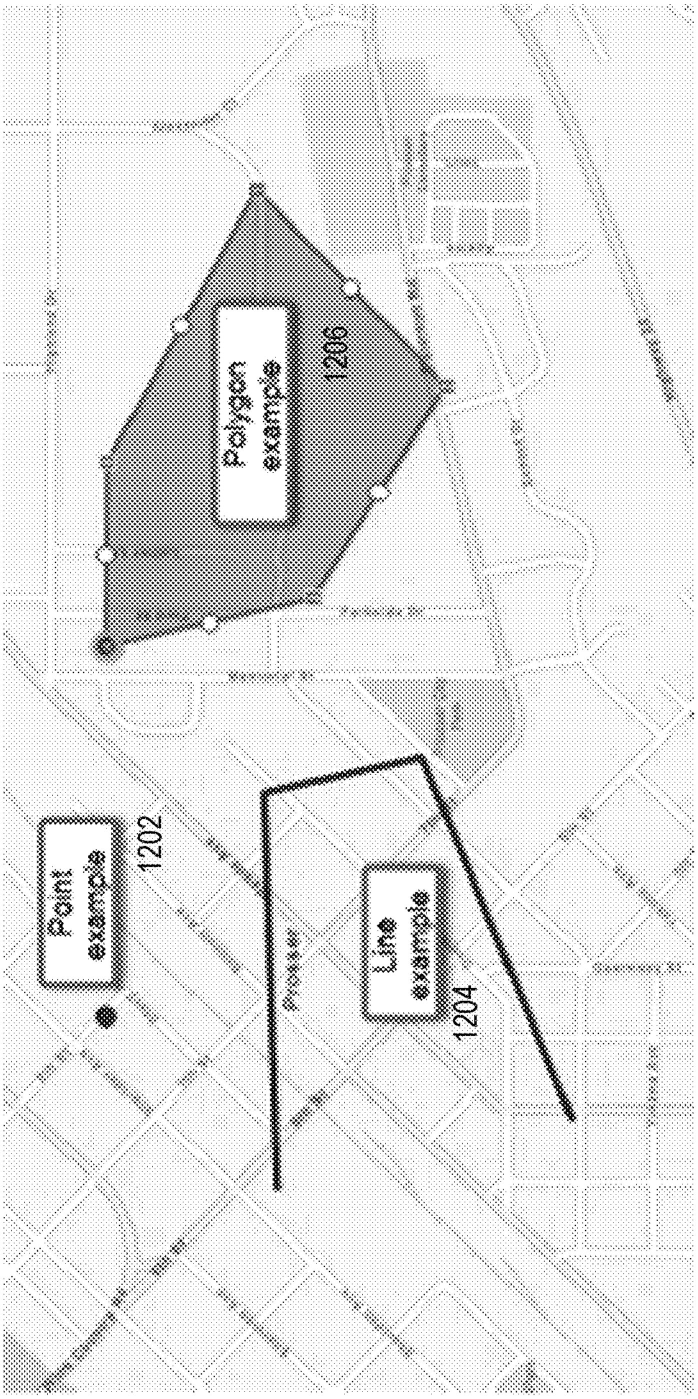
FIG. 12 is a representation of an exemplary map with "map sketch tools" enabled and displaying examples of points, lines, and polygons, as described in exemplary embodiments.

FIG. 12 is a representation of an exemplary map 1200 with "map sketch tools" enabled and displaying examples of points, lines, and polygons. Certain disclosed embodiments may be configured to enable end-users to mark specific items or areas on the map, provided that "map sketch tools" are enabled. In disclosed embodiments with "map sketch tools" enabled, the map window may be configured to permit end-user to select from a list of shapes to draw on the map. Shapes may include, but are not limited to, a point 1202, a line 1204, or a polygon 1206. Certain disclosed embodiments may be further configured such that end-user may draw directly on map; save drawings onto map; edit or delete selected existing drawings; and clear all existing drawings. In some embodiments, user may select button to take screen shot of sketch, and may share the sketch (e.g., via email, other communication means, or sharing system). Screen shot may be automatically saved to device clipboard.

Certain disclosed embodiments may be further configured to enable end-user to apply filters to map work areas. For instance, various embodiments may be configured to include: a "Scope" tab on one side of map window; an "Agencies" tab in which end-user may select agencies on which to apply filter; a "Sectors" tab in which end-user may select sectors on which to apply filter; and/or a "Clear Scope" tab by which end-user may clear existing filters. Certain disclosed embodiments may also be configured to permit end-user to filter incidents and vehicles according to their individual map workspace. Thus, an aspect of an embodiment may include a filtering triage icon in a corner of map work area, configured such that the end-user may add a row of filter criteria by completing predetermined fields describing the information to filter. The predetermined fields may include "Type" (e.g., incidents or vehicles), "Field," "Operator" (e.g., "contains," "equals," or "not equals"), and/or "Value." A further aspect of the embodiment may be configured to permit the end-user to add additional rows of filter criteria. A further aspect of the embodiment may be designed to cause filtering triage icon to change color when filtering criteria are applied by the user. Certain disclosed embodiments may also be configured to allow an end-user to save and name an already-made filter setup in order to use this already-made filter set-up more easily in the map workspace. In such embodiments, the map workspace may be configured to generate a drop-down list from filtering triage icon which contains lists of all saved filters.

FIGS. 14-20 are representations of exemplary computer-implemented GUIs for dynamic maps capable of displaying multiple layers, incidents, icons in hover state, and icons in a selected state. As shown in these figures, certain disclosed embodiments may be configured to display maps of differing zoom scales, colors, surfaces, detail, and modes.

Figure 14:
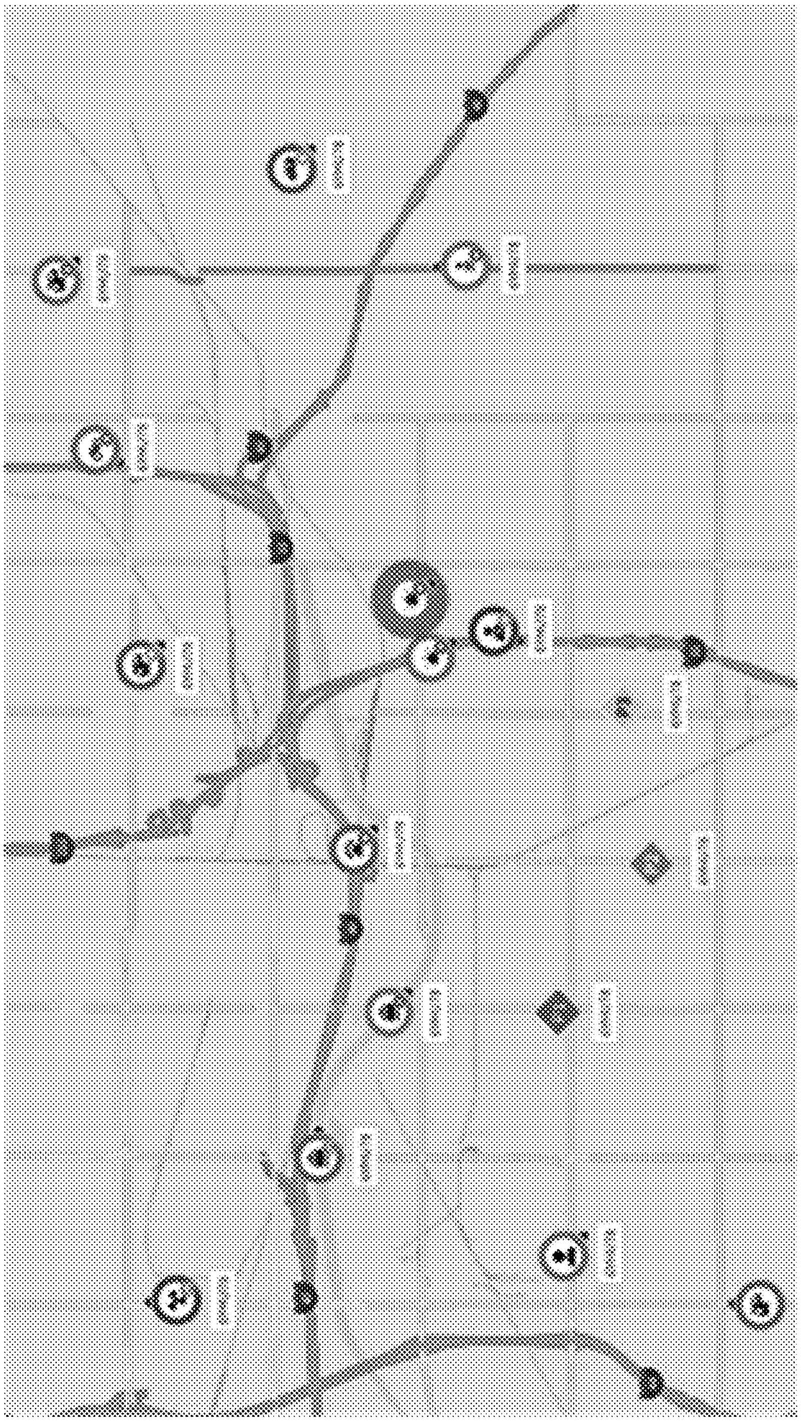
FIG. 14 is a first representation of an exemplary computer-implemented GUI for a dynamic map capable of displaying multiple layers, incidents, icons in hover state, and/or icons in selected state, as described in exemplary embodiments.
Figure 15:
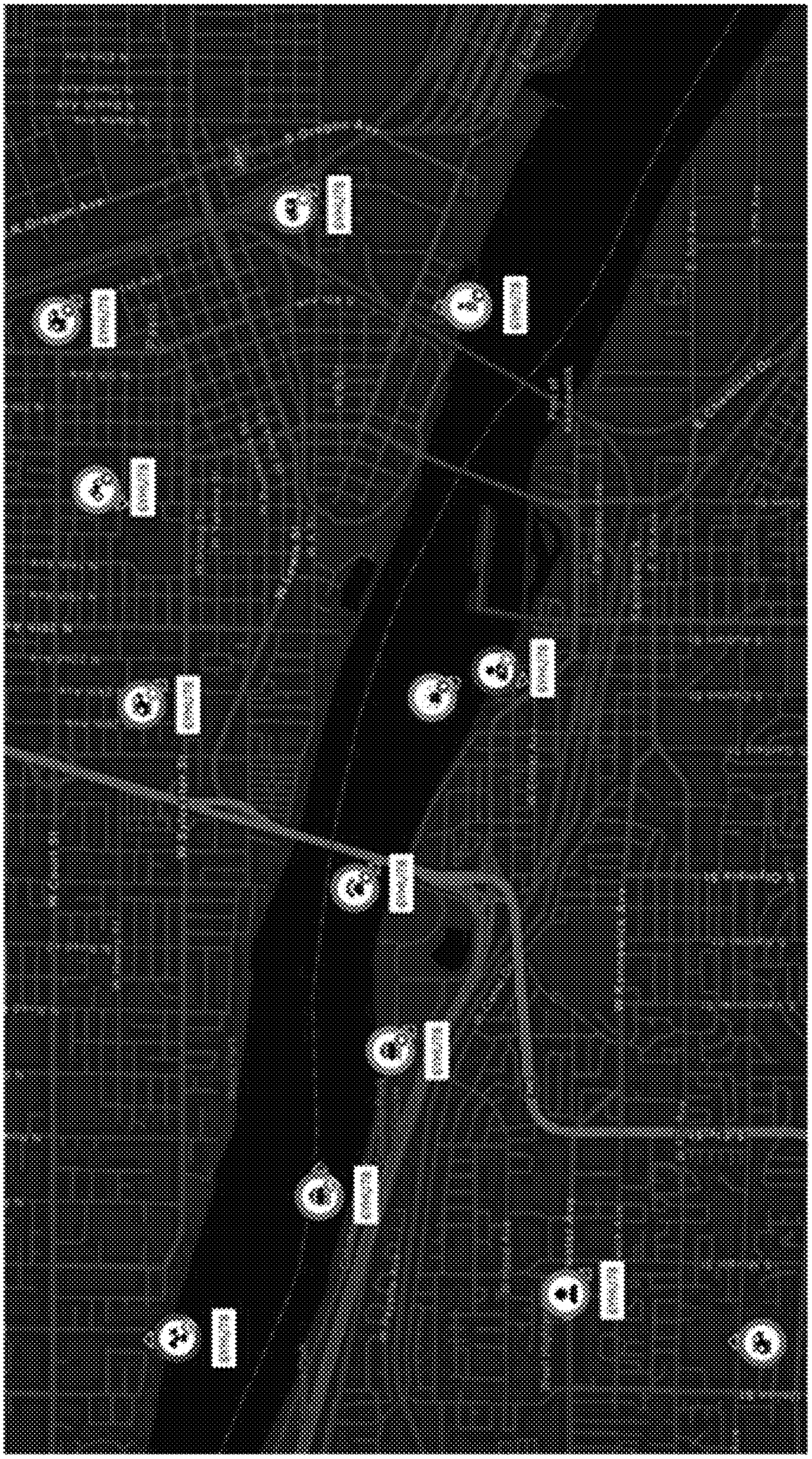
FIG. 15 is a second representation of an exemplary computer-implemented GUI for a dynamic map capable of displaying multiple layers, incidents, icons in hover state, and/or icons in selected state, as described in exemplary embodiments.
Figure 16:
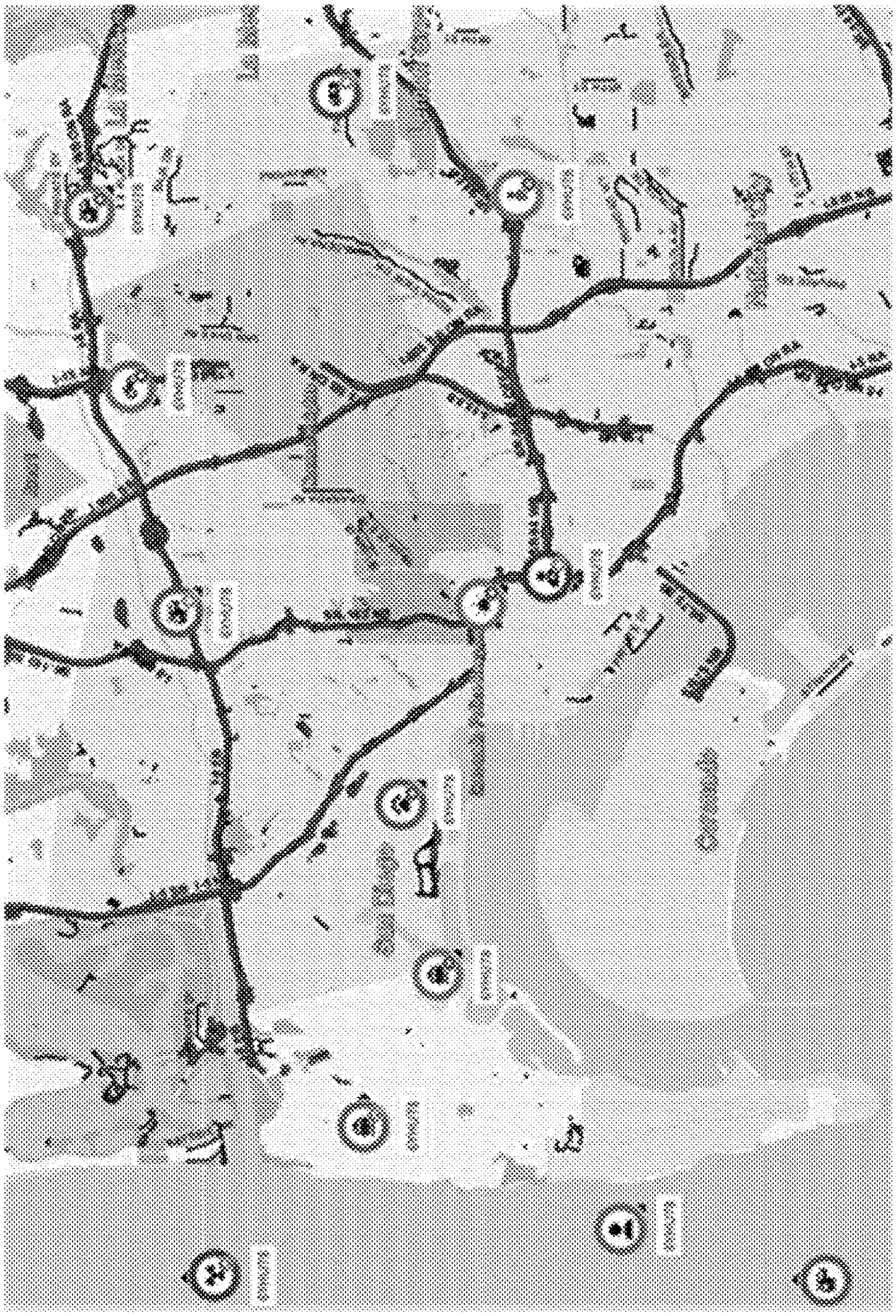
FIG. 16 is a third representation of an exemplary computer-implemented GUI for a dynamic map capable of displaying multiple layers, incidents, icons in hover state, and/or icons in selected state, as described in exemplary embodiments.
Figure 17:
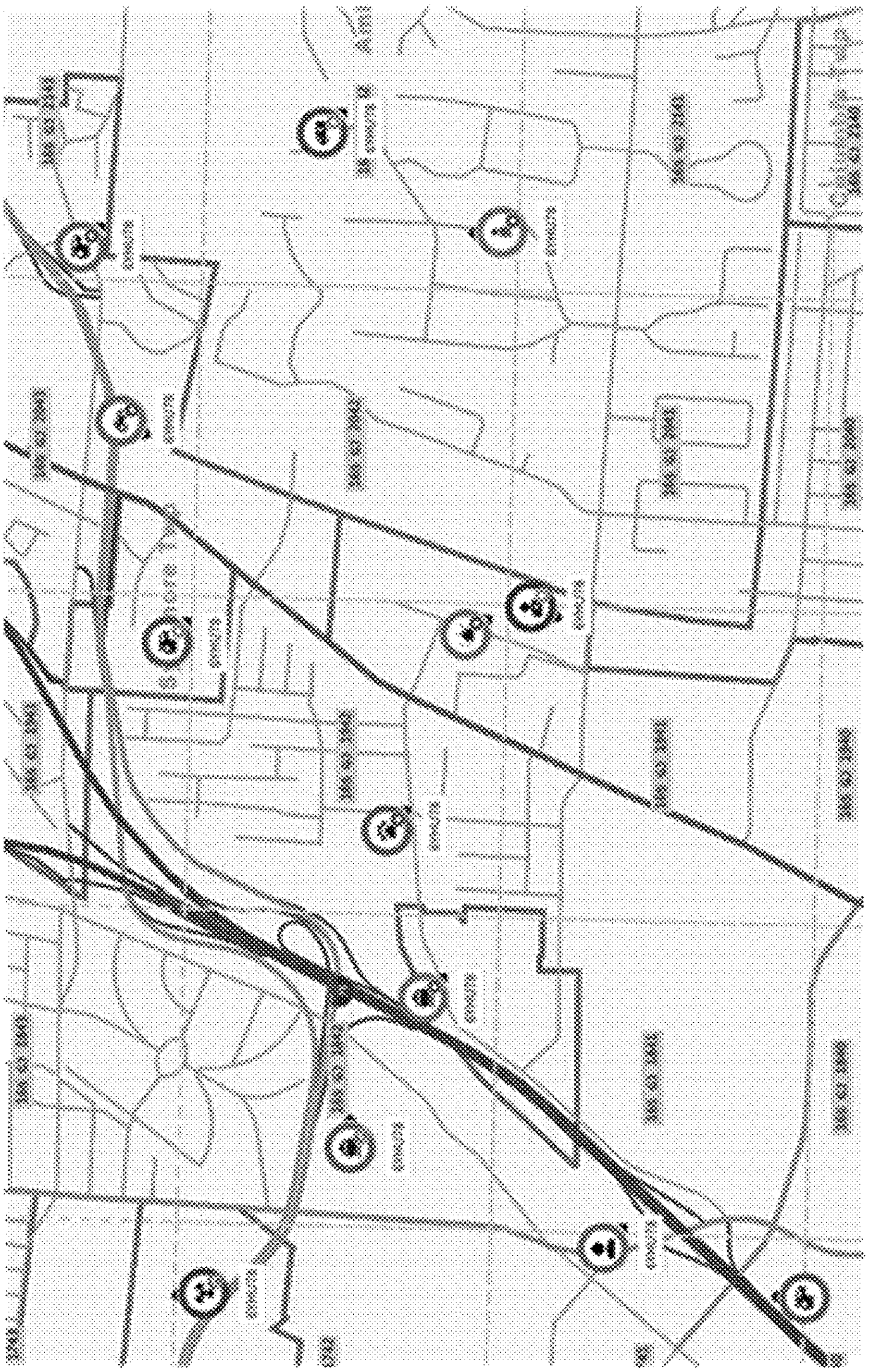
FIG. 17 is a fourth representation of an exemplary computer-implemented GUI for a dynamic map capable of displaying multiple layers, incidents, icons in hover state, and/or icons in selected state, as described in exemplary embodiments.
Figure 18:
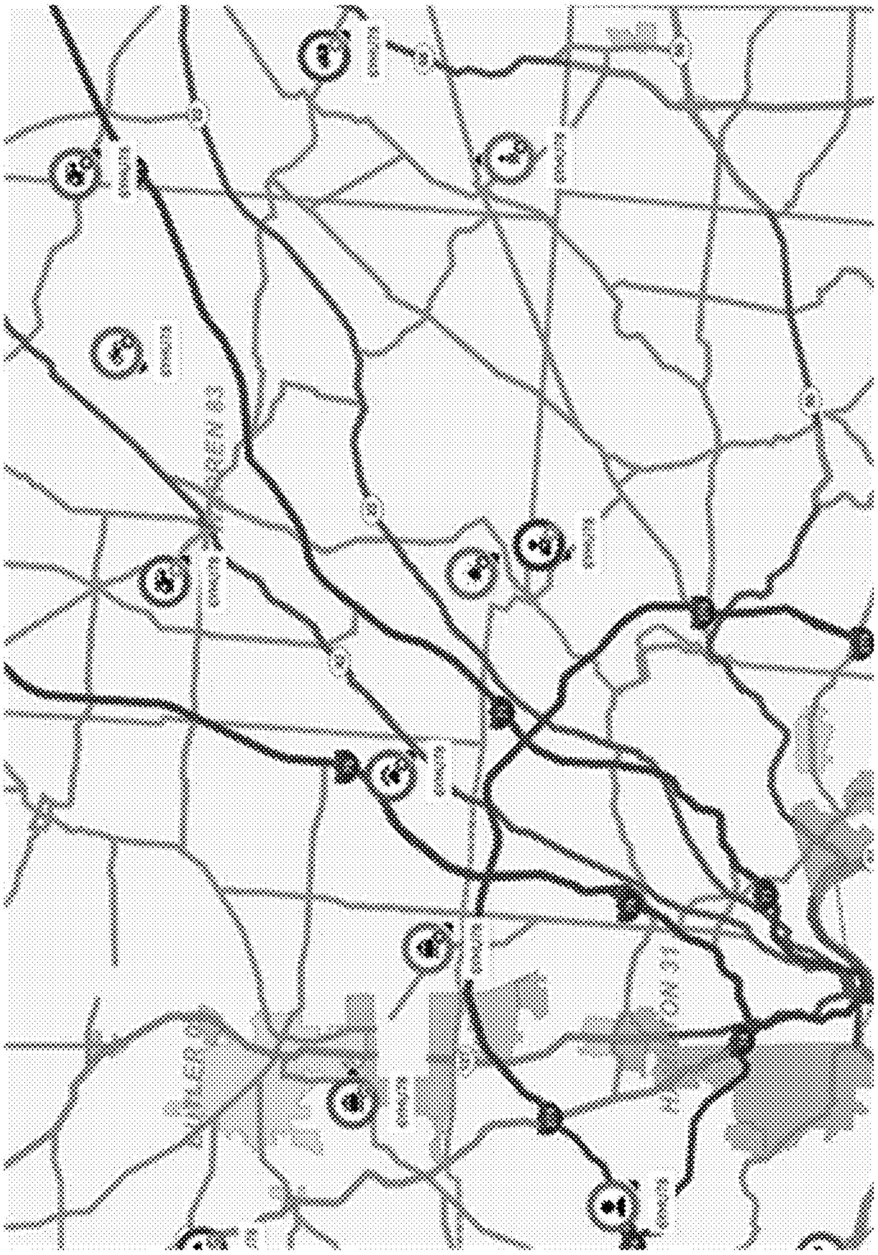
FIG. 18 is a fifth representation of an exemplary computer-implemented GUI for a dynamic map capable of displaying multiple layers, incidents, icons in hover state, and/or icons in selected state, as described in exemplary embodiments.
Figure 19:
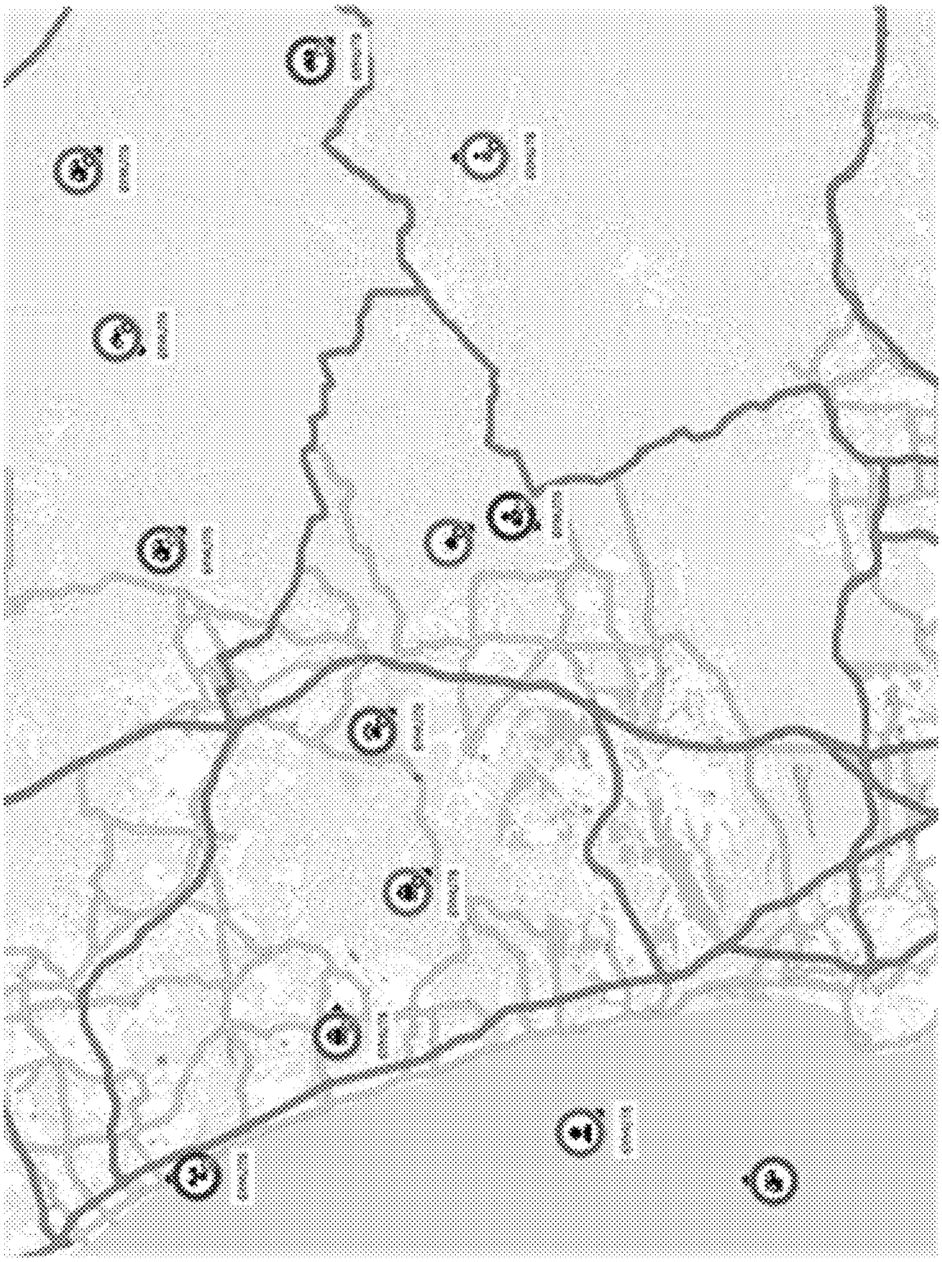
FIG. 19 is a sixth representation of an exemplary computer-implemented GUI for a dynamic map capable of displaying multiple layers, incidents, icons in hover state, and/or icons in selected state, as described in exemplary embodiments.
Figure 20:
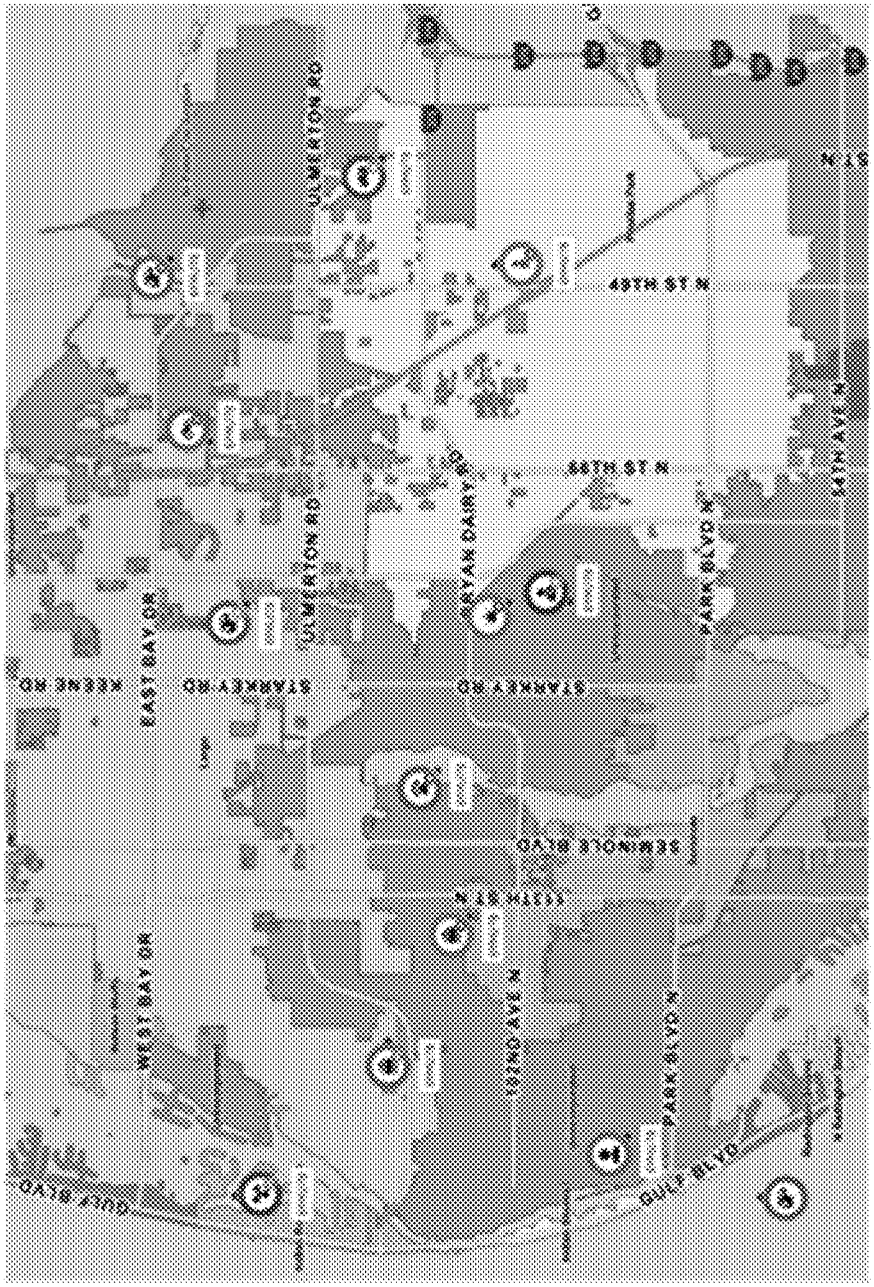
FIG. 20 is a seventh representation of an exemplary computer-implemented GUI for a dynamic map capable of displaying multiple layers, incidents, icons in hover state, and/or icons in selected state, as described in exemplary embodiments.
Figure 21:
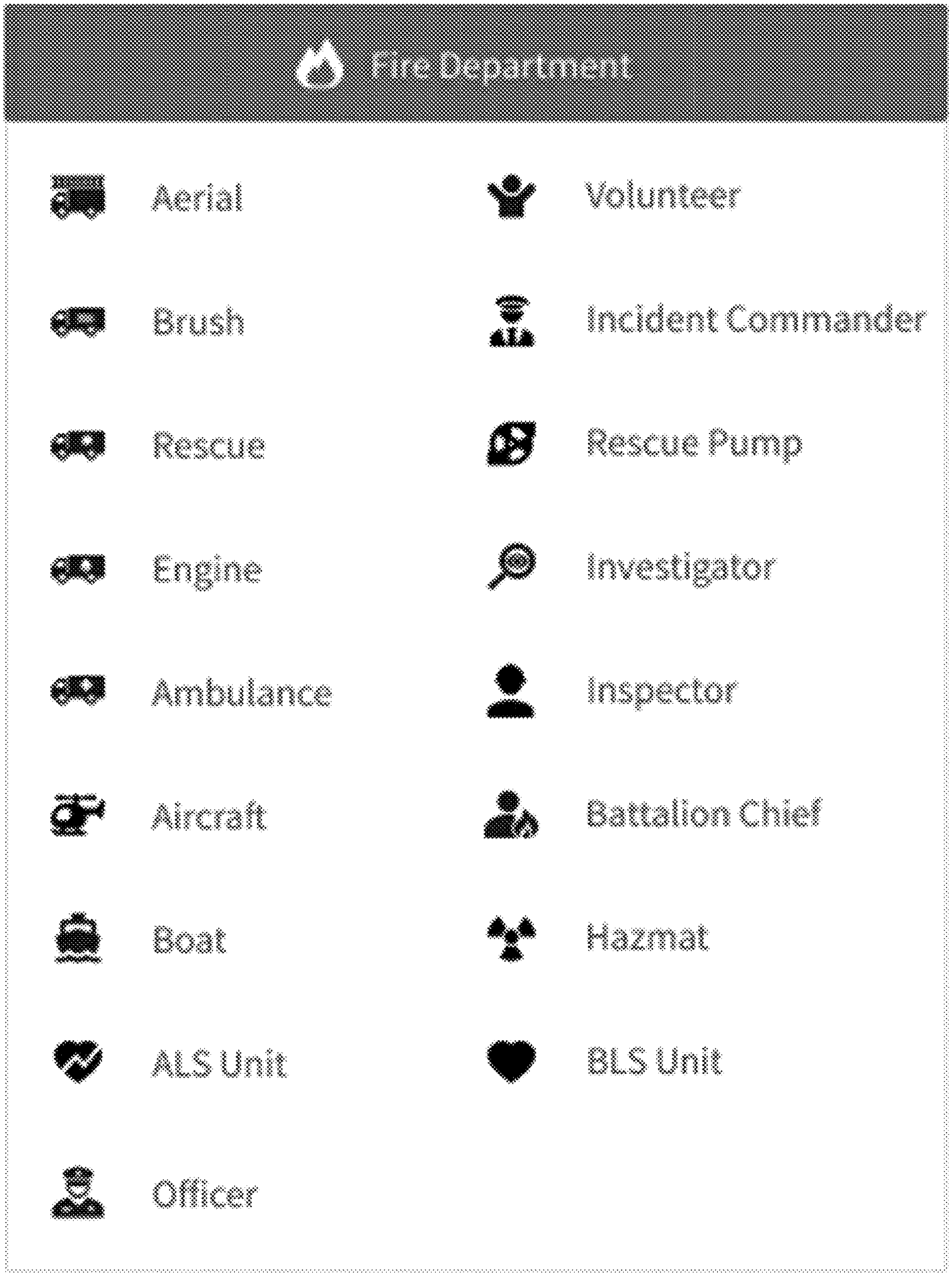
FIG. 21 is a representation of exemplary resource icons depicting fire department vehicles and units, as described in exemplary embodiments.
Figure 22:
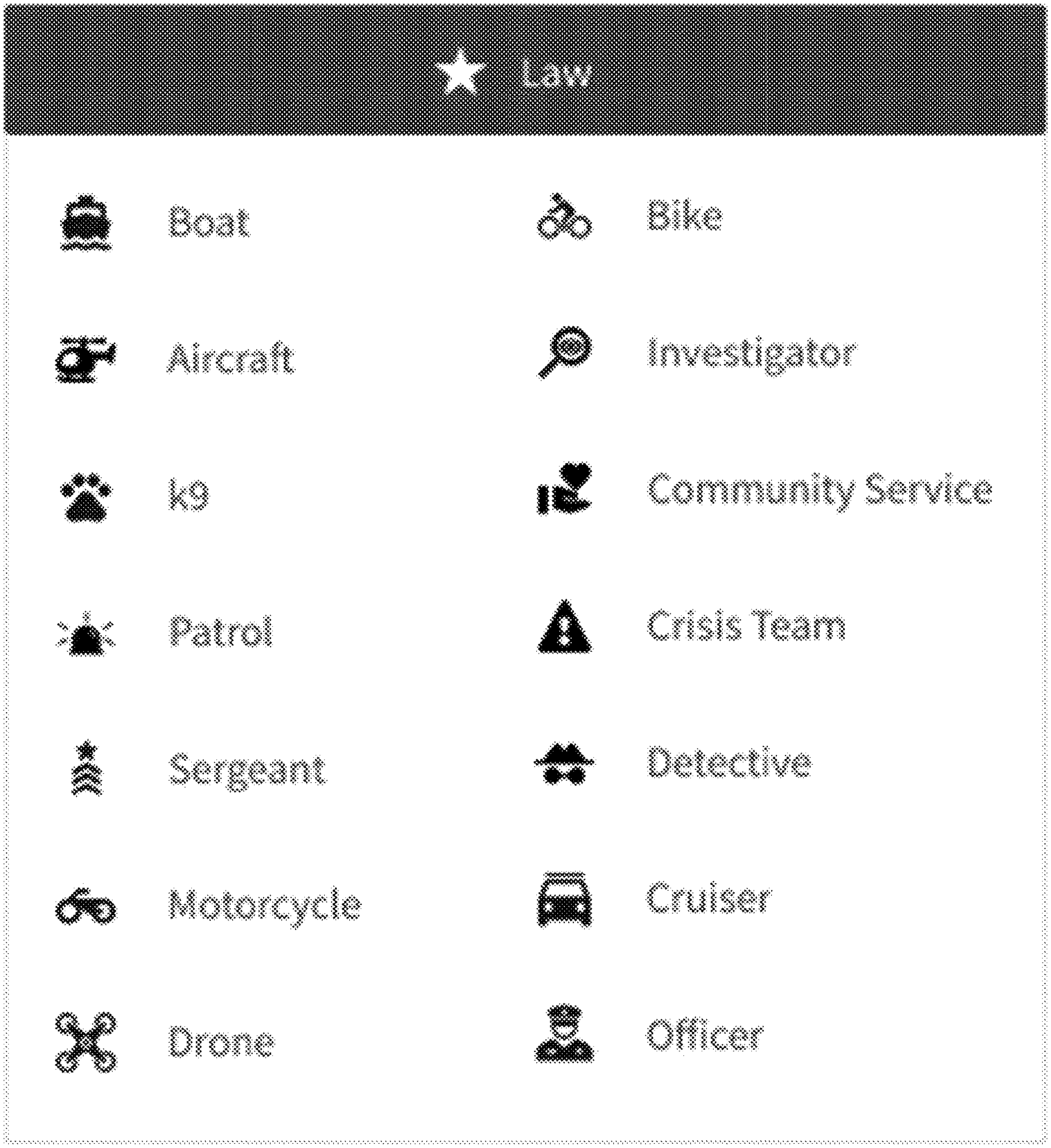
FIG. 22 is a representation of exemplary resource icons depicting law enforcement vehicles and units, as described in exemplary embodiments.
Figure 23:
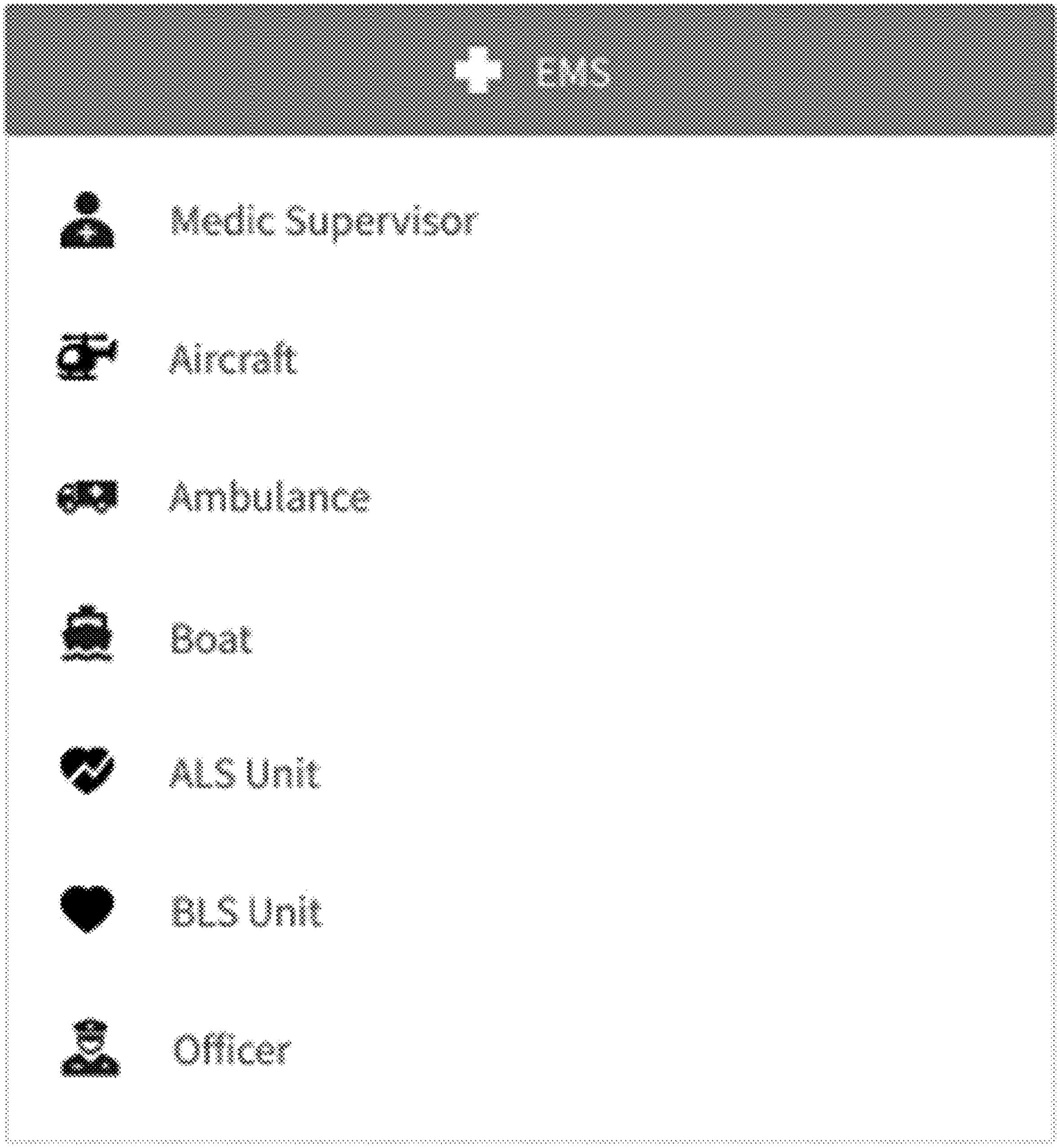
FIG. 23 is a representation of exemplary resource icons depicting emergency medical services (EMS) vehicles and units, as described in exemplary embodiments.
Figure 24:
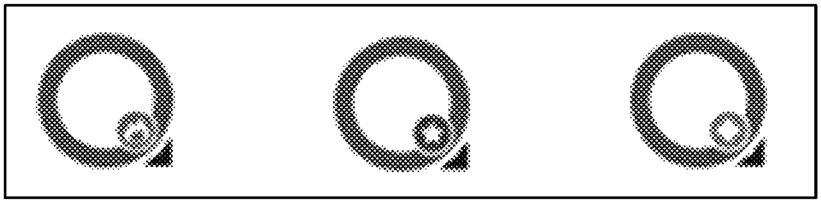
FIG. 24 is a representation of exemplary dynamic icons in a hover state, as described in exemplary embodiments.

For instance, FIG. 14 is a first representation 1400 of an exemplary computer-implemented GUI for dynamic map displaying freeways and icons in a zoomed-out view. FIG. 15 is a second representation 1500 of an exemplary computer-implemented GUI for dynamic map in "dark mode." FIG. 16 depicts a third representation 1600 of an exemplary computer-implemented GUI for dynamic map displaying geographic terrain information, city labels, and icons. FIG. 17 depicts a fourth representation 1700 of an exemplary computer-implemented GUI for dynamic map displaying streets, coordinates, and icons. FIG. 18 depicts a fifth representation 1800 of an exemplary computer-implemented GUI for dynamic map displaying a zoomed-out view with freeways, counties, and icons. FIG. 19 depicts a sixth representation 1900 of an exemplary computer-implemented GUI for dynamic map displaying a zoomed-out view with terrain, freeways, and icons. FIG. 20 depicts a seventh representation 2000 of an exemplary computer-implemented GUI for dynamic map displaying street names and geographical terrain layers.

Figure 30:
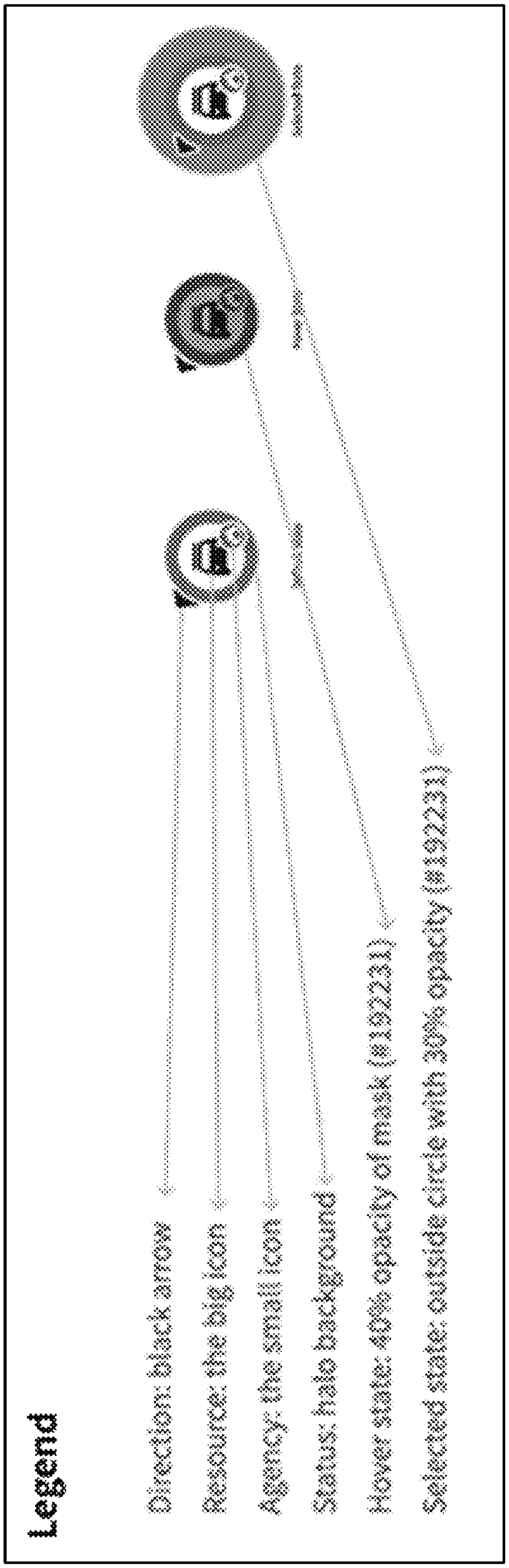
FIG. 30 is a legend displaying the direction, resource, agency, status, and state modes of an exemplary dynamic icon, as described in exemplary embodiments.
Figure 31:
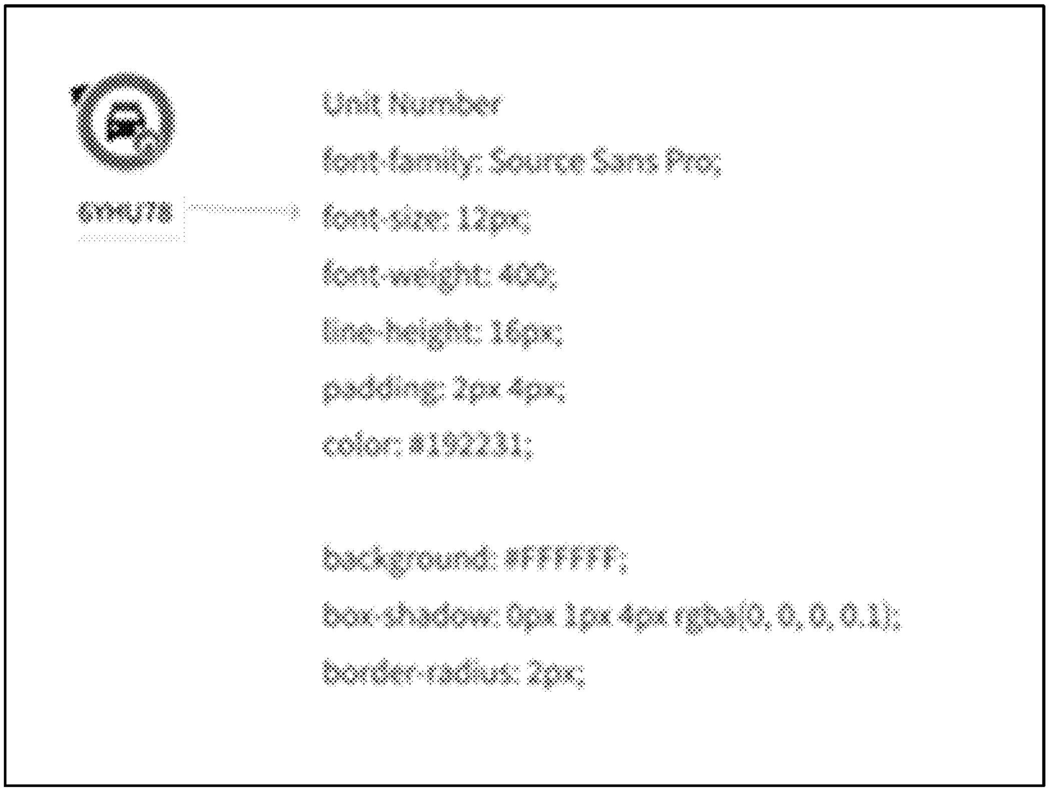
FIG. 31 is a legend displaying the font and background information for an exemplary dynamic icon, as described in exemplary embodiments.

Certain disclosed embodiments may be configured to display a dynamic icon for a vehicle, incident, or unit, the dynamic icon containing a directional arrow on the outside of a colored ring, the colored ring containing a resource icon and an agency icon. FIG. 30 is an exemplary legend displaying direction, resource, agency, status, and state modes (e.g., hover state, selected state) of exemplary dynamic icon. Black directional arrow may point to where specifically on map incident occurs and/or where resource is located. Resource icon may be the big icon in the center of dynamic icon displaying the resource (e.g., aircraft, boat, officer). Agency icon may be the small icon to the side of resource icon displaying agency (e.g., fire department, law enforcement, EMT). Halo background may designate status (e.g., the color of the halo background corresponds to if the resource is at the location of the incident or on the way). Percentage opacity of mask (e.g., 40% percentage opacity, #1922331) may be displayed for hover state. The selected dynamic icon may have an outside circle with percentage opacity (e.g., 30% opacity, #192231). Further, FIG. 31 is exemplary unit number display information. Non-limiting examples of unit number display information may include font family, font size, font weight, line height, padding, color, background, box-shadow, and border radius information.

Figure 25A:
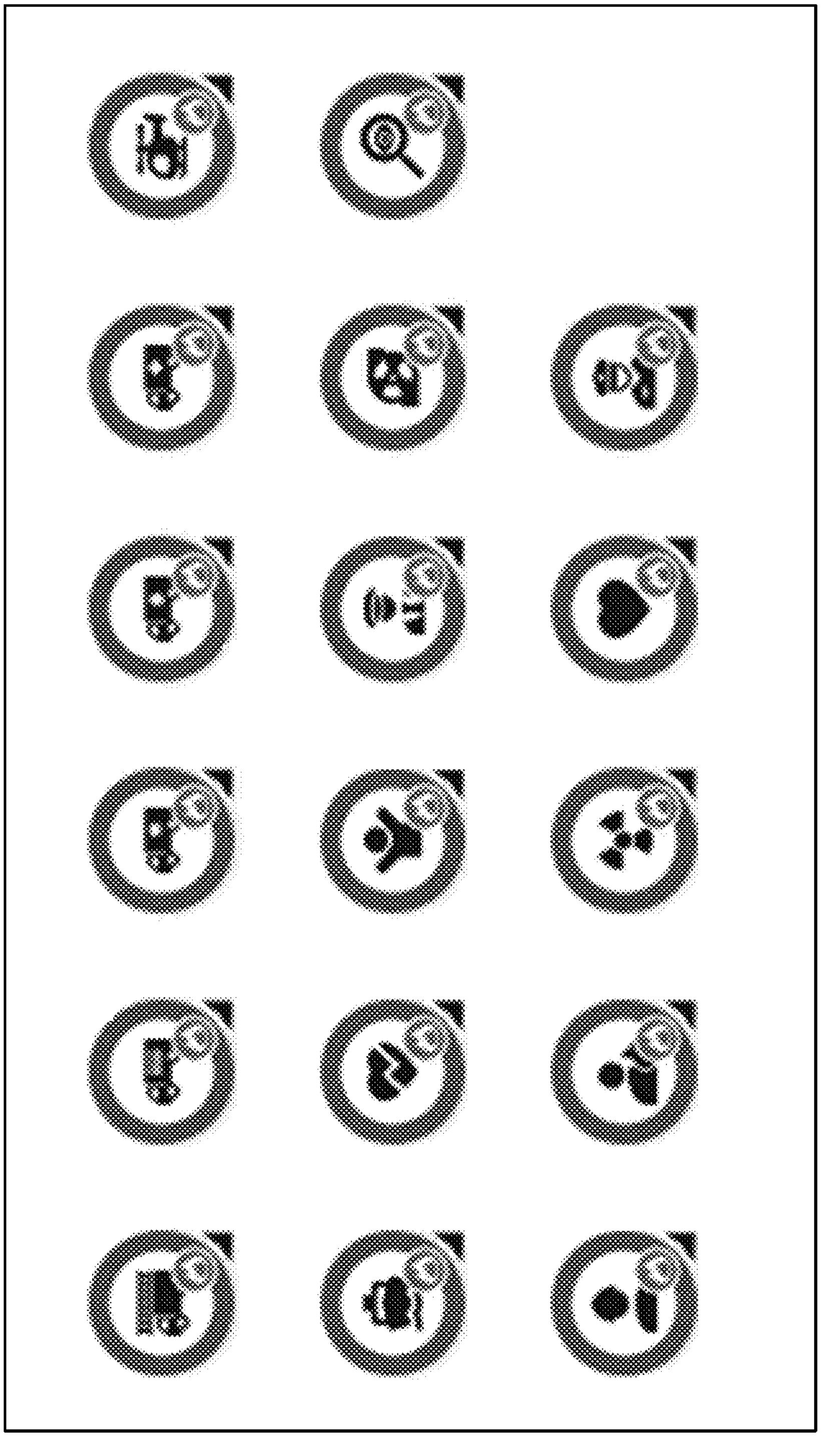
FIG. 25A is a representation of exemplary dynamic icons in a hover state, each icon containing a fire department agency icon, a resource icon corresponding to a fire department vehicle, incident, or unit, and a dynamic directional arrow, as described in exemplary embodiments.
Figure 25B:
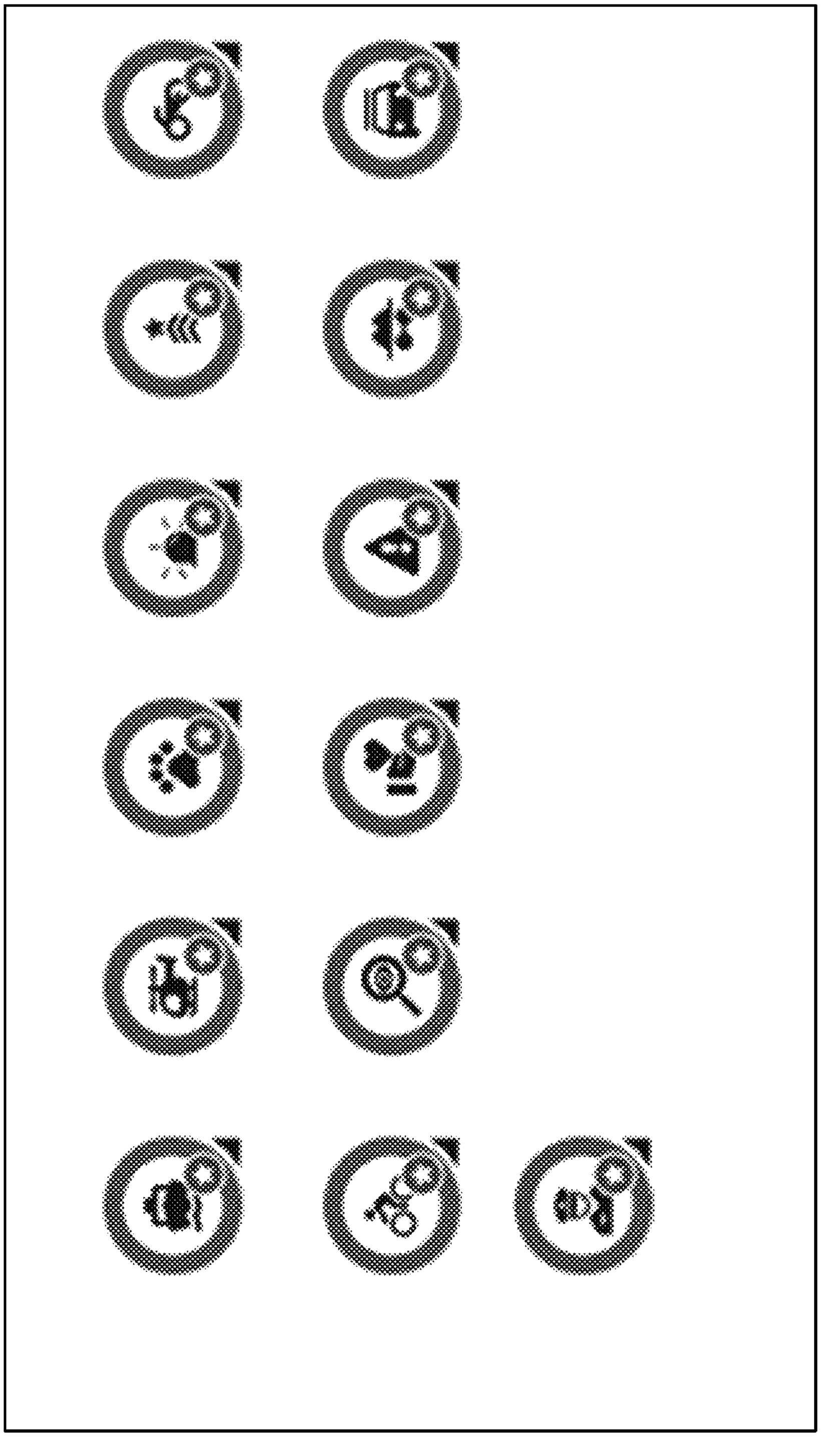
FIG. 25B is a representation of exemplary dynamic icons in a hover state, each icon containing a law enforcement agency icon, a resource icon corresponding to a law enforcement vehicle, incident, or unit, and a dynamic directional arrow, as described in exemplary embodiments.
Figure 25C:
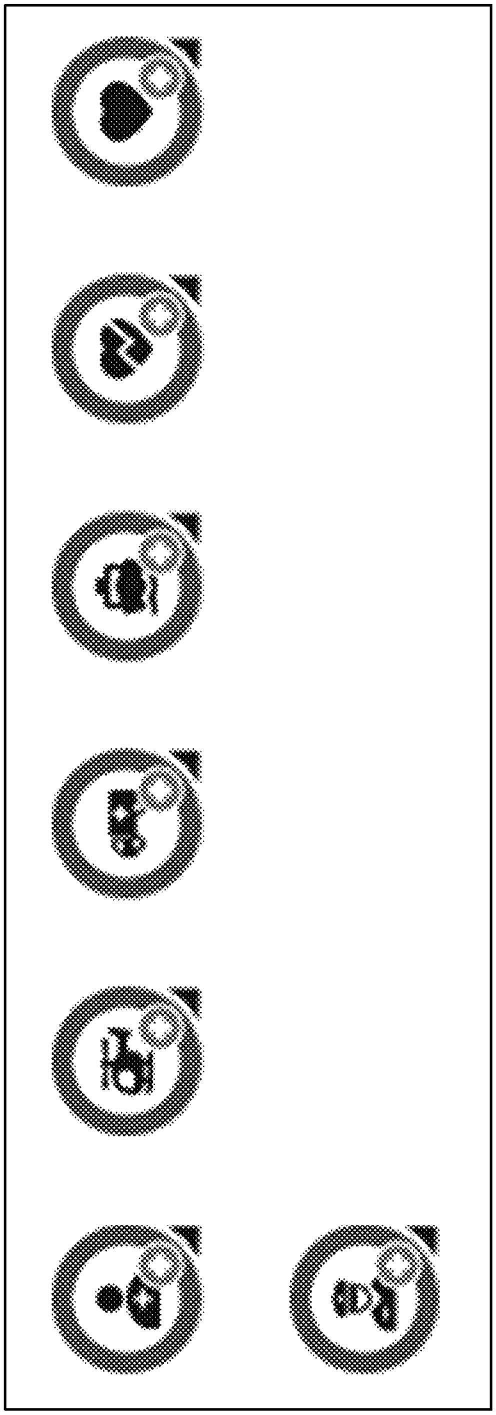
FIG. 25C is a representation of exemplary dynamic icons in a hover state, each icon containing an EMS agency icon, a resource icon corresponding to an EMS vehicle, incident, or unit, and a dynamic directional arrow, as described in exemplary embodiments.
Figure 26A:
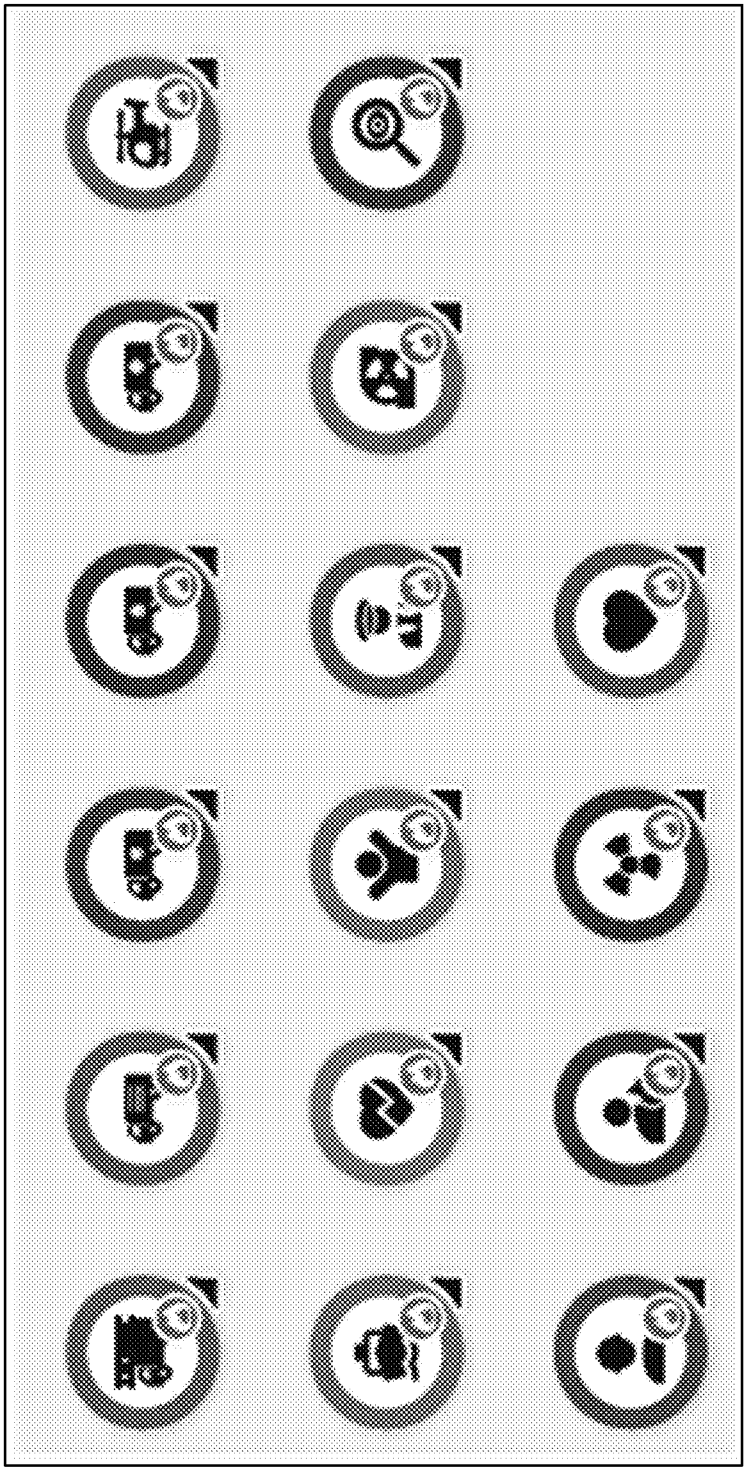
FIG. 26A is a representation of exemplary dynamic icons in a hover state, each icon containing a fire department agency icon, a resource icon corresponding to a fire department vehicle, incident, or unit, and a dynamic directional arrow, each exemplary dynamic icon showing a different customizable color, as described in exemplary embodiments.
Figure 26B:
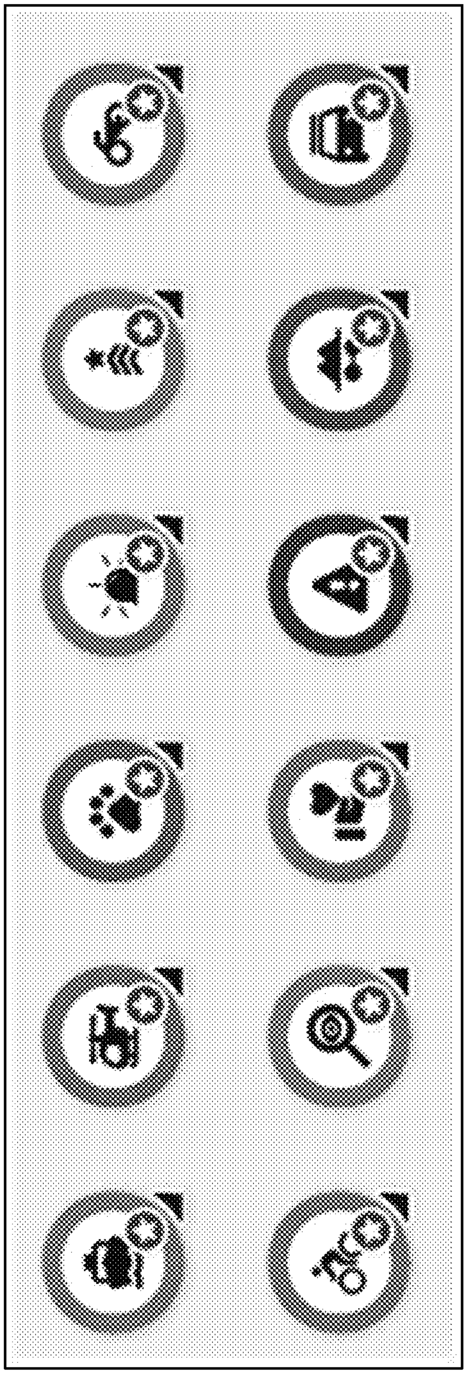
FIG. 26B is a representation of exemplary dynamic icons in a hover state, each icon containing a law enforcement agency icon, a resource icon corresponding to a law enforcement vehicle, incident, or unit, and a dynamic directional arrow, each exemplary dynamic icon also showing a different customizable color, as described in exemplary embodiments.
Figure 26C:
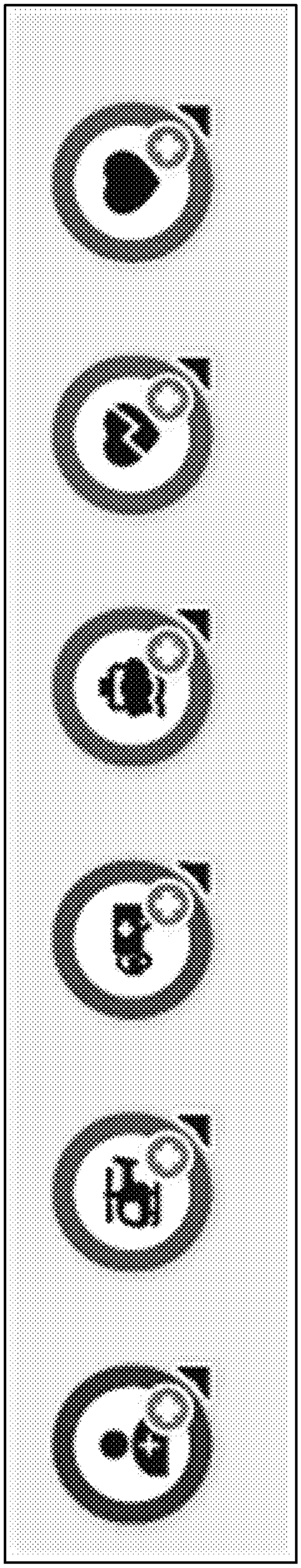
FIG. 26C is a representation of exemplary dynamic icons in a hover state, each icon containing an EMS agency icon, a resource icon corresponding to an EMS vehicle, incident, or unit, and a dynamic directional arrow, each exemplary dynamic icon also showing a different customizable color, as described in exemplary embodiments.
Figure 29:
FIG. 29 is a representation of resource icons, as described in exemplary embodiments.

FIG. 29 depicts non-limiting examples of resource icons for agencies. For example, resource icons may include, "aircraft" denoted by a helicopter symbol and "k9" denoted by paw. Further, FIG. 25A is a representation of exemplary resource icons depicting fire department vehicles and units. The example fire department resources shown in FIG. 25A correspond to the listed fire department resources in FIG. 21. FIG. 25B is a representation of exemplary resource icons depicting law enforcement vehicles and units. The example law enforcement resources shown in FIG. 25B correspond to the listed law enforcement resources shown in FIG. 22. FIG. 25C is a representation of exemplary resource icons depicting EMS vehicles and units. The example EMS resources shown in FIG. 25C correspond to the listed EMS resources shown in FIG. 23. In some embodiments, the fire department, law enforcement, and EMS dynamic icons may further include colored status rings around the icons, as seen in FIGS. 26A-26C, respectively.

The foregoing disclosed embodiments may be further configured to provide a graphical user interface (GUI) for dynamic maps to be viewed and used by individuals (e.g., public citizens). By way of non-limiting example, in some embodiments, the system for configuring a GUI may include a cloud-based mapping system. The cloud-based mapping system may be configured to include a map client, track features for dynamic objects, and incorporate single sign-on protocols. Certain embodiments of the foregoing map configuration tool may be further developed and configured to permit users and end-users to select CAD data, GIS data, and other data from local agencies that report crime, for release on a dynamic crowd-sourced public map. For instance, an aspect of an embodiment may be configured to permit an end-user to select (a) specific types of crime incidents for display on the public dynamic map, and/or (b) whether to release sex offender data on the dynamic public map. An aspect of an embodiment is further configured to enable an end-user to filter CAD, GIS, and other data from local agencies that report crime by (a) date, and (b) crime type; and then enable such data to be displayed on a dynamic public map. These embodiments would permit individuals to, for example, get a visual depiction of criminal activity in their area, thus facilitating interaction with the GUI.

Such embodiments may be configured to display aspects of the disclosed GUI for dynamic public maps such that individuals may (a) view a plurality of dynamic incident, vehicle, and unit icons on a map; (b) select an already-displayed dynamic incident, vehicle, or unit icon and view generalized data related to the specific dynamic icon; and (c) search and zoom in/out on the map to view desired geographical areas. Such embodiments may be further configured to enable individuals to (a) filter icons by date and crime type; (b) set specific crime alerts around specific addresses; (c) set automatic notifications when specified crimes happen around a selected geographic area; (d) create charts and reports based on crime incidents displayed on the map; (e) display the distance from any dynamic icon (i.e., crime) to any address of interest; and (f) print a selected map area.

Figure 33:
FIG. 33 depicts an exemplary GUI for dynamic public maps for use on a tablet, as described in exemplary embodiments.
Figure 34:
FIG. 34 depicts an exemplary GUI for dynamic public maps for use on a smartphone, as described in exemplary embodiments.
Figure 35:
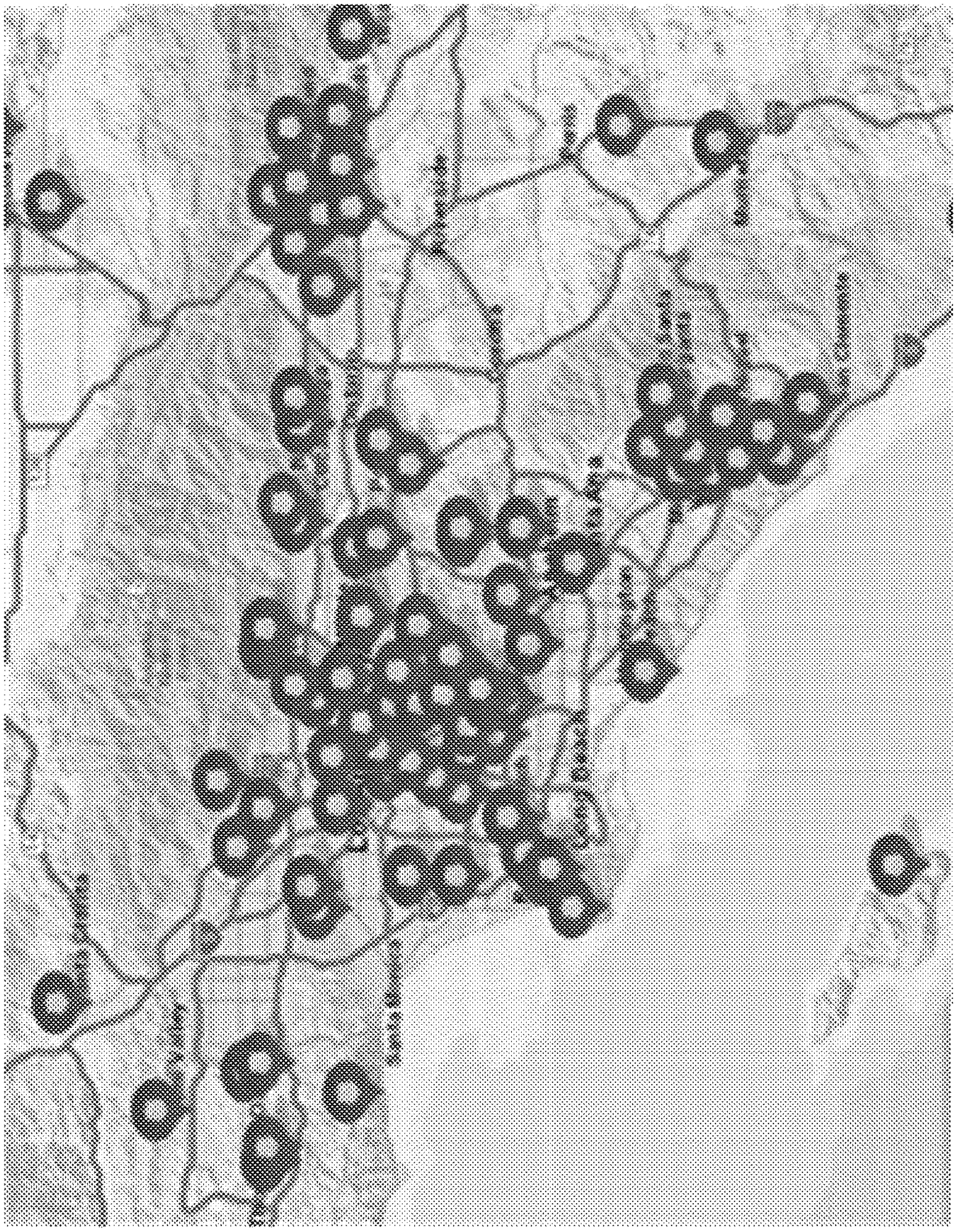
FIG. 35 depicts an aspect of an exemplary GUI for dynamic public maps, displaying a zoomed-out view of reported crime incidents over an expanded geographical area, as described in exemplary embodiments.
Figure 36:
FIG. 36 depicts an aspect of an exemplary GUI for dynamic crowd-sourced public maps, displaying a second zoomed-out view of reported crime incidents over a second expanded geographic area, as described in exemplary embodiments.

Exemplary GUIs for dynamic crowd-sourced public maps as depicted in FIGS. 35 and 36 may be configured to include these features. Certain disclosed embodiments of a GUI for dynamic crowd-sourced public maps may be configured to be displayed on a variety of client devices, including phones, tablets, laptops, desktop computers, etc. Further, certain disclosed embodiments of a GUI for dynamic public maps may be configured to be displayed on a live website and through dedicated phone, tablet, and computer applications, as depicted by FIGS. 33-38. FIG. 33 depicts an exemplary GUI for dynamic public maps for use on a tablet. FIG. 34 depicts an exemplary GUI for dynamic public maps for use on a smartphone. FIG. 35 depicts an aspect of an exemplary GUI for dynamic public maps, displaying a zoomed-out view of reported crime incidents over an expanded geographical area. FIG. 36 depicts an aspect of an exemplary GUI for dynamic public maps, displaying a second zoomed-out view of reported crime incidents over a second expanded geographic area.

Embodiments of a cloud-based mapping system may be configured to incorporate single sign-on (SSO) protocols whereby one password grants access to the entire system-application and database. Embodiments of such system may be configured by certain users at an agency to, among other things, (a) streamline approval processes and notifications; (b) configure workflow to include only procedures actually used by the agency; and (c) automate and replicate paper documents most often used by the agency in day-to-day operations. Like the foregoing disclosure, embodiments may be configured to provide custom fields, forms, reports, dashboards, and workflows for the targeted users and end-users. For instance, FIG. 37 depicts an exemplary embodiment configured for use on a computer and including custom fields for a particular agency.

Figure 37:
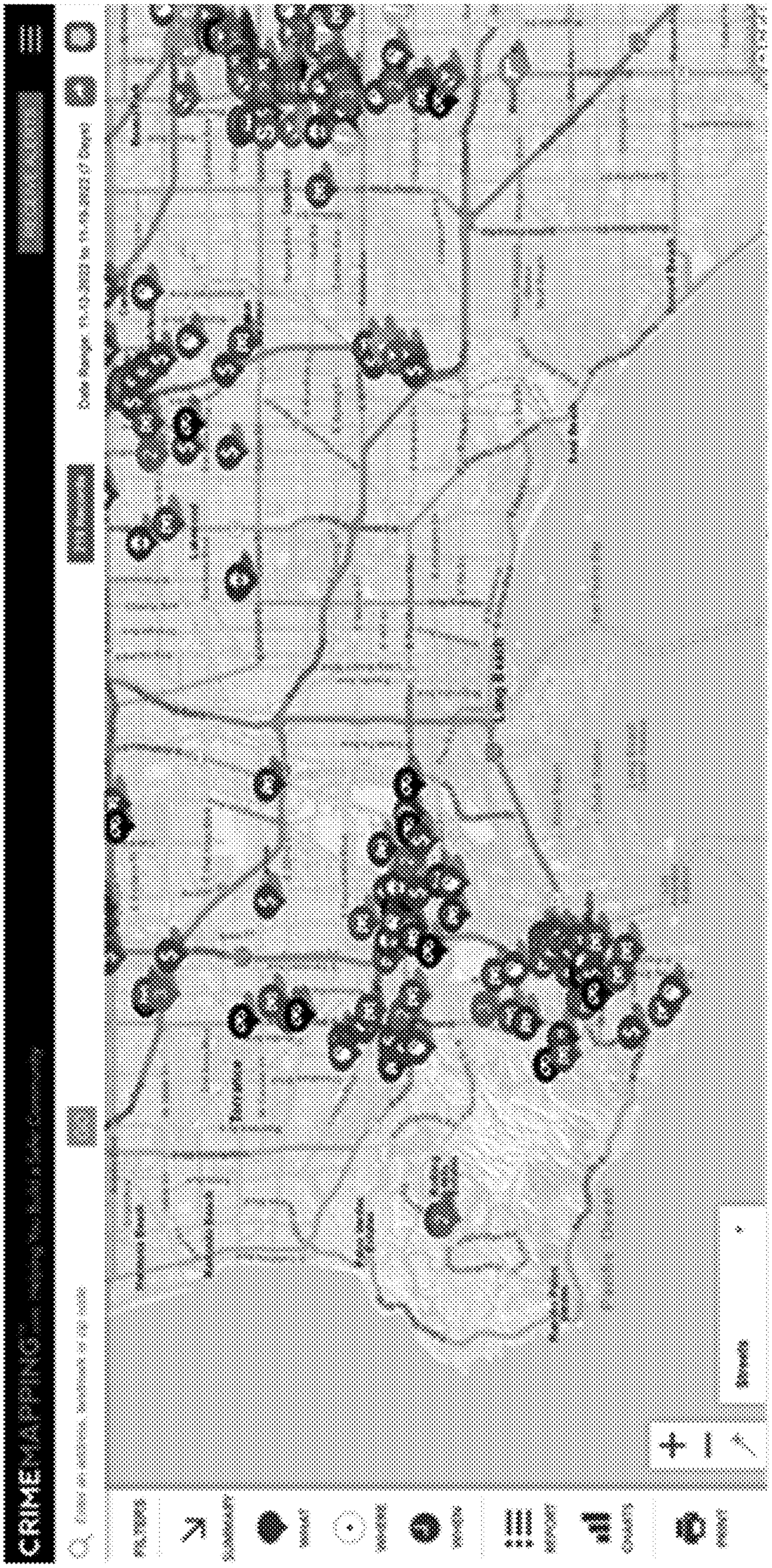
FIG. 37 depicts an exemplary GUI for dynamic maps utilized within a cloud-based mapping system, wherein an end-user may—on the same screen—input information about a call, incident, or vehicle, while simultaneously viewing the dynamic map, as described in exemplary embodiments.
Figure 38:
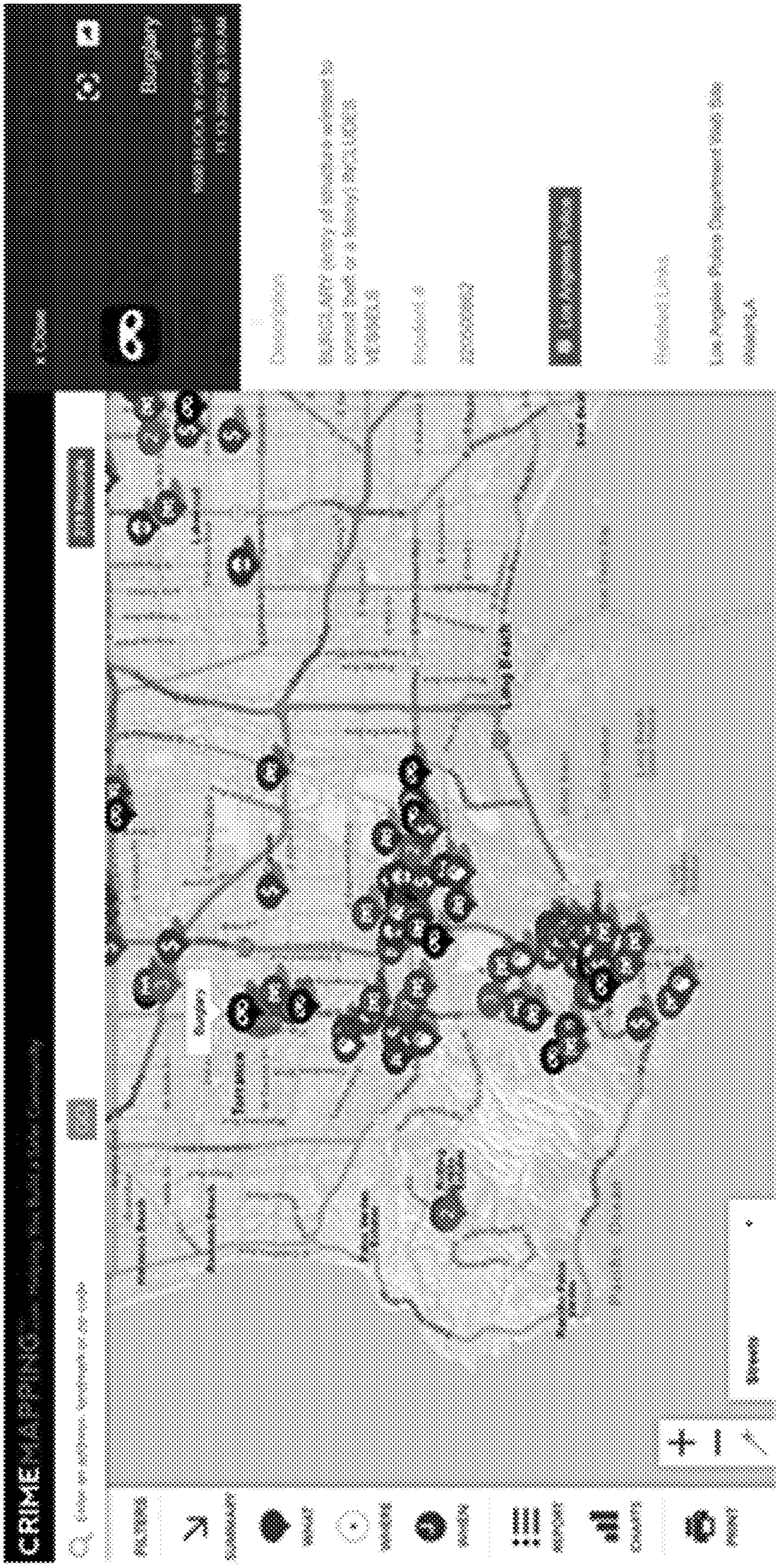
FIG. 38 depicts an exemplary GUI for a cloud-based mapping system for use on a client device, as described in exemplary embodiments.

Exemplary GUIs for dynamic crowd-sourced public maps as depicted in FIGS. 37 and 38 may be configured to include these features. Certain disclosed embodiments of a GUI for dynamic crowd-sourced public maps may be configured to be displayed on a variety of client devices, including phones, tablets, laptops, desktop computers, etc. For example, FIG. 37 depicts an exemplary GUI for dynamic maps utilized within a cloud-based mapping system, wherein an end-user may—on the same screen-input information about a call, incident, or vehicle, while simultaneously viewing the dynamic map, as described in exemplary embodiments. FIG. 38 depicts an exemplary GUI for a cloud-based mapping system for use on a client device, as described in exemplary embodiments.

The present disclosure has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include software, but systems and methods consistent with the present disclosure can be implemented with software and hardware. In addition, while certain components have been described as being interrelated through specific fields, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting and/or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is ambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiment being indicated by the following claims.

According to some embodiments, the operations, techniques, and/or components described herein can be implemented by a device or system, which can include one or more special-purpose computing devices. The special-purpose computing devices can be hard-wired to perform the operations, techniques, and/or components described herein, or can include digital electronic devices such as one or more application-specific integrated circuits (ASICs) or field programmable gate arrays (FPGAs) that are persistently programmed to perform the operations, techniques, and/or components described herein, or can include one or more hardware processors programmed to perform such features of the present disclosure pursuant to program instructions in firmware, memory, other storage, or a combination. Such special-purpose computing devices can also combine custom hard-wired logic, ASICs, or FPGAs with custom programming to accomplish the technique and other features of the present disclosure. The special-purpose computing devices can be desktop computer systems, portable computer systems, handheld devices, networking devices, or any other device that can incorporate hard-wired and/or program logic to implement the techniques and other features of the present disclosure.

The one or more special-purpose computing devices can be generally controlled and coordinated by operating system software, such as iOS, Android, Blackberry, Chrome OS, Windows XP, Windows Vista, Windows 7, Windows 8, Windows Server, Windows CE, Unix, Linux, SunOS, Solaris, VxWorks, or other compatible operating systems. In other embodiments, the computing device can be controlled by a proprietary operating system. Operating systems can control and schedule computer processes for execution, perform memory management, provide file system, networking, I/O services, and provide a user interface functionality, such as a graphical user interface ("GUI"), among other things.

Furthermore, although aspects of the disclosed embodiments may be described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments may be not limited to the above described examples, but are instead defined by the appended claims in light of their full scope of equivalents.

Moreover, while illustrative embodiments have been described herein, the scope includes any and all embodiments having equivalent elements, modifications, omissions, combinations (e.g., of aspects across various embodiments), adaptations or alterations on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps.

Itis intended, therefore, that the specification and examples be considered as example only, with a true scope and spirit being indicated by the following claims and their full scope of equivalents.

What is claimed is:

1. A system for displaying data comprising:

a mapping configuration database configured to:

receive computer aided dispatch (CAD) and geographic information systems (GIS) data from at least one user system;

store mapping configuration information; and receive mapping configuration information from a mapping configuration tool; and a publishing tool configured to:

receive the CAD and GIS data from the mapping configuration database;

publish information from the mapping configuration database as a data table; and provide instructions to display the CAD data and the GIS data on a GIS map via a mapping application tool, the CAD data and the GIS data being displayed with a plurality of dynamic icons with selected data for at least one of incidents, vehicles, or units, each dynamic icon includes a dynamic directional arrow pointing to a specific coordinate on the GIS map and at least one of a resource icon, an agency icon, and a status ring, wherein the dynamic icons are displayed within a specified geographic area, wherein the mapping configuration tool accesses the stored CAD data and the stored GIS data from the mapping configuration database, and, in response to a user input received via the mapping configuration tool, alters the CAD data and the GIS data, and adjusts the GIS map behavior by customizing one or more of the GIS map's appearance, settings, or layers.

2. The system of claim 1, wherein:

the mapping configuration database comprises a hover setting; and the mapping application tool displays the CAD data and the GIS data in a dashboard within a graphical user interface.

3. The system of claim 1, wherein:

the mapping configuration database comprises a setting for enabling users to add the plurality of map layers;

the plurality of map layers comprise a basemap layer, a CAD operational layer, and an operational layer; and the mapping configuration database is configured to enable users to edit map layer settings.

4. The system of claim 1, wherein:

the mapping configuration database customizes the appearance of CAD data on a map with Data Transforms, the Data Transforms comprising: Entity Type, Entity Column, Operator, Matching Value, Modified Column, Modified Value, Is Active, and Sort Order; and the mapping configuration database is further configured to customize one or more of a map launch location, a map color, an icon list, and a layer list.

5. The system of claim 1, wherein the online GIS fields comprise:

at least one of a Map Settings Name, a Zoom In Factor, a Zoom Out Factor, or a Map Theme;

at least one of an Initial Location X, an Initial Location Y, an Initial Location Z, an Initial Location Well-Known ID (WKID), or an Initial Scale;

at least one of a Coordinate Zoom Scale, a Master Map WKID, a Minimum Scale, a Maximum Scale, a CAD Operational Layers Display Header, or a Locator Uniform Resource Identifier (URI);

at least one of an Enable Sketch Tool, a Unique CAD Symbols, a Rotate Vehicles, or a CAD Graphic Size;

at least one of an Incident Default Icon, a Vehicle Default Icon, a Call Default Icon, an Incident Default Color Hex, a Vehicle Default Color Hex, a Call Default Color Hex; and at least one of a Layers Tolerance, a Hover Callout Delay, a Callout Dismiss Delay, an Incident Label Column Name, and an Incident Zoom Scale.

6. The system of claim 1, wherein:

the mapping application tool updates the CAD data in response to map appearance customization; and the mapping configuration database is configured to enable a user to add one or more profiles.

7. The system of claim 1, wherein:

the mapping configuration database is configured to display a map layer summary of a profile;

the mapping configuration database further comprises a ribbon bar, the ribbon bar being configured to display the dynamic icons for changing what appears on the dynamic map; and the plurality of map layers includes a basemap, and operational layers.

8. The system of claim 1, wherein:

the mapping configuration database further comprises a details panel, the details panel displaying features of the plurality of map layers; and the details panel comprises one or more of a Unit or Incident Number, a Sector ID, a Sector Name, a Priority Code, a Priority Name, an Address, a Problem Type, a Time Last Updated, an Agency ID, an Agency Name, and X-/Y-location coordinates.

9. The system of claim 1, wherein:

the mapping configuration tool comprises map sketch tools, a status bar, and a user to filter map work areas;

the mapping configuration database is configured to permit the user to filter incidents and vehicles;

the dynamic icons are in a hover state until the user selects one of the dynamic icons; and the mapping configuration database selects the CAD data and the GIS data for release on a dynamic crowd-sourced public map, the dynamic crowd-sourced public map being configured to:

enable an end-user to select specific types of incidents for display;

enable the end-user to filter the CAD data and the GIS data; and enable the end-user to display the CAD data and the GIS data on client devices.

10. The system of claim 1, further comprising a cloud-based mapping system, wherein:

the cloud-based mapping system is configured to:

include a map client;

track features for dynamic objects; and incorporate single sign-on protocols.

11. A method for displaying data, comprising:

configuring a mapping configuration database to:

receive computer aided dispatch (CAD) and geographic information systems (GIS) data from at least one user system;

store mapping configuration information; and receive mapping configuration information from a mapping configuration tool, configuring a publishing tool to:

receive the CAD and GIS data from the mapping configuration database;

publish information from the mapping configuration database as a data table; and provide instructions to display the CAD data and the GIS data on a GIS map via a mapping application tool, the CAD data and the GIS data being displayed with a plurality of dynamic icons with selected data for at least one of incidents, vehicles, or units, each dynamic icon includes a dynamic directional arrow pointing to a specific coordinate on the GIS map and at least one of a resource icon, an agency icon, and a status ring, wherein the dynamic icons are displayed within a specified geographic area, wherein the mapping configuration tool accesses the stored CAD data and the stored GIS data from the mapping configuration database, and, in response to a user input received via the mapping configuration tool, alters the CAD data and the GIS data, and adjusts the GIS map behavior by customizing one or more of the GIS map's appearance, settings, or layers.

12. The method of claim 11, wherein:

the mapping configuration database comprises a hover setting; and the mapping application tool displays the CAD data and the GIS data in a dashboard within a graphical user interface.

13. The method of claim 11, wherein:

the mapping configuration database comprises a setting for enabling add a plurality of map layers;

the plurality of map layers comprise a basemap layer, a CAD operational layer, and an operational layer; and the mapping configuration database is configured to enable users to edit map layer settings.

14. The method of claim 11, wherein:

the mapping configuration database customizes the appearance of the CAD data on a map with Data Transforms, the Data Transforms comprising Entity Type, Entity Column, Operator, Matching Value, Modified Column, Modified Value, Is Active, and Sort Order; and the mapping configuration database is further configured to customize one or more of a map launch location, a map color, an icon list, and a layer list.

15. The method of claim 11, wherein the online GIS fields comprise:

at least one of a Map Settings Name, a Zoom In Factor, a Zoom Out Factor, or a Map Theme;

at least one of an Initial Location X, an Initial Location Y, an Initial Location Z, an Initial Location Well-Known ID (WKID), or an Initial Scale;

at least one of a Coordinate Zoom Scale, a Master Map WKID, a Minimum Scale, a Maximum Scale, a CAD Operational Layers Display Header, or a Locator Uniform Resource Identifier (URI);

at least one of an Enable Sketch Tool, a Unique CAD Symbols, a Rotate Vehicles, or a CAD Graphic Size;

at least one of an Incident Default Icon, a Vehicle Default Icon, a Call Default Icon, an Incident Default Color Hex, a Vehicle Default Color Hex, a Call Default Color Hex; and at least one of a Layers Tolerance, a Hover Callout Delay, a Callout Dismiss Delay, an Incident Label Column Name, and an Incident Zoom Scale.

16. The method of claim 11, wherein:

the mapping application tool updates the CAD data in response to map appearance customization; and the mapping configuration database is configured to enable a user to add one or more profiles.

17. The method of claim 11, wherein:

the mapping configuration database is configured to display a map layer summary of a profile;

the mapping configuration database further comprises a ribbon bar, the ribbon bar being configured to display dynamic icons for changing what appears on the dynamic map; and the plurality of map layers includes a basemap, and operational layers.

18. The method of claim 11, wherein:

the mapping configuration database further comprises a details panel, the details panel displays features of the plurality of map layers; and the details panel comprises one or more of a Unit or Incident Number, a Sector ID, a Sector Name, a Priority Code, a Priority Name, an Address, a Problem Type, a Time Last Updated, an Agency ID, an Agency Name, and X-/Y-location coordinates.

19. The method of claim 11, wherein:

the mapping configuration tool comprises map sketch tools, a status bar, and a user to filter map work areas;

the mapping configuration database is configured to permit the user to filter incidents and vehicles;

the dynamic icons are in a hover state until the user selects one of the dynamic icons; and the mapping configuration database selects the CAD data and the GIS data for release on a dynamic crowd-sourced public map, the dynamic crowd-sourced public map being configured to:

enable an end-user to select specific types of incidents for display;

enable the end-user to filter the CAD data and the GIS data; and enable the end-user to display the CAD data and the GIS data on client devices.

20. The method of claim 11, wherein a cloud-based mapping system is configured to:

include a map client;

track features for dynamic objects; and incorporate single sign-on protocols.

* * * * *